United States Patent
Myslinski

(10) Patent No.: US 10,538,329 B2
(45) Date of Patent: *Jan. 21, 2020

(54) DRONE DEVICE SECURITY SYSTEM FOR PROTECTING A PACKAGE

(71) Applicant: Lucas J. Myslinski, Sunnyvale, CA (US)

(72) Inventor: Lucas J. Myslinski, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,328

(22) Filed: Oct. 24, 2018

(65) Prior Publication Data

US 2019/0055019 A1    Feb. 21, 2019

Related U.S. Application Data

(63) Continuation of application No. 15/628,907, filed on Jun. 21, 2017, now Pat. No. 10,183,748, which is a
(Continued)

(51) Int. Cl.
*B64C 39/02* (2006.01)
*G06Q 50/00* (2012.01)
(Continued)

(52) U.S. Cl.
CPC .............. *B64C 39/024* (2013.01); *B64D 5/00* (2013.01); *B64D 47/02* (2013.01); *B64D 47/08* (2013.01);
(Continued)

(58) Field of Classification Search
CPC .. G05D 1/0094; G05D 1/104; G06K 9/00362; G06K 9/0063; G06K 9/00711;
(Continued)

(56) References Cited

U.S. PATENT DOCUMENTS 5,960,411 A    9/1999  Hartman et al.
6,161,090 A    12/2000 Kanevsky et al.
(Continued)

FOREIGN PATENT DOCUMENTS

CN    201367115 Y   12/2009
GB     2428529 A    1/2007
(Continued)

OTHER PUBLICATIONS

Ryosuke Nagura et al.: "A method of rating the credibility of news documents on the web," Proceedings of the 29th Annual International ACM SIGIR Conference on Research and Development in Information Retrieval, SIGIR '06, Aug. 6, 2006, p. 683.
(Continued)

*Primary Examiner* — Maceeh Anwari
(74) *Attorney, Agent, or Firm* — Haverstock & Owens LLP

(57) ABSTRACT

A fact checking system utilizes social networking information and analyzes and determines the factual accuracy of information and/or characterizes the information by comparing the information with source information. The social networking fact checking system automatically monitors information, processes the information, fact checks the information and/or provides a status of the information, including automatically modifying a web page to include the fact check results. The fact checking system is able to be implemented utilizing a drone device. The drone device is able to be implemented in conjunction with a security system.

20 Claims, 13 Drawing Sheets

Related U.S. Application Data continuation-in-part of application No. 15/472,858, filed on Mar. 26, 2017, now Pat. No. 10,035,594, which is a continuation of application No. 15/422,642, filed on Feb. 2, 2017, now Pat. No. 9,643,722, which is a continuation-in-part of application No. 14/729,223, filed on Jun. 3, 2015, now Pat. No. 9,892,109, which is a continuation-in-part of application No. 14/260,492, filed on Apr. 24, 2014, now Pat. No. 9,972,055.

(60) Provisional application No. 62/403,594, filed on Oct. 3, 2016, provisional application No. 61/946,043, filed on Feb. 28, 2014.

(51) Int. Cl.

| | |
|---|---|
| *G05D 1/10* | (2006.01) |
| *G05D 1/00* | (2006.01) |
| *H04N 5/77* | (2006.01) |
| *G06T 7/20* | (2017.01) |
| *H04N 7/18* | (2006.01) |
| *G06K 9/62* | (2006.01) |
| *G06K 9/00* | (2006.01) |
| *G06F 17/27* | (2006.01) |
| *G06Q 10/06* | (2012.01) |
| *G06Q 10/04* | (2012.01) |
| *G06Q 10/08* | (2012.01) |
| *G06Q 30/02* | (2012.01) |
| *B64D 5/00* | (2006.01) |
| *G06Q 50/26* | (2012.01) |
| *B64D 47/02* | (2006.01) |
| *B64D 47/08* | (2006.01) |
| *G08B 21/18* | (2006.01) |

(52) U.S. Cl.
CPC ......... *G05D 1/0088* (2013.01); *G05D 1/0094* (2013.01); *G05D 1/104* (2013.01); *G06F 17/2705* (2013.01); *G06F 17/2785* (2013.01); *G06K 9/0063* (2013.01); *G06K 9/00362* (2013.01); *G06K 9/00711* (2013.01); *G06K 9/00771* (2013.01); *G06K 9/6202* (2013.01); *G06Q 10/04* (2013.01); *G06Q 10/06* (2013.01); *G06Q 10/063* (2013.01); *G06Q 10/0833* (2013.01); *G06Q 30/0201* (2013.01); *G06Q 30/0202* (2013.01); *G06Q 30/0207* (2013.01); *G06Q 30/0282* (2013.01); *G06Q 50/01* (2013.01); *G06Q 50/26* (2013.01); *G06T 7/20* (2013.01); *G08B 21/18* (2013.01); *H04N 5/77* (2013.01); *H04N 5/772* (2013.01); *H04N 7/183* (2013.01); *H04N 7/188* (2013.01); *B64C 2201/126* (2013.01); *B64C 2201/127* (2013.01); *B64C 2201/141* (2013.01); *B64C 2201/22* (2013.01); *G06T 2207/10016* (2013.01); *G06T 2207/10032* (2013.01); *G06T 2207/30196* (2013.01); *G06T 2207/30232* (2013.01)

(58) Field of Classification Search
CPC .. G06K 9/00771; G06K 9/6202; G06Q 50/01; G06T 7/20; H04N 5/77; H04N 7/183; H04N 7/188
USPC .......................................................... 701/3
See application file for complete search history.

(56) References Cited

U.S. PATENT DOCUMENTS

| | | |
|---|---|---|
| 6,256,734 B1 | 7/2001 | Blaze et al. |
| 6,266,664 B1 | 7/2001 | Russell-Falla et al. |
| 6,782,510 B1 | 8/2004 | Gross et al. |
| 7,249,058 B2 | 7/2007 | Kim et al. |
| 7,249,380 B2 | 7/2007 | Yang |
| 7,266,116 B2 | 9/2007 | Halpern |
| 7,337,462 B2 | 2/2008 | Dudkiewicz et al. |
| 7,478,078 B2 | 1/2009 | Lunt et al. |
| 7,487,334 B2 | 2/2009 | Konigsburg et al. |
| 7,644,088 B2 | 1/2010 | Fawcett et al. |
| 7,657,424 B2 | 2/2010 | Bennett |
| 7,765,574 B1 | 7/2010 | Maybury et al. |
| 7,809,721 B2 | 10/2010 | Putivsky et al. |
| 8,185,448 B1 | 5/2012 | Myslinski |
| 8,225,164 B2 | 7/2012 | Magnus et al. |
| 8,229,795 B1 | 7/2012 | Myslinski |
| 8,290,924 B2 | 10/2012 | Rajaram |
| 8,290,960 B2 | 10/2012 | Li et al. |
| 8,321,295 B1 | 11/2012 | Myslinski |
| 8,401,919 B2 | 3/2013 | Myslinski |
| 8,423,424 B2 | 4/2013 | Myslinski |
| 8,458,046 B2 | 6/2013 | Myslinski |
| 8,510,173 B2 | 8/2013 | Myslinski |
| 8,583,509 B1 | 11/2013 | Myslinski |
| 9,544,763 B2 | 1/2017 | Formo |
| 9,563,201 B1 | 2/2017 | Tofte |
| 9,632,509 B1 | 4/2017 | Aphek |
| 9,875,661 B2 | 1/2018 | Kunzi |
| 2002/0083468 A1 | 6/2002 | Dudkiewicz |
| 2002/0099730 A1 | 7/2002 | Brown et al. |
| 2003/0088689 A1 | 5/2003 | Alexander, Jr. et al. |
| 2003/0158872 A1 | 8/2003 | Adams |
| 2003/0210249 A1 | 11/2003 | Simske |
| 2004/0103032 A1 | 5/2004 | Maggio |
| 2004/0122846 A1 | 6/2004 | Chess et al. |
| 2004/0139077 A1 | 7/2004 | Banker |
| 2004/0210824 A1 | 10/2004 | Shoff et al. |
| 2005/0022252 A1 | 1/2005 | Shen |
| 2005/0060312 A1 | 3/2005 | Curtiss et al. |
| 2005/0120391 A1 | 6/2005 | Haynie et al. |
| 2005/0132420 A1 | 6/2005 | Howard et al. |
| 2005/0235199 A1 | 10/2005 | Adams |
| 2006/0015904 A1 | 1/2006 | Marcus |
| 2006/0064633 A1 | 3/2006 | Adams |
| 2006/0148446 A1 | 7/2006 | Karlsson |
| 2006/0206912 A1 | 9/2006 | Klarfeld et al. |
| 2006/0212904 A1 | 9/2006 | Klarfeld et al. |
| 2006/0248076 A1 | 11/2006 | Troy et al. |
| 2006/0253580 A1 | 11/2006 | Dixon et al. |
| 2006/0293879 A1 | 12/2006 | Zhao et al. |
| 2007/0011710 A1 | 1/2007 | Chiu |
| 2007/0043766 A1 | 2/2007 | Nicholas et al. |
| 2007/0100730 A1 | 5/2007 | Batashvili et al. |
| 2007/0136781 A1 | 6/2007 | Kawai |
| 2007/0136782 A1 | 6/2007 | Ramaswamy et al. |
| 2007/0288978 A1 | 12/2007 | Pizzurro et al. |
| 2008/0077570 A1 | 3/2008 | Tang et al. |
| 2008/0109285 A1 | 5/2008 | Reuther et al. |
| 2008/0109780 A1 | 5/2008 | Stern et al. |
| 2008/0183726 A1 | 7/2008 | Bruckner et al. |
| 2008/0319744 A1 | 12/2008 | Goldberg |
| 2009/0063294 A1 | 3/2009 | Hoekstra et al. |
| 2009/0125382 A1 | 5/2009 | Delepet |
| 2009/0210395 A1 | 8/2009 | Sedam |
| 2009/0265304 A1 | 10/2009 | Ait-Mokhtar et al. |
| 2009/0311659 A1 | 12/2009 | Lottridge et al. |
| 2010/0023525 A1 | 1/2010 | Westerlund et al. |
| 2010/0049590 A1 | 2/2010 | Anshul |
| 2010/0121638 A1 | 5/2010 | Pinson et al. |
| 2010/0121973 A1 | 5/2010 | Lobacheva et al. |
| 2010/0235313 A1 | 9/2010 | Rea et al. |
| 2010/0306166 A1 | 12/2010 | Pantel et al. |
| 2010/0332583 A1 | 12/2010 | Szabo |
| 2011/0043652 A1 | 2/2011 | King et al. |
| 2011/0066587 A1 | 3/2011 | Ferrucci et al. |

(56) References Cited

U.S. PATENT DOCUMENTS

| | | | |
|---|---|---|---|
| 2011/0067065 A1 | 3/2011 | Karaoguz et al. | |
| 2011/0087639 A1 | 4/2011 | Gurney | |
| 2011/0093258 A1 | 4/2011 | Xu et al. | |
| 2011/0106615 A1 | 5/2011 | Churchill et al. | |
| 2011/0136542 A1 | 6/2011 | Sathish | |
| 2011/0166860 A1 | 7/2011 | Tran | |
| 2011/0313757 A1 | 12/2011 | Hoover et al. | |
| 2012/0005221 A1 | 1/2012 | Ickman et al. | |
| 2012/0102405 A1 | 4/2012 | Zuckerman et al. | |
| 2012/0131015 A1 | 5/2012 | Al Badrashiny et al. | |
| 2012/0158711 A1 | 6/2012 | Curtiss et al. | |
| 2012/0191757 A1 | 7/2012 | Gross et al. | |
| 2012/0198319 A1 | 8/2012 | Agnoli et al. | |
| 2012/0210853 A1 | 8/2012 | Abershitz | |
| 2012/0272143 A1 | 10/2012 | Gillick | |
| 2012/0317046 A1 | 12/2012 | Myslinski | |
| 2013/0060757 A1 | 3/2013 | Myslinski | |
| 2013/0074110 A1 | 3/2013 | Myslinski | |
| 2013/0091436 A1 | 4/2013 | Rose et al. | |
| 2013/0099925 A1 | 4/2013 | Pederson | |
| 2013/0110748 A1 | 5/2013 | Talati et al. | |
| 2013/0151240 A1 | 6/2013 | Myslinski | |
| 2013/0158984 A1 | 6/2013 | Myslinski | |
| 2013/0159127 A1 | 6/2013 | Myslinski | |
| 2013/0191298 A1 | 7/2013 | Myslinski | |
| 2013/0198196 A1 | 8/2013 | Myslinski | |
| 2013/0308920 A1 | 11/2013 | Myslinski | |
| 2013/0311388 A1 | 11/2013 | Myslinski | |
| 2013/0346160 A1 | 12/2013 | Dunst | |
| 2014/0074751 A1 | 3/2014 | Rocklitz | |
| 2016/0266577 A1* | 9/2016 | Kerzner | G05D 1/0022 |
| 2017/0011333 A1* | 1/2017 | Greiner | G06Q 10/083 |
| 2017/0052539 A1 | 2/2017 | Kerzner | |

FOREIGN PATENT DOCUMENTS

| | | | |
|---|---|---|---|
| WO | 2001077906 A2 | 10/2001 | |
| WO | 2001077907 A2 | 10/2001 | |
| WO | 2003014949 A1 | 2/2003 | |
| WO | 2004034755 A2 | 4/2004 | |
| WO | 2006036853 A2 | 6/2006 | |
| WO | 2007115224 A2 | 10/2007 | |
| WO | 2009006542 A2 | 1/2009 | |
| WO | 2009089116 | 7/2009 | |
| WO | 2010093510 A1 | 8/2010 | |
| WO | 2010105245 A2 | 9/2010 | |
| WO | 2011088264 A1 | 7/2011 | |
| WO | 2015/044179 | 4/2015 | |

OTHER PUBLICATIONS

Andreas Juffinger et al.: "Blog credibility ranking by exploiting verified content," Proceedings of the 3rd Workshop on Information Credibility on the Web, WICOW '09, Apr. 20, 2009 (Apr. 20, 2009), p. 51.
Notice of Allowance from U.S. Appl. No. 15/422,642.
Office Action from U.S. Appl. No. 15/472,858.
Notice of Allowance from U.S. Appl. No. 15/472,858.
Office Action from U.S. Appl. No. 15/472,894.
Notice of Allowance from U.S. Appl. No. 15/472,894.
Office Action from U.S. Appl. No. 15/868,193.
Notice of Allowance from U.S. Appl. No. 15/868,193.
Ulken, A Question of Balance: Are Google News search results politically biased? May 5, 2005, <http://ulken.com/thesis/googlenews-bias-study.pdf>.
<http://jayrosen.posterous.com/my-simple-fix-for-the-messed-up-sunday-shows> (Dec. 27, 2009).
<http://en.wikipedia.org/wiki/SpinSpotter> (Jul. 1, 2010).
Notice of Allowance including reasons for allowance from U.S. Appl. No. 13/287,804.
Accelerated Examination Support Document from U.S. Appl. No. 13/287,804.
Preexam Search Document from U.S. Appl. No. 13/287,804.
Wendell Cochran; Journalists aren't frauds; the business has fine lines; Ethics classes would help them stay on right side; The Sun. Baltimore, Md.: Jul. 19, 1998. p. 6.C; http://proquest.umi.com/pqdweb?did=32341381&sid=3&Fmt=3&clientId=19649&RQT=309&VName=PQD.
Notice of Allowance including reasons for allowance from U.S. Appl. No. 13/448,991.
Notice of Allowance including reasons for allowance from U.S. Appl. No. 13/528,561.
Notice of Allowance including reasons for allowance from U.S. Appl. No. 13/632,490.
Notice of Allowance including reasons for allowance from U.S. Appl. No. 13/669,711.
Notice of Allowance including reasons for allowance from U.S. Appl. No. 13/669,819.
Office Action from U.S. Appl. No. 13/669,711.
Office Action from U.S. Appl. No. 13/669,819.
Notice of Allowance including reasons for allowance from U.S. Appl. No. 13/760,408.
Notice of Allowance including reasons for allowance from U.S. Appl. No. 13/946,331.
Office Action from U.S. Appl. No. 13/946,333.
Office Action from U.S. Appl. No. 14/260,492 (dated Aug. 11, 2014).
Supplemental Office Action from U.S. Appl. No. 14/260,492 (dated Oct. 22, 2014).
Sorry for the Spam, Truth Goggles, <http://slifty.com/projects/truth-goggles/>, Oct. 29, 2012.
LazyTruth Chrome extension fact checks chain emails, <http://www.theverge.com/2012/11/14/3646294/lazytruth-fact-check-chain-email>, Nov. 14, 2012.
Announcing Truth Teller beta, a better way to watch political speech, <http://www.washingtonpost.com/blogs/ask-the-post/wp/2013/09/25/announcing-truth-teller-beta-a-better-way-to-watch-political-speech/>, Sep. 25, 2013.
Fact Check Your News with the Trooclick App, <http://semanticweb.com/fact-check-news-trooclick-app_b43262>, Jun. 18, 2014.
M. Sanfourche, et al. "Perception for UAV: Vision-Based Navigation and Environment Modeling." <https://hal.archives-ouvertes.fr/hal-01183691> (Submitted on Aug. 10, 2015).

\* cited by examiner

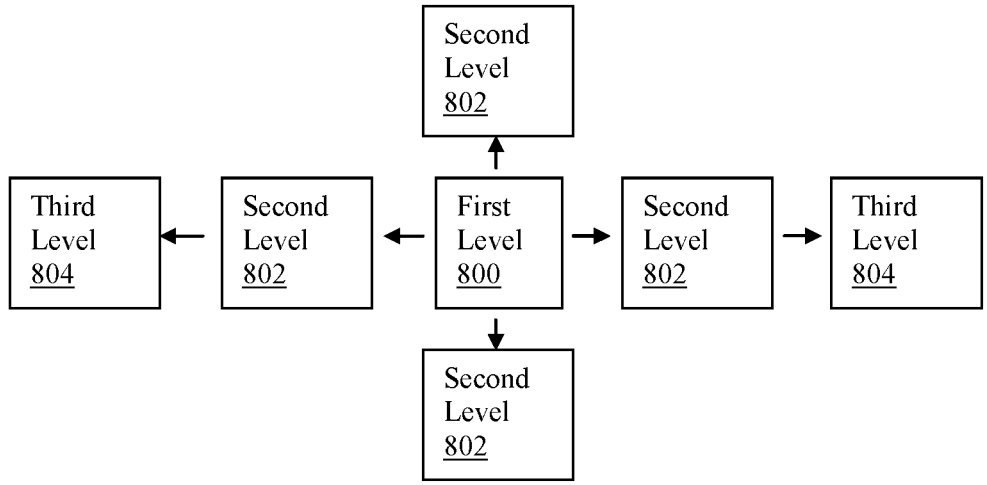
Fig. 8
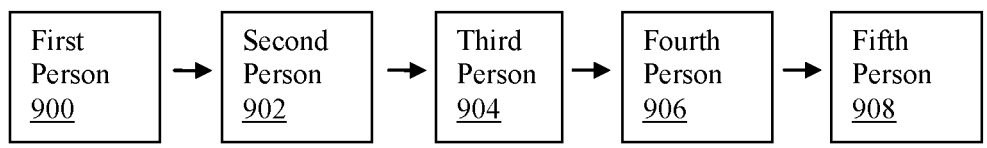
Fig. 9
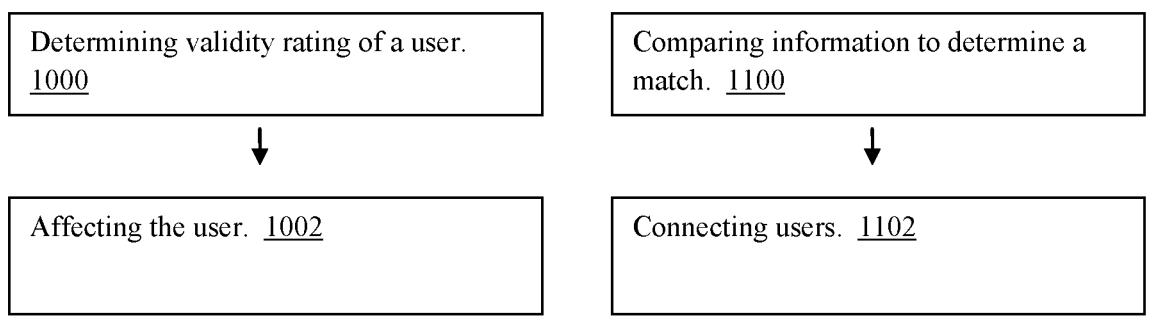
Fig. 10                                Fig. 11

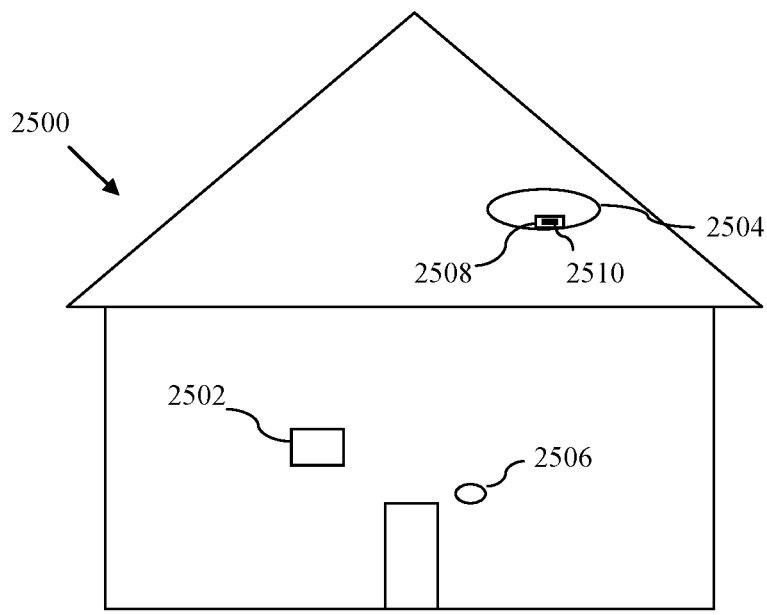
Fig. 25
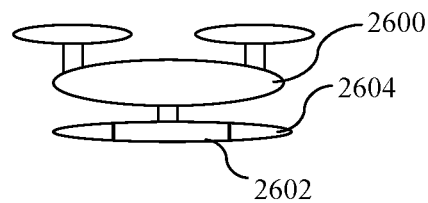
Fig. 26
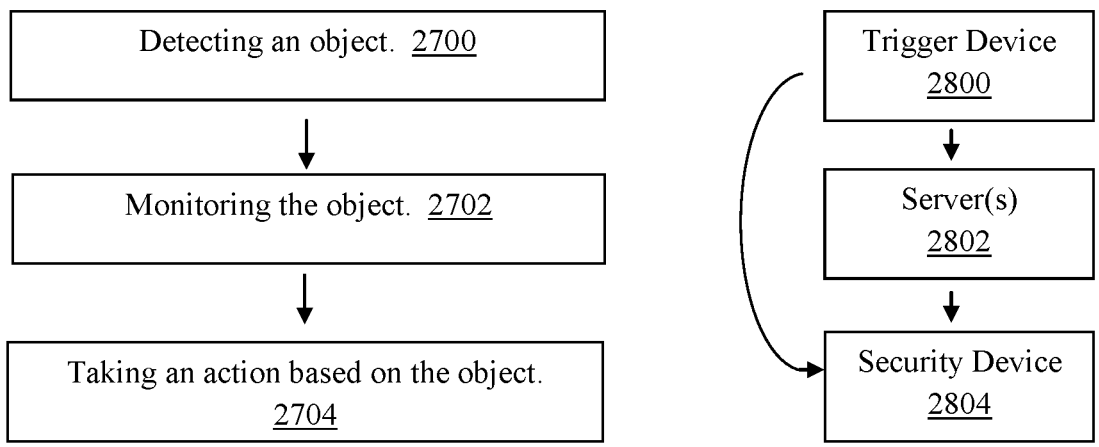
Fig. 27
Fig. 28

DRONE DEVICE SECURITY SYSTEM FOR PROTECTING A PACKAGE

CROSS-REFERENCE TO RELATED APPLICATION(S)

This application is a continuation application of co-pending U.S. patent application Ser. No. 15/628,907, filed on Jun. 21, 2017, and titled "DRONE DEVICE SECURITY SYSTEM FOR PROTECTING A PACKAGE," which is a continuation-in-part application of U.S. patent application Ser. No. 15/472,858 (now U.S. Pat. No. 10,035,594), filed on Mar. 29, 2017, and titled "DRONE DEVICE SECURITY SYSTEM," which is a continuation application of U.S. patent application Ser. No. 15/422,642 (now U.S. Pat. No. 9,643,722), filed on Feb. 2, 2017, and titled "DRONE DEVICE SECURITY SYSTEM," which is a continuation-in-part application of U.S. patent application Ser. No. 14/729,223 (now U.S. Pat. No. 9,892,109), filed on Jun. 3, 2015, and titled "AUTOMATICALLY CODING FACT CHECK RESULTS IN A WEB PAGE," which is a continuation-in-part application of U.S. patent application Ser. No. 14/260,492 (now U.S. Pat. No. 9,972,055), filed on Apr. 24, 2014, and titled "FACT CHECKING METHOD AND SYSTEM UTILIZING SOCIAL NETWORKING INFORMATION," which claims the benefit of U.S. Provisional Patent Application Ser. No. 61/946,043, filed Feb. 28, 2014, and titled "FACT CHECKING METHOD AND SYSTEM UTILIZING SOCIAL NETWORKING INFORMATION," which are all hereby incorporated by reference in their entireties for all purposes. U.S. patent application Ser. No. 15/422,642, filed on Feb. 2, 2017, and titled "DRONE DEVICE SECURITY SYSTEM," also claims the benefit of U.S. Provisional Patent Application Ser. No. 62/403,594, filed Oct. 3, 2016, and titled "FACT CHECKING USING A DRONE DEVICE, which is hereby incorporated by reference in its entirety for all purposes.

FIELD OF THE INVENTION

The present invention relates to the field of social networking systems analysis.

BACKGROUND OF THE INVENTION

Information is easily dispersed through social networks and social media. The accuracy of the information is often questionable or even incorrect. Although there are many fact checkers, they typically suffer from speed, efficiency, accuracy and other issues.

SUMMARY OF THE INVENTION

A social networking fact checking system analyzes and determines the factual accuracy of information and/or characterizes the information by comparing the information with source information. The social networking fact checking system automatically monitors information, processes the information, fact checks the information and/or provides a status of the information, including automatically modifying a web page to include the fact check results.

The social networking fact checking system provides users with factually accurate information, limits the spread of misleading or incorrect information, provides additional revenue streams, and supports many other advantages.

BRIEF DESCRIPTION OF THE DRAWINGS

FIG. 8 illustrates an exemplary web of lies according to some embodiments.

FIG. 9 illustrates an exemplary web of lies in timeline format according to some embodiments.

FIG. 10 illustrates a flowchart of a method of affecting a user based on a validity rating according to some embodiments.

FIG. 11 illustrates a flowchart of a method of connecting users based on similar content or validity rating according to some embodiments.

FIG. 25 illustrates a diagram of a drone security system according to some embodiments.

FIG. 26 illustrates a diagram of a drone with shielding according to some embodiments.

FIG. 27 illustrates a flowchart of a method of utilizing the drone and/or security system to prevent an object from being removed from a location according to some embodiments.

FIG. 28 illustrates a diagram of devices for securing an object at a location according to some embodiments.

DETAILED DESCRIPTION OF THE PREFERRED EMBODIMENT

A fact checking system utilizing social networking information determines the factual accuracy of information by comparing the information with source information. Additional analysis is able to be implemented as well such as characterizing the information.

Figure 1:
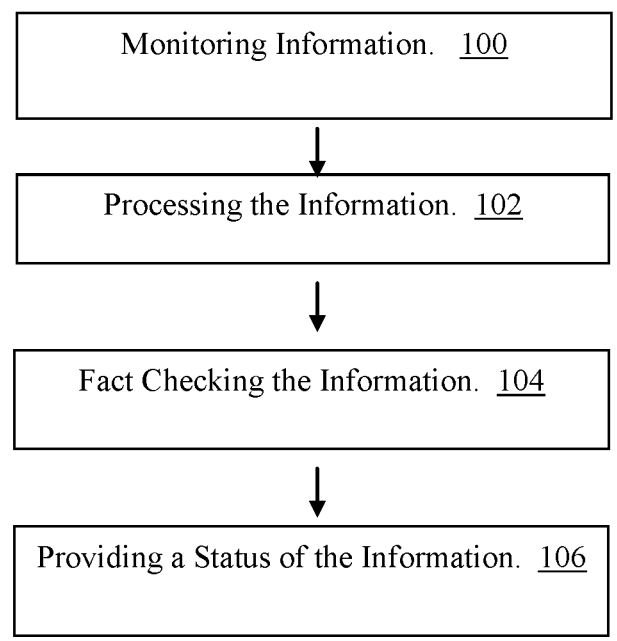
FIG. 1 illustrates a flowchart of a method of implementing fact checking according to some embodiments.

FIG. 1 illustrates a flowchart of a method of implementing fact checking according to some embodiments.

In the step 100, information is monitored. In some embodiments, all information or only some information (e.g., a subset less than all of the information) is monitored. In some embodiments, only explicitly selected information is monitored. In some embodiments, although all information is monitored, only some information (e.g., information deemed to be fact-based) is fact checked.

The information includes, but is not limited to, broadcast information (e.g., television broadcast information, radio broadcast information), email, documents, database information, social networking/media content (tweets/Twitter®, Facebook® postings), webpages, message boards, web logs, any computing device communication, telephone calls/communications, audio, text, live speeches/audio, radio, television video/text/audio, VoIP calls, video chatting, video conferencing, images, videos, and/or any other information. The information is able to be in the form of phrases, segments, sentences, numbers, words, comments, values, graphics, and/or any other form.

In some embodiments, monitoring includes recording, scanning, capturing, transmitting, tracking, collecting, surveying, and/or any other type of monitoring. In some embodiments, monitoring includes determining if a portion of the information is able to be fact checked. For example, if information has a specified structure, then it is able to be fact checked.

In some embodiments, the social networking fact checking system is implemented without monitoring information. This is able to be implemented in any manner. For example, while information is transmitted from a source, the information is also processed and fact checked so that the fact check result is able to be presented. In some embodiments, the fact check result is embedded in the same stream as the information. In some embodiments, the fact check result is in the header of a packet.

In the step 102, the information is processed. Processing is able to include many aspects including, but not limited to, converting (e.g., audio into text), formatting, parsing, determining context, transmitting, converting an image into text, analyzing and reconfiguring, and/or any other aspect that enables the information to be fact checked. Parsing, for example, includes separating a long speech into separate phrases that are each separately fact checked. For example, a speech may include 100 different facts that should be separately fact checked. In some embodiments, the step 102 is able to be skipped if processing is not necessary (e.g., text may not need to be processed). In some embodiments, processing includes converting the information into a searchable format. In some embodiments, processing occurs concurrently with monitoring. In some embodiments, processing includes capturing/receiving and/or transmitting the information (e.g., to/from the cloud).

In a specific example of processing, information is converted into searchable information (e.g., audio is converted into searchable text), and then the searchable information is parsed into fact checkable portions (e.g., segments of the searchable text; several word phrases).

Parsing is able to be implemented in any manner including, but not limited to, based on sentence structure (e.g., subject/verb determination), based on punctuation including, but not limited to, end punctuation of each sentence (e.g., period, question mark, exclamation point), intermediate punctuation such as commas and semi-colons, based on other grammatical features such as conjunctions, based on capital letters, based on a duration of a pause between words (e.g., 2 seconds), based on duration of a pause between words by comparison (e.g., typical pauses between words for user are 0.25 seconds and pauses between thoughts are 1 second)—the user's speech is able to be analyzed to determine speech patterns such as length of pauses between words lasting a fourth of the length for pauses between thoughts or sentences, based on a change of a speaker (e.g., speaker A is talking, then speaker B starts talking), based on a word count (e.g., 10 word segments), based on speech analysis, based on a slowed down version (recording the content, slowing down the recorded content to determine timing breaks), based on keywords/key phrases, based on search results, and/or any other manner. In some embodiments, processing includes, but is not limited to, calculating, computing, storing, recognition, speaker recognition, language (word, phrase, sentence, other) recognition, labeling, and/or characterizing.

In the step 104, the information is fact checked. Fact checking includes comparing the information to source information to determine the factual validity, accuracy, quality, character and/or type of the information. In some embodiments, the source information includes web pages on the Internet, one or more databases, dictionaries, encyclopedias, social network information, video, audio, any other communication, any other data, one or more data stores and/or any other source.

In some embodiments, the comparison is a text comparison such as a straight word for word text comparison. In some embodiments, the comparison is a context/contextual comparison. In some embodiments, a natural language comparison is used. In some embodiments, pattern matching is utilized. In some embodiments, an intelligent comparison is implemented to perform the fact check. In some embodiments, exact match, pattern matching, natural language, intelligence, context, and/or any combination thereof is used for the comparison. Any method of analyzing the source information and/or comparing the information to the source information to analyze and/or characterizing the information is able to be implemented. An exemplary implementation of fact checking includes searching (e.g., a search engine's search), parsing the results or searching through the results of the search, comparing the results with the information to be checked using one or more of the comparisons (e.g., straight text, context or intelligent) and retrieving results based on the comparison (e.g., if a match is found return "True"). The results are able to be any type including, but not limited to, binary, Boolean (True/False), text, numerical, and/or any other format. In some embodiments, determining context and/or other aspects of converting could be implemented in the step 104. In some embodiments, the sources are rated and/or weighted. For example, sources are able to be given more weight based on accuracy of the source, type of the source, user preference, user selections, classification of the source, and/or any other weighting factor. The weighting is then able to be used in determining the fact check result. For example, if a highly weighted or rated source agrees with a comment, and a low weighted source disagrees with the comment, the higher weighted source is used, and "valid" or a similar result is returned. Determining a source agrees with information is able to be implemented in any manner, for example, by comparing the information with the source and finding a matching result, and determining a source disagrees with information is when the comparison of the information and the source does not find a match.

In the step 106, a status of the information is provided based on the fact check result. The status is provided in any manner including, but not limited to, transmitting and/or displaying text, highlighting, underlining, color effects, a visual or audible alert or alarm, a graphical representation, and/or any other indication. The meaning of the status is able to be any meaning including, but not limited to, correct, incorrect, valid, true, false, invalid, opinion, hyperbole, sarcasm, hypocritical, comedy, unknown, questionable, suspicious, need more information, questionable, misleading, deceptive, possibly, close to the truth, and/or any other status.

The status is able to be presented in any manner, including, but not limited to, lights, audio/sounds, highlighting, text, a text bubble, a scrolling text, color gradient, headnotes/footnotes, an iconic or graphical representation, a video or video clip, music, other visual or audio indicators, a projection, a hologram, a tactile indicator including, but not limited to, vibrations, an olfactory indicator, a Tweet, a text message (SMS, MMS), an email, a page, a phone call, a social networking page/transmission/post/content, or any combination thereof. For example, text is able to be highlighted or the text color is able to change based on the validity of the text. For example, as a user types a social network message, the true statements are displayed in green, the questionable statements are displayed in yellow, and the false statements are displayed in red. In some embodiments, providing the status includes transmitting and/or broadcasting the status to one or more devices (e.g., televisions).

The status is also able to include other information including, but not limited to, statistics, citations and/or quotes. Providing the status of the information is also able to include providing additional information related to the fact checked information, such as an advertisement. In some embodiments, providing includes pointing out, showing, displaying, recommending, playing, presenting, announcing, arguing, convincing, signaling, asserting, persuading, demonstrating, denoting, expressing, hinting, illustrating, implying, tagging, labeling, characterizing, and/or revealing.

In some embodiments, the fact checking system is implemented such that responses, validity determinations and/or status presentations are available in real-time or near real-time. By real-time, it is meant instantaneously (e.g., within 1 second); whereas near real-time is within a few seconds (e.g., within 5 seconds). Furthermore, since the monitoring, processing, fact checking and providing status are all able to be performed automatically without user intervention, real-time also means faster than having a human perform the search and presenting results. Depending on the implementation, in some embodiments, the indication is presented in at most 1 second, at most several seconds (e.g., at most 5 seconds), at most a minute (not real-time), at most several minutes or by the end of a show. In some embodiments, the time amount (e.g., at most 1 second) begins once a user pauses in typing, once a phrase has been communicated, once a phrase has been determined, at the end of a sentence, once an item is flagged, or another point in a sequence. For example, as soon as a phrase is detected, the fact checking system checks the fact, returns a result and displays an indication based on the result in less than 1 second—clearly much faster than a human performing a search, analyzing the search results and then typing a result to be displayed on a screen.

In some embodiments, an indication is displayed to compare the fact check result with other fact check results for other users. For example, as described herein, in some embodiments, fact check implementations are able to be different for different users based on selections such as approvals of sources and processing selections which are able to result in different fact check results. Therefore, if User A is informed that X information is determined to be "false," an indication indicates that X information was determined to be "true" for 50 other people. In some embodiments, usernames are indicated (e.g., X information was determined to be "true" for Bob). In some embodiments, usernames and/or results are only provided if their result is different from the user's result. In some embodiments, the number of users whose result matches the user's result is indicated. In some embodiments, the indication only indicates what the results were for contacts (e.g., social networking contacts) of the user. In some embodiments, the indication is only indicated if the results were different (e.g., true for user, but false for others). In some embodiments, the indication includes numbers or percentages of other fact check implementations (e.g., true for 50 users and false for 500 users or 25% true and 75% false). In some embodiments, indications are only indicated for specific users or classes of users. For example, only results of users classified as "members of the media" are indicated. In another example, a user is able to select whose results are indicated. In some embodiments, only results of users with a validity rating above a threshold are indicated.

In some embodiments, fewer or more steps are implemented. Furthermore, in some embodiments, the order of the steps is modified. In some embodiments, the steps are performed on the same device, and in some embodiments, one or more of the steps, or parts of the steps, are separately performed and/or performed on separate devices. In some embodiments, each of the steps 100, 102, 104 and 106 occur or are able to occur in real-time or non-real-time. Any combination of real-time and non-real-time steps is possible such as all real-time, none real-time and everything in between.

Figure 2:
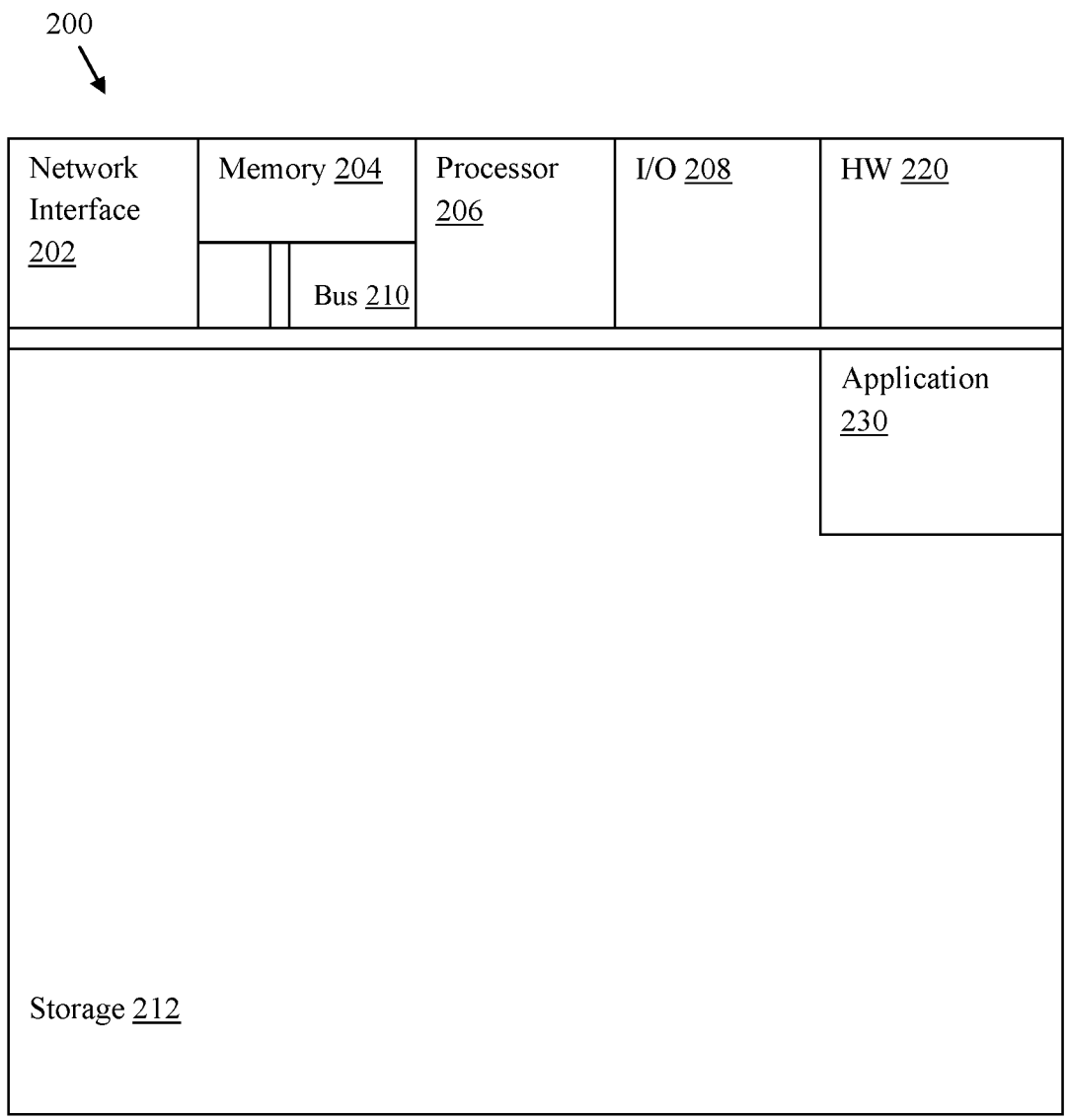
FIG. 2 illustrates a block diagram of an exemplary computing device configured to implement the fact checking method according to some embodiments.

FIG. 2 illustrates a block diagram of an exemplary computing device 200 configured to implement the fact checking method according to some embodiments. The computing device 200 is able to be used to acquire, store, compute, process, communicate and/or display information including, but not limited to, text, images, videos and audio. In some examples, the computing device 200 is able to be used to monitor information, process the information, fact check the information and/or provide a status of the information. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card, solid state drive or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, touchpad, speaker/microphone, voice input device, button interface, hand-waving, body-motion capture, touchless 3D input, joystick, remote control, brain-computer interface/direct neural interface/brain-machine interface, camera, and other devices. In some embodiments, the hardware structure includes multiple processors and other hardware to perform parallel processing. Fact checking application(s) 230 used to perform the monitoring, processing, fact checking and providing are likely to be stored in the storage device 212 and memory 204 and processed as applications are typically processed. More or fewer components shown in FIG. 2 are able to be included in the computing device 200. In some embodiments, fact checking hardware 220 is included. Although the computing device 200 in FIG. 2 includes applications 230 and hardware 220 for implementing the fact checking, the fact checking method is able to be implemented on a computing device in hardware, firmware, software or any combination thereof. For example, in some embodiments, the fact checking applications 230 are programmed in a memory and executed using a processor. In another example, in some embodiments, the fact checking hardware 220 is programmed hardware logic including gates specifically designed to implement the method.

In some embodiments, the fact checking application(s) 230 include several applications and/or modules. Modules include a monitoring module for monitoring information, a processing module for processing (e.g., converting) information, a fact checking module for fact checking information and a providing module for providing a status of the information. In some embodiments, modules include one or more sub-modules as well. In some embodiments, fewer or additional modules are able to be included. In some embodiments, the applications and/or the modules are located on different devices. For example, a device performs monitoring, processing, and fact checking, but the providing is performed on a different device, or in another example, the monitoring and processing occurs on a first device, the fact checking occurs on a second device and the providing occurs on a third device. Any configuration of where the applications/modules are located is able to be implemented such that the fact checking system is executed.

Examples of suitable computing devices include, but are not limited to a personal computer, a laptop computer, a computer workstation, a server, a mainframe computer, a handheld computer, a personal digital assistant, a pager, a telephone, a fax machine, a cellular/mobile telephone, a smart appliance, a gaming console, a digital camera, a digital camcorder, a camera phone, a smart phone/device (e.g., a Droid® or an iPhone®), a portable music player (e.g., an iPod®), a tablet (e.g., an iPad®), a video player, an e-reader (e.g., Kindle™), a DVD writer/player, an HD (e.g., Blu-Ray®) or ultra high density writer/player, a television, a copy machine, a scanner, a car stereo, a stereo, a satellite, a DVR (e.g., TiVo®), a smart watch/jewelry, smart devices, a home entertainment system or any other suitable computing device.

Figure 3:
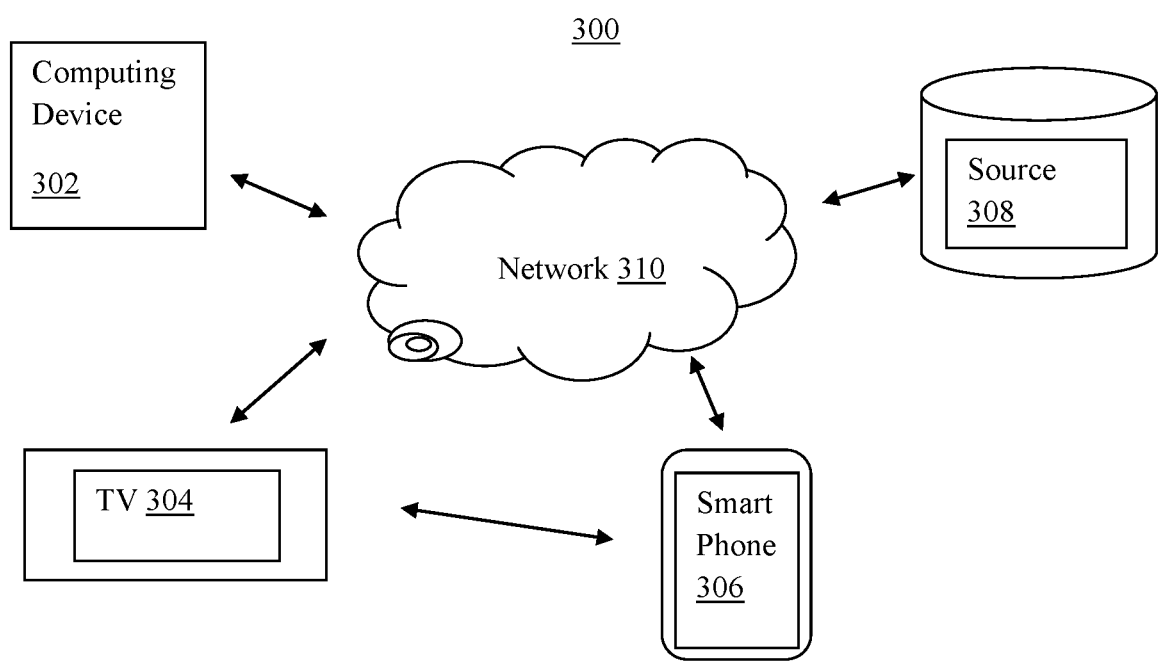
FIG. 3 illustrates a network of devices configured to implement fact checking according to some embodiments.

FIG. 3 illustrates a network of devices configured to implement fact checking according to some embodiments. The network of devices 300 is able to include any number of devices and any various devices including, but not limited to, a computing device (e.g., a tablet) 302, a television 304, a smart device 306 (e.g., a smart phone) and a source 308 (e.g., a database) coupled through a network 310 (e.g., the Internet). The source device 308 is able to be any device containing source information including, but not limited to, a searchable database, web pages, transcripts, statistics, historical information, or any other information or device that provides information. The network 310 is able to any network or networks including, but not limited to, the Internet, an intranet, a LAN/WAN/MAN, wireless, wired, Ethernet, satellite, a combination of networks, or any other implementation of communicating. The devices are able to communicate with each other through the network 310 or directly to each other. One or more of the devices is able to be an end user device, a media organization, a company and/or another entity. In some embodiments, peer-to-peer sourcing is implemented. For example, the source of the data to be compared with is not on a centralized source but is found on peer sources.

Social

In some embodiments, social fact checking is implemented. In some embodiments, only a user's content and/or sources and/or a user's contacts' content and/or sources are used for fact checking. The source information is able to be limited in any manner such as by generating a database and filling the database only with information found in the user's contacts' content/sources. In some embodiments, the social fact checking only utilizes content that the user has access to, such that content and/or sources of users of a social networking system who are not contacts of the user are not accessible by the user and are not used by the fact checking system. In some embodiments, source information is limited to social networking information such that the social networking information is defined as content generated by or for, stored by or for, or controlled by or for a specified social networking entity (e.g., Facebook®, Twitter®, LinkedIn®). The social network entity is able to be recognized by a reference to the entity being stored in a data structure. For example, a database stores the names of social networking entities, and the database is able to be referenced to determine if a source is a social networking source or not. In some embodiments, source information is limited to the social networking information that has been shared by a large number of users (e.g., over 1,000) or a very large number of users (e.g., over 1,000,000). The social networking information is able to be shared in any manner such as shared peer-to-peer, shared directly or indirectly between users, shared by sending a communication directly or indirectly via a social networking system. For example, source information is limited to only tweets, only tweets received by at least 100 users, only Facebook® postings that are viewed by at least 100 users, only Facebook® postings of users with 100 or more contacts, only users who are "followed" by 100 or more users, and/or any other limitation or combination of limitations. In some embodiments, source information is acquired by monitoring a system such as Twitter®. For example, microblogs (e.g., tweets) are monitored, and in real-time or non-real-time, the tweets are analyzed and incorporated as source information. Furthering the example, the tweets are processed (e.g., parsed), fact checked and/or compared with other information, and results and/or other information regarding the tweets are stored as source information. In some embodiments, the source information is limited to social networking information and additional source information. For example, source information is limited to social networking information and other sources with a reliability rating above 9 (on scale of 1 to 10). In another example, source information is limited to social networking information and specific sources such as encyclopedias and dictionaries. In some embodiments, the fact check occurs while the user is logged into the social networking system and uses the content accessible at that time.

In some embodiments, if a contact is invited but has not accepted, his content/sources are still used. In some embodiments, contacts are able to be separated into different groups such as employers, employees or by position/level (e.g., partners and associates), and the different groups are able to be used for fact checking. In some embodiments, only a user's friends' content and/or sources are used for fact checking. In some embodiments, multiple fact checks are implemented based on the groups (e.g., one fact checker including friends' information and a second fact checker including co-workers' information). In some embodiments, fact check results are sent to contacts (e.g., social network contacts) of a user. In some embodiments, fact check results are shared using social networking. For example, a user fact checks an advertisement or the advertisement is fact checked for a user, and the result is sent to and/or displayed for contacts in the social network. In some embodiments, users are able to select if they want to receive fact check results from contacts. In some embodiments, users are able to be limited to contacts where they only receive fact check results but do not have other access (e.g., no access to personal information). For example, a user watches a show which is fact checked. When misinformation is detected, the fact check result is sent to the user and his contacts (e.g., via a tweet). In some embodiments, only certain types of fact check results are sent to users (e.g., only lies and misinformation). The misinformation and lies are able to be determined in any manner. For example, misinformation is determined automatically by determining the factual accuracy of the information, and if the information is determined to be factually inaccurate, then it is misinformation. Lies are able to be determined by determining information is misinformation and analyzing intent. Intent is able to be analyzed in any manner, for example, context (e.g., additional information, a result) of a statement is analyzed to determine intent. Misinformation, lies and other characterizations are able to be determined using a look-up table which classifies and stores information as factually accurate, misinformation, lies, and/or other characterizations. In some embodiments, information is distinguished as misinformation or lies by manual review and/or crowdsourcing. For example, users are presented a comment including context (e.g., a video clip), and the users indicate if they think it is misinformation or an intentional lie, then based on the user selections, a result is indicated. In some embodiments, additional information is sent with the result to provide context such as a clip of the original content which had the misinformation or a link to the original content. In some embodiments, social information is stored/utilized in an efficient manner. For example, personal data is stored in a fastest access memory location, and non-personal information provided by a user on a social network is stored in a slower location. In some embodiments, information is further prioritized based on popularity, relevance, time (recent/old), and/or any other implementation.

Figure 4:
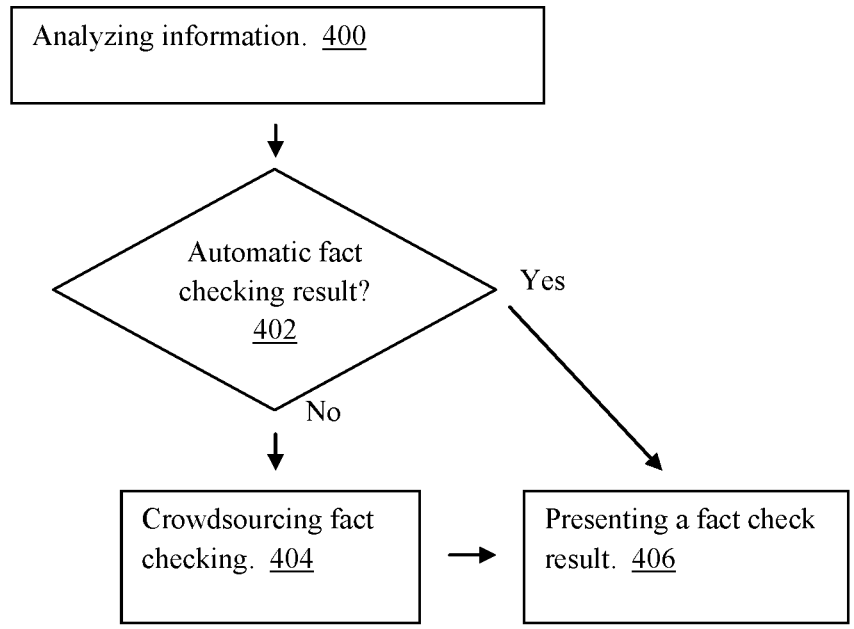
FIG. 4 illustrates a flowchart of a method of implementing social fact checking according to some embodiments.

FIG. 4 illustrates a flowchart of a method of implementing social fact checking according to some embodiments. In the step 400, information is analyzed. Analyzing is able to include monitoring, processing, and/or other forms of analysis. In the step 402, automatic fact checking is performed utilizing only social network information as source information. In some embodiments, the social network information is only social network information from contacts of the user (or contacts of contacts). In some embodiments, social network information is not limited to contacts of the user. In some embodiments, if the automatic fact checking fails to produce a result above a quality/confidence threshold, then manual crowdsourcing fact checking is implemented to generate a result, in the step 404. The manual crowdsourcing is implemented by providing/sending the information to be fact checked where many users are able to find the information, fact check the information and send a response which is used to generate a fact checking result. For example, 1000 users perform manual crowdsourcing fact checking, and 995 of the users send a response indicating the information is false, and the fact checking system generates a fact check result that the information is false. The fact check result is able to be determined in any way, for example, majority rules, percent above/below a threshold or any other way. In the step 406, the result is presented on the user's device. In some embodiments, fewer or additional steps are implemented. In some embodiments, automatic fact checking and crowdsourcing are performed in parallel. In some embodiments, an automatic result and crowdsource result are compared, and the result with a higher confidence score is used. In some embodiments, both results including the confidence score of each are provided. Confidence of a result is able to be determined in any manner; for example, based on how close source information is to the information, based on the number of agreeing/disagreeing sources, and/or any other manner. For example, if 99 sources agree with a statement (e.g., have the same text as the statement) and only 1 source disagrees with the statement (e.g., has text that indicates or means the opposite of the statement), then the confidence score is 99%.

In some embodiments, only sources that a user and/or a user's contacts (e.g., social network contacts) have approved/accepted/selected are used for fact checking. Users are able to approve/accept sources in any manner, such as clicking approve after visiting a website, or filling out a survey, or not clicking disapprove after visiting a website where the site is automatically approved by visiting, approving via social networking (e.g., receiving a link or site or content from a contact), by "liking" content, by sending a tweet with a hashtag or other communication with the source to approve, by selecting content (e.g., from list of selectable sources), using another social media forum (e.g., items/photos pinned on Pinterest are approved by that user, videos liked on Youtube are approved by those users) or any other implementation. In some embodiments, a source is approved if the source is fact checked by the user. In some embodiments, a source is approved if the source has been fact checked by another entity (e.g., automatically by fact checking system), and the user has verified or accepted the fact check results. In some embodiments, a user is able to designate an entity which approves/disapproves of sources for the user. For example, the user selects an automated approval/disapproval system which searches/crawls sources (e.g., databases, the Web), analyzes (e.g., parses) the sources, fact checks the sources, and based on the analysis and/or fact check results, approves/disapproves of the sources for the user. In some embodiments, a source is approved if the source is associated with an organization/entity that the user has "liked" (or a similar implementation), where associated means approved by, written by, affiliated with, or another similar meaning. In some embodiments, a site or other source information becomes an approved source if a user uses or visits the source. In some embodiments, a source is approved if a user uses or visits the source while signed/logged in (e.g., signed in to Facebook® or Google+®). In some embodiments, the user must be logged into a specific social networking system, and in some embodiments, the user is able to be logged into any social networking system or a specific set of social networking systems. In some embodiments, the sources are limited to a specific method of approval such as only sources visited while logged in. In some embodiments, a source is approved if the source is recommended to the user (e.g., by a contact) (even if the user does not visit/review the source), unless or until the user rejects/disapproves of the source. In some embodiments, sources are suggested to a user for a user to accept or reject based on contacts of the user and/or characteristics of the user (e.g., location, political affiliation, job, salary, organizations, recently watched programs, sites visited). In some embodiments, the contacts are limited to n-level contacts (e.g., friends of friends but not friends of friends of friends). In an example, user A approved source X, and one of his contacts approved source Y, and another contact approved source Z. So only sources X, Y and Z are used for fact checking content for user A. Furthering the example, since user A's sources may be different than user J's sources, it is possible to have different fact checking results for different users. In some embodiments, users are able to disapprove sources. In some embodiments, if there is a conflict (e.g., one user approves of a source and a contact disapproves of the same source), then the choice of the user with a higher validity rating is used. In some embodiments, if there is a conflict, the selection of the contact with the closer relationship to the user (the user being interpreted as the closest contact) is used. In some embodiments, if there is a conflict and multiple users approve/disapprove, then the higher of the number of approvals versus disapprovals determines the result (e.g., 2 users approve Site X and 5 users disapprove Site X, then Site X is not used). In another example, if 50 contacts approve Web Page Y, and 10 contacts disapprove Web Page Y, then Web Page Y is approved. Again, depending on the contacts, the fact check results could be different for different users. Furthering the example, User A has 50 contacts that approve Web Page Y, and 10 that disapprove. However, User B has 5 contacts that approve Web Page Y, and 20 contacts that disapprove Web Page Y. Therefore, Web Page Y is approved for User A and disapproved for User B. In some embodiments, users are able to approve/disapprove sources in clusters, and users are able to cluster sources. In some embodiments, users are able to share/recommend sources to contacts (e.g., via a social networking site). For example, user A says, "I've grouped these sources; I think they are all legit," and the contacts are able to accept or reject some/all of the sources. In some embodiments, to generate viral approvals/disapprovals, when a user approves or disapproves of a source or a group of sources, the source (or references to the source, for example, a link to the source) and the approval or disapproval are automatically sent to contacts of the user (or up to nth level contacts of the user, for example, contacts of contacts of the user). Similarly, when contacts of a user approve/disapprove a source, the source or reference and approval/disapproval are automatically sent to the user. In some embodiments, when a user approves/disapproves of a source, the source is automatically approved/disapproved for contacts. In some embodiments, the contacts are able to modify the approval/disapproval; for example, although the user approved a source, Contact X selects to disapprove the source, so it is not an approved source for Contact X. Similarly, when contacts approve/disapprove a source, the source is automatically approved/disapproved for the user unless the user modifies the approval/disapproval. In some embodiments, users are able to limit the automatic approval to nth level contacts (e.g., only 1st and 2nd level contacts but no higher level contacts). In some embodiments, all sources or a subset of sources (e.g., all sources including social networking content generated by users while logged into a social networking site) are approved until a user disapproves of a source (or group of sources), and then that source (or group of sources) is disapproved. In some embodiments, sources are approved based on a tweet and a hashtag. For example, a user tweets a message with the name of a source preceded by a hashtag symbol. In another example, a user tweets a message with a link to a source or a name of a source and "# fcapproval" or "# fcdisapproval" or similar terms to approve/disapprove a source. In some embodiments, sources are approved based on content watched (e.g., on television, YouTube), items purchased, stores/sites shopped at, and/or other activities by the user. For example, the user watches Program X which uses/approves sources A, B and C for analyzing/determining content, so those sources automatically become approved for the user. In some embodiments, the sources are approved only if the user "likes" the show or if it is determined the user watches the show long enough and/or enough times. For example, a counter tracks how long the user watches a show, and if/when the counter goes above a threshold, the sources affiliated with/related to the show are automatically approved. In some embodiments, sources are linked so that if a user approves a source, any source that is linked to the source is also approved automatically. In some embodiments, the linked sources are required to be related (e.g., same/similar genre, same/similar reliability rating). For example, a user approves Dictionary A which is linked to Dictionary B and Dictionary C, so Dictionaries A, B and C, all become approved when the user approves Dictionary A. In some embodiments, the linked sources are displayed for the user to select/de-select (e.g., in a pop-up window). In some embodiments, approval/disapproval of sources is transmitted via color-coded or non-color-coded messages such as tweets, text messages and/or emails. In some embodiments, approvals/disapprovals are transmitted automatically to contacts of the user upon approval/disapproval. In some embodiments, when a user is about to approve/disapprove a source, an indication of what others (e.g., contacts or non-contacts of the user) have selected is presented. For example, the user visits Webpage Z, and in the bottom corner of the browser (or elsewhere), it is displayed that Contact J disapproved this source. In some embodiments, all sources are accepted except ones the user manually rejects. In some embodiments, sources are able to be selected by sensing a user circling/selecting icons or other representations of the sources. In some embodiments, sources are approved by bending a flexible screen when the source is on the screen. For example, a bend is detected by detecting pressure in the screen or in another manner, and the device determines the current source being displayed. In some embodiments, sources are selected based on an entity. For example, a user specifies to use Fox News's content and sources as approved sources. In some embodiments, any content/sources that Fox News disapproved is also recognized as disapproved for the user. In some embodiments, users are able to combine entities and their sources; for example, a user selects to use Fox News content/sources and CNN content/sources. If there are any conflicts, such as Fox News approving Source X and CNN disapproving Source X, the conflicts are able to be handled in any manner such as those described herein. In some embodiments, the user handles the conflicts by selecting approve/disapprove of each conflicting item or selects a preferred entity (e.g., if conflict, prefer CNN, so CNN's selections are chosen). In some embodiments, sources are received from/by others, and the sources are filtered based on personal preferences, characteristics, and/or selections such that only sources satisfying preferences are accepted automatically and others are rejected or placed on hold for approval. For example, User A is a very liberal person as determined based on viewing and reading habits, so when User G sends three sources that he thinks User A should approve, two of the three sources are classified as liberal, so they are automatically approved for User A, and the third source is classified as conservative, so it is placed in a queue for User A to review and approve/disapprove. In some embodiments, sources are approved by detecting a user in a specified location. For example, the device determines that it is at or is detected at a political rally. The content/sources of the politician holding the rally are automatically approved for the user or are presented for the user for manual approval. In some embodiments, content/sources of the opponent of the politician are automatically disapproved (unless they had previously been approved; for example, by detecting them as already approved by the user). In some embodiments, when a device determines that it is within range of another user (e.g., by facial recognition) or another user's device (e.g., by detecting device ID or user ID), the approved/disapproved sources and their approval/disapproval status is provided on the device. In some embodiments, user's are able to limit their approval/disapproval information (e.g., only contacts are able to view). In some embodiments, sources are approved by waving a device at a source. For example, RFID or another technology is used to determine what sources are in close proximity (e.g., user waves smart phone in a library, and the books become approved sources for the user). In some embodiments, in addition to or instead of accepting/rejecting sources, users are able to set/select any other option regarding fact checking implementations such as which content to monitor, keywords for monitoring, how content is processed, weighting schemes for sources, priorities, and/or any other fact checking implementation option.

In some embodiments, a source is approved based on the reliability rating of the source and the approvals/disapprovals of the source. For example, a source is approved if the reliability rating and the approvals total above a threshold. In another example, a reliability rating is increased by 1 (or another number) if the number of approvals is greater than the number of disapprovals, and the reliability rating is decreased by 1 (or another number) if the number of approvals is not greater than the number of disapprovals, and then the source is approved if the modified reliability rating is above a threshold. In another example, the reliability rating is added to the number of approvals divided by the number of disapprovals divided by ten or the number of approvals plus the number of disapprovals, and then the modified reliability rating is compared with a threshold, and if the modified reliability rating is above the threshold, then the source is approved. In another example, the reliability rating is multiplied by the number of approvals divided by the number of disapprovals with a cap/maximum total (e.g., 10), and then the modified reliability rating is compared with a threshold, and if the modified reliability rating is above the threshold, then the source is approved. Any calculation is able to be implemented to utilize the reliability rating, approvals and disapprovals to determine if a source is approved for fact checking. In some embodiments, weights are added to the calculations; for example, a user's approval/disapproval is given extra weight. For example, reliability rating+user's approval/disapproval (+2/−2)+contacts' approvals/disapprovals (+1/−1).

In some embodiments, social networking teams/groups are able to be set up for fact checking such that each member of a team approves, disapproves, and/or rates sources for fact checking. In some embodiments, each member of a team rates/selects other options regarding fact checking as well such as monitoring criteria, processing criteria and/or other criteria, and the selections are used to determine how to fact check information. For example, three members of a team select to parse after every pause in the monitored information of two seconds, and two members select to parse after every 10 seconds, so the selection of after every pause of two seconds is used. In some embodiments, social network groups' fact checking results are compared to determine the most accurate group. For example, Groups A, B and C are compared, and the group with the most correct results is considered to be the most accurate group. Furthering the example, a set of data is fact checked using Group A's sources, Group B's sources, and Group C's sources, and then the fact checking results are analyzed automatically, manually or both to determine the most accurate fact checking results. Furthering the example, Group A's results were 80% accurate, Group B's results were 95% accurate, and Group C's results were 50% accurate, so Group B was the most accurate. The groups' results are able to be compared automatically, manually or both. For example, if groups' results match similar to the automatic fact checking system results, the groups' results are determined to be accurate. In another example, a group's results are analyzed manually (e.g., by a group of impartial individuals) and manually compared with an automated fact checking system's results or other groups' results. Furthering the example, the sources selected/approved by a group are used to automatically fact check content, and the results of those fact checks are manually or automatically compared with automatic fact check implementations using different sources or other groups' implementations. In some embodiments, the groups are ranked by accuracy. In some embodiments, the most accurate groups' sources (e.g., top 10 groups) are made public and/or selectable by other users, and/or the most accurate groups' sources are sent via social media (e.g., tweeted or posted) to other users with an option to accept/reject.

Rating sources includes providing a reliability rating of a source, a validity rating of a source, fact checking a source, and/or any other rating. For example, a user of a team rates an opinion blog as a 1 out of 10 (1 meaning very factually inaccurate), and then the opinion blog is fact checked utilizing an automatic fact checking system (or manually) which determines the content of the opinion blog is mostly factually inaccurate, so the automatic fact checking system gives a rating of 1 as well. In some embodiments, users of teams do not specify a rating number for a source; rather, the users of the teams approve/disapprove/select sources, and the team with the most accurate sources (e.g., in number and/or in accuracy) is considered to be the most accurate team. In some embodiments, "accurate" such as an accurate source is defined as having a reliability or accuracy rating above a threshold (e.g., above 8 on a scale of 1 to 10 with 10 being the most accurate), and the reliability/accuracy rating is able to be based on how accurate the information is; for example, the information is fact checked (automatically and/or manually) and based on the fact check, the reliability/accuracy rating is determined. Furthering the example, if the fact check returns "factually accurate" for all segments of information, then the information receives a 10 for accuracy, and if the fact check returns "factually inaccurate" for all segments of the information, then the information receives a 0 for accuracy. In some embodiments, sources are manually analyzed to determine a reliability/accuracy rating. In an example of teams with the most accurate sources, a team with 1 source that is fact checked by a fact checking system and determined to be a reliability rating of 10, is considered to be less accurate than a team with 10 sources that all have a reliability rating of 10. In other words, accuracy and breadth of the sources are taken into account to determine the team with the best sources. In some embodiments, the sources are classified, and breadth is determined not just by quantity of sources but also by the number classes the sources fall into. For example, 100 sources in a single classification (e.g., sports history) are not as accurate as 100 sources in 10 classifications. In some embodiments, the opposite is true. For example, a large number sources in a single classification would ensure a fact check using those sources would be accurate, and a source collection that is very broad would not necessarily help. Furthering the example, if the fact checking system is fact checking the first team to win back to back Super Bowls, a set of sources which include a medical encyclopedia and a french dictionary would not be better than a set of sources that focuses on sports. In some embodiments, accuracy is given more weight, and in some embodiments, breadth is given more weight. For example, in some embodiments, a set of 100 sources with an average reliability rating of 9 is better than a set of 1000 sources with an average reliability rating of 8. In some embodiments, the set of 1000 sources is considered better even though the reliability rating is slightly lower, since more information may be able to be fact checked with the larger breadth. In some embodiments, both sets are available and used for fact checking, and whichever one returns with a higher confidence score is used to provide a status of the information being fact checked.

Figure 5:
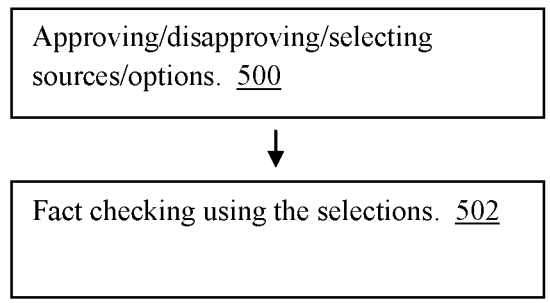
FIG. 5 illustrates a flowchart of a method of utilizing social network contacts for fact checking according to some embodiments.

FIG. 5 illustrates a flowchart of a method of utilizing social network contacts for fact checking according to some embodiments. In the step 500, users approve or disapprove sources or other features/options/elements for fact checking. In the step 502, fact checking is implemented (e.g., monitoring, processing, fact checking and/or providing a result). In some embodiments, additional or fewer steps are implemented.

In some embodiments, sources are weighted based on the number of users that have accepted/rejected them. For example, a dictionary that has 1000 accepts and 0 rejects is rated higher than a biased site which has 5 accepts and 900 rejects. In some embodiments, this is a factor used in conjunction with other weighting systems. For example, a fact check is performed on sources to generate a reliability rating, and the accept/reject weighting is an additional factor for determining a final reliability rating (e.g., reliability rating+/−accept/reject weighting=final reliability rating).

In some embodiments, users in a social network are grouped/have different levels (e.g., media, business level, regular user, politician) which affects the weight of the sources. For example, a media level source is given a higher weight than a regular user source.

In some embodiments, the weight of the source is utilized in fact checking such that higher weighted sources have more influence on a fact check result. For example, a calculation in determining a fact check result includes: determining the number of agreeing highest weighted sources which is multiplied by the highest weight value, determining the number of agreeing second highest weighted sources which is multiplied by the second highest weight value, and so on until determining the number of agreeing lowest weighted sources which is multiplied by the lowest weight value. Then, the results are combined to determine a total value, and if the total value is above a threshold, then the information being fact checked is determined "confirmed," and if the total value is not above the threshold, then the information is "unconfirmed" or "disproved." In another, example, the weights are applied to disagreeing sources, and if the total value is above a threshold, then the information is "disproved," or if the total value is not above the threshold, then the information is "confirmed." In yet another example, the weighted agreeing and disagreeing values are combined or subtracted, and if the result is above a threshold, then "confirmed" and if not, then "disproved."

In some embodiments, users' sources are weighted based on "tokens" or user validity ratings (e.g., the higher the validity rating or higher number of tokens earned, then the higher the source weight).

In some embodiments, emails or other messages are sent to contacts with fact check result updates. For example, an email is automatically sent when a contact's validity rating drops below a threshold. Other forms of communication are possible such as a tweet, text message, or instant message.

In some embodiments, people are fact checked to confirm they are who they say they are. For example, when a person registers for a social networking site, the person is verified by fact checking. A user is able to be verified in any manner, such as: comparing the user information with another social networking site, comparing the user information with an online resume, using IP address location information, using past history information, comparing a past photograph of the user with a current photograph or a video scan (e.g., using a webcam), analyzing school information, analyzing work information, analyzing professional organization information, and/or analyzing housing information.

In some embodiments, when users attempt to connect (e.g., when a user asks to join a user/friend's network or when a user is asked to join another user's (e.g., friend) network), a question is asked. For example, the user asks the friend a question, and the user determines if the answer is correct or not, which determines if the friend is accepted into the network or not. In another example, the friend asks the user a question, and the friend determines if the answer is correct or not, which determines if the user is accepted into the network or not. In some embodiments, for efficiency, the user asks a generic/broad question that is able to be applied to many users, so the user does not have to generate specific questions for each user. For example, "what high school did we go to?". In some embodiments, when a user makes an invitation to a second user, the user inputs a question for the second user to answer. In some embodiments, instead of or in addition to a user asking a question, the second user (or invitee) simply sends a personal message that informs the user that the second user is, in fact, who he says he is. For example, the invitee accepts the invitation, and also makes a comment, "I remember that weird painting of the dog in your dorm room at Stanford." Then, the user either accepts or rejects the second user. In some embodiments, a user is allowed to "connect" to another user but with limited access until he is verified.

Figure 6:
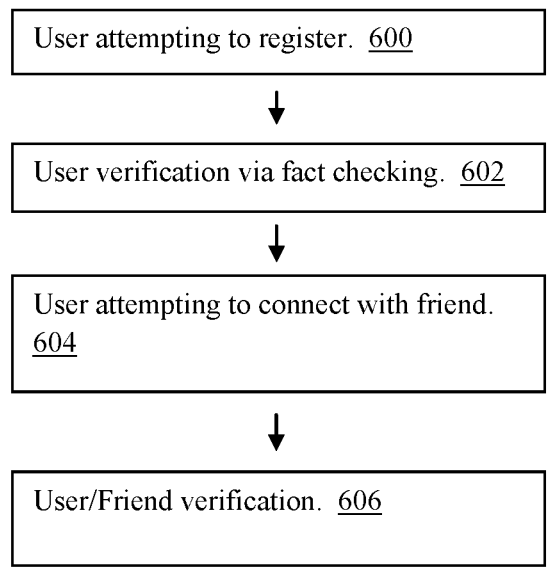
FIG. 6 illustrates a flowchart of a method of fact checking a user for registration according to some embodiments.

FIG. 6 illustrates a flowchart of a method of fact checking a user for registration according to some embodiments. In the step 600, a user attempts to register (e.g., with a social networking site/system or a second social networking site/system). In the step 602, the user is verified using fact checking. In the step 604, the user attempts to connect with a friend. In the step 606, user/friend verification occurs. In some embodiments, fewer or additional steps are implemented.

In some embodiments, after a web page, tweet, and/or any other content is fact checked, the fact check result and any identifying information (e.g., the parsed segment) is stored and used as source information, or stored in a manner that is easily retrievable for future displays of results. In some embodiments, the results are stored in a cache or other quickly accessible location. In some embodiments, the results are stored in a script (e.g., javascript) with the web page or coded in the web page, or another implementation.

Validity Rating and Web

In some embodiments, an entity including, but not limited to, a speaker, author, user, or another entity (e.g., corporation) has a validity rating that is included with the distribution of information from him/it. The validity rating is able to be based on fact checking results of comments made by an entity or any other information. For example, if a person has a web page, and 100% of the web page is factually accurate, then the user is given a 10 (on a scale of 1 to 10) for a validity rating. In another example, a user tweets often, and half of the tweets are factually accurate and half are inaccurate, the user is given a 5. The validity rating is able to be calculated in any manner. In addition to fact checking information by an entity, items such as controversies, bias, and/or any other relevant information is able to be used in calculating a validity rating. The severity of the information or misinformation is also able to be factored in when rating a person or entity. Additionally, the subject of the information or misinformation is also able to be taken into account in terms of severity. In some embodiments, an independent agency calculates a validity rating and/or determines what is major and what is minor. In some embodiments, individual users are able to indicate what is important to them and what is not. In some embodiments, another implementation of determining what is major, minor and in between is implemented. The context of the situation/statement is also able to be taken into account. In some embodiments, entities are able to improve their validity rating if they apologize for or correct a mistake, although measures are able to be taken to prevent abuses of apologies. In some embodiments, in addition to or instead of a validity rating, an entity is able to include another rating, including, but not limited to, a comedic rating or a political rating. In some embodiments, an entity includes a classification including, but not limited to, political, comedy or opinion. Examples of information or statistics presented when an entity appears include, but are not limited to the number of lies, misstatements, truthful statements, hypocritical statements or actions, questionable statements, spin, and/or any other characterizations.

Figure 7:
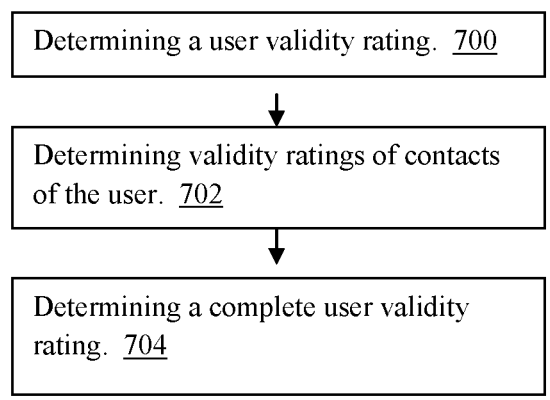
FIG. 7 illustrates a flowchart of a method of determining a validity rating based on contacts' information according to some embodiments.

FIG. 7 illustrates a flowchart of a method of determining a validity rating based on contacts' information according to some embodiments. In the step 700, a user's validity rating is determined or acquired. In the step 702, the user's contacts' validity ratings are determined or acquired. In the step 704, a complete user's validity rating is determined based on the user's validity rating and the contacts' validity ratings. In some embodiments, additional or fewer steps are implemented and/or the order of the steps is modified. For example, the steps are continuously ongoing such that if anything changes in either the user's validity rating or the contacts' validity ratings, then new ratings, including a new complete validity rating, are computed.

In some embodiments, relationship information is utilized in fact checking. For example, if a user's contacts have low entity/validity ratings, then that information negatively affects the user's entity rating. For example, a user's base validity rating is a 7 out of 10 based on fact checking results of the user's comments. Based on social networking relationships, the user has 4 friends/contacts with 1 degree of separation from the user, and each of those friends has a 2 out of 10 validity rating. If the user's validity rating is calculated as Final Validity Rating=(Base Validity Rating*10+Average Friend Validity Rating*5)/15, then the Final Validity Rating=(7*10+2*5)/15=5.3. In another example, the user's validity rating is calculated as Final Validity Rating=(Base Validity Rating*10+Average Friend Validity Rating*# of friends)/(# of friends+10), then the Final Validity Rating=(7*10+2*4)/(4+10)=5.6. In some embodiments, contacts with additional degrees of separation are utilized in determining the user's validity rating. In some embodiments, the additional degrees of separation are weighted less, and the weighting decreases as the degree of separation increases. For example, a user's validity rating is 7, 4 friends have validity ratings of 2, and 2 friends of friends have validity ratings of 6. If the user's validity rating is calculated as Final Validity Rating=(Base Validity Rating*10+Average Friend Validity Rating*5+Average Second Degree Friend Validity Rating*2)/17, then the Final Validity Rating=(7*10+2*5+6*2)/17=5.4.

In some embodiments, a web of lies/misinformation/other characterization is generated. A web is able to be generated by fact checking information and determining the relationship of who said what and when. Once information is determined to be misleading, analysis is performed to determine who provided the information, and then analysis is determined if anyone provided the information before, and relationships are determined based on the time/date of the information and/or if there is any connection between those providing the information. For example, the web of misinformation includes a graphic of who spreads misinformation. Each point in the web is able to be an entity or information. For example, a set of Republicans who made the same lie are included in the ring with the misinformation shown in the middle. In another example, the web is a timeline version where the web shows who first said the lie, and then who repeated it. In some embodiments, times/dates of when the misinformation was said or passed on is indicated. In some embodiments, the first person to say the lie is given more negative weight (e.g., for validity rating) as they are the origin of the lie. In another example, a tree structure is used to display the connections of lies. Although specific examples have been provided, there are many different ways of storing the information and showing who provided the information. The web is able to be displayed for viewers to see who says the same information or agrees with a person. The web is shown when the misinformation is detected or when one of the people in the web is detected. For example, commentator X provided misinformation, and 5 people also provided the same misinformation. When commentator X is detected (e.g., voice or facial recognition), a graphic is presented showing the 5 additional people who provided the same misinformation as commentator X.

FIG. 8 illustrates an exemplary web of lies according to some embodiments. In the web shown, a first level provider 800 of misinformation is shown in the middle of the web. Second level 802 and third level 804 misinformation providers are also shown further out in the web.

FIG. 9 illustrates an exemplary web of lies in timeline format according to some embodiments. In the timeline format of the web, a first provider 900 of misinformation is shown, followed by a second provider 902, third provider 904, fourth provider 906, and fifth provider 908.

The web is also able to be used to generate relationships between entities. For example, user A says, "global warming is a hoax." Then, users who have made a similar or the same comment (e.g., on their Facebook® page, personal website, on a message board, in a tweet) are recommended to connect/join in a social network. Same or similar phrases are detected in any manner such as word/keyword comparison, and then a message or any communication is sent to users that have provided the same/similar phrase. Furthering the example, a popup is displayed on the user's social network page that provides a list of users who have made the same or a similar comment, and the user is asked if he wants to invite the other users to join his network or to join their networks. In some embodiments, a message/tweet is sent to both asking if they want to "connect." In some embodiments, when misinformation is detected in a person's comment, a message is sent to users in network saying this person said that and the fact check result shows it to be wrong.

In some embodiments, entity/validity ratings are based on relationships with other entities (including the web described above). The relationships are able to be based on same cable network or same company. Using the web above, for example, if entities say the same misinformation, they become linked together or connected and their ratings become related or merged.

In some embodiments, a user whose validity rating is below a lower threshold is automatically de-friended/disconnected/de-linked. In some embodiments, others are prompted with a question if they would like to disconnect from the user whose validity rating is below a lower threshold. In some embodiments, the user with a low validity rating is put in "time out" or his status remains a friend but a non-full friend status. For example, although the user with the low validity rating is connected, he is not able to comment on a connected user's page. In another example, the capabilities of the user are limited on a social networking site if his validity rating drops below threshold.

FIG. 10 illustrates a flowchart of a method of affecting a user based on a validity rating according to some embodiments. In the step 1000, a validity rating of a user is determined to be below a threshold. In the step 1002, the user is affected; for example, the user's access to web pages (e.g., social network) is restricted. In some embodiments, additional or fewer steps are implemented.

In another example, related to the web of lies, people are grouped (e.g., become contacts) if they send/say the same misinformation (may not even know each other, but if they say "global warming is a hoax," they join the same contacts as others who said same thing). In some embodiments, people who use the same phrase or quote (not necessarily misinformation) become friends or are asked if they would like to become friends as someone who said the same thing. In some embodiments, users with the same or similar validity rating are connected or asked if they would like to connect.

FIG. 11 illustrates a flowchart of a method of connecting users based on similar content and/or validity rating according to some embodiments. In the step 1100, information is compared to determine a match. For example, user comments are compared to determine if they have said the same thing such as "49ers rule!". In some embodiments, only misinformation or other negative characteristic comments are compared. For example, a database stores comments that have been fact checked and deemed inaccurate as well as the user that made the comment. Then, those comments are compared to determine if there are any matches between users. In some embodiments, user validity ratings are compared as well. In some embodiments, users are grouped by validity rating (e.g., validity rating is stored in a database and sortable by validity rating). In some embodiments, the validity ratings are exactly matched (e.g., all users with a validity rating of 7.0 are matched), and in some embodiments, ranges of validity ratings are matched (e.g., all users with a 7.0 to 7.5 are matched). In some embodiments, opposite comments are searched for. For example, a comment that says "raising taxes hurts the economy" and an opposite comment of "raising taxes helps the economy." These comments are able to be considered an opposite match, which can then be used to join people with opposing views. In the step 1102, users with matching comments and/or validity ratings are "connected" or asked if they would like to "connect" (e.g., join each others social network). In some embodiments, the steps occur in real-time; for example, immediately after the user tweets, "49ers rule!," connection suggestions are presented based on the implementation described herein. Additional information is able to be provided to the users such as the matching comment, the validity rating of the other user, and/or any other information. In some embodiments, additional or fewer steps are able to be implemented.

Additional Implementations

In some embodiments, mapping information is fact checked. For example, a camera device (e.g., augmented reality camera or vehicle camera) is used to confirm traffic information on a map. Furthering the example, if a map indicates that traffic is going "fast" (e.g., over 50 mph), yet a vehicle camera indicates the traffic is stopped, then an alert indicating the fact check result of "bad traffic information" is able to be presented. In another example, if a map indicates the traffic a certain way, but a user's GPS (e.g., stand alone device or smart phone GPS) indicates traffic differently, then an alert is provided to other users. In another example, accident information is fact checked by comparing news information and/or police reports. In some embodiments, based on the fact check result, a corrected route is provided. For example, after fact checking a route, it is determined the traffic is not bad for a particular road that was supposedly bad, so the route now includes that road. Fact checking of the mapping information is able to occur periodically, when new information becomes available, or at any other time. In some embodiments, mapping information from different sources is compared. For example, G Maps indicates that traffic is flowing at 65 mph; however, A Maps shows that traffic is only going 35 mph. The information from each source is compared (e.g., determine any differences), and analysis is performed to determine which is more accurate. For example, verification of either is searched for using direct knowledge (e.g., using vehicle camera or a camera positioned on the side of the road or elsewhere to view traffic). Or a news organization is contacted for additional information. In some embodiments, the mapping information and fact checking results are shared among contacts in a social network. In some embodiments, the mapping information is fact checked using social networking source information (e.g., information from contacts). In some embodiments, flying devices (e.g., drones) are utilized to provide information for fact checking. For example, the drones take images and/or videos of traffic conditions and provide the images and/or videos as source information for comparison. In some embodiments, when an accident or other traffic issue occurs, a drone is able to be automatically directed to verify the issue by flying over to the area and acquiring information. For example, a user texts that an accident has occurred on Interstate X. The drone automatically receives/retrieves this information, and flies into position to take pictures of the location including traffic analysis. In another example, a device (e.g., a user's mobile device or a vehicle device) determines that user's vehicle is moving much slower than the speed limit, so the device automatically communicates with a drone (either directly or through a server), and the drone utilizes GPS information of the vehicle to move into position to analyze the traffic issues. The information acquired by the drone is then dispersed to be used as source information. In some embodiments, a server automatically determines the nearest drone to the position of the user device, and directs only that drone to move to acquire information.

Figure 12:
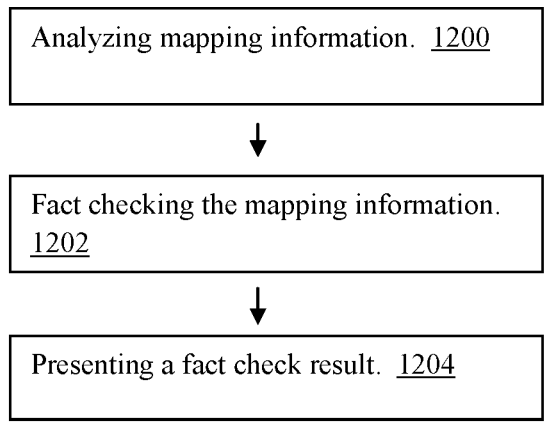
FIG. 12 illustrates a flowchart of a method of fact checking mapping information.

FIG. 12 illustrates a flowchart of a method of fact checking mapping information. In the step 1200, mapping information is analyzed (e.g., monitored and processed). In the step 1202, the mapping information is fact checked. In the step 1204, a fact check result is presented. In some embodiments, fewer or additional steps are implemented.

In some embodiments, an icon changes from a happy face to a sad face as misinformation is given by an entity. In some embodiments, an image of a person is changed from smiling to sad/angry. The fact checking system collects 2 to 5 different images of the person by detecting the person (e.g., facial recognition). Then, the system searches/crawls the web for pictures of the person using templates of smile, frown, angry face, tears, tense, stoic, neutral to do the searching. The appropriate pictures are retrieved and stored. The appropriate image is displayed when the misinformation calculation result is in range. For example, when zero misinformation is detected, a smiling face is displayed, and when 3-6 misinformation comments are detected the face displayed is a frowning face, and above 6 is a crying face. In some embodiments, tears or other items are added to an image if the image cannot be found. For example, a sad image cannot be found, so tears are added to a neutral image that was found.

Figure 13:
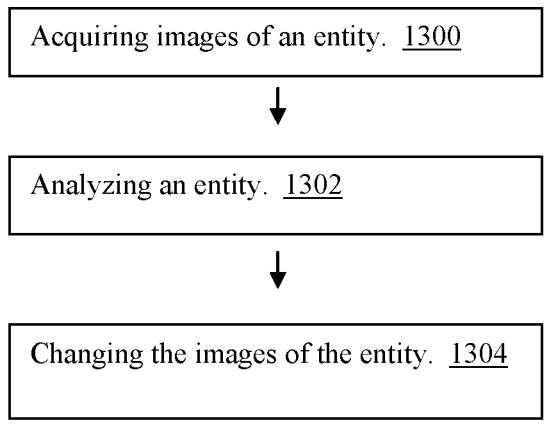
FIG. 13 illustrates a flowchart of a method of using an icon to indicate a validity rating or the validity of information provided by an entity according to some embodiments.

FIG. 13 illustrates a flowchart of a method of using an icon to indicate a validity rating or the validity of information provided by an entity according to some embodiments. In the step 1300, one or more images of an entity are acquired. In the step 1302, the entity's validity rating is determine or the validity of the entity's comments is analyzed. In the step 1304, as the entity's validity rating changes or the validity of the entity's comments are analyzed, the image presented changes. In some embodiments, additional or fewer steps are implemented.

In some embodiments, medallions/medals, tokens, ranks, points, and/or other awards/honors are provided based on user fact checking actions. For example, a user is awarded a different token for providing an accurate fact check result for different items. Furthering the example, a user receives a "donkey" token for fact checking an item from a member of the Democratic party, and an "elephant" token for fact checking an item from a member of the Republican party. In some embodiments, the item has to be an item not previously accurately fact checked (for example, a comment by the President previously not fact checked). In some embodiments, the fact check result is verified automatically, manually or a combination of both. In some embodiments, the user provides the fact checked comment or identification information of the comment as well as support for the fact check result (e.g., a website confirming or disproving the comment). In some embodiments, the user must perform a specified number of fact checks before receiving a token (e.g., 5 fact checks of Democrats to receive a "donkey" token). Additional tokens are able to include, but are not limited to: a "donk-phant" for fact checking both Democrats and Republicans, a "prez" token for fact checking the President, a "sen" token for fact checking a member of the Senate, a "house" token for fact checking a member of the House of Representatives, and a "news" token for fact checking a newscaster. In some embodiments, there are different levels of tokens. For example, one level of tokens is for actually fact checking, and a second level is for merely flagging content as false, questionable, or another characterization, and when the content is fact checked, a user is rewarded for being accurate. For example, if a user flags a comment as questionable, and then the comment is proven to be false, the user is awarded one point towards five points to obtain a second-level token. In some embodiments, a user is penalized (e.g., points lost or demoted) for incorrectly flagging an item and/or providing an incorrect fact check result.

Figure 14:
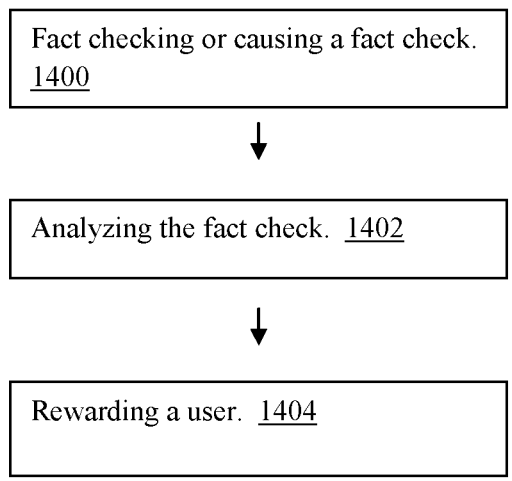
FIG. 14 illustrates a flowchart of a method of awarding honors for fact checking according to some embodiments.

FIG. 14 illustrates a flowchart of a method of awarding honors for fact checking according to some embodiments. In the step 1400, a user fact checks or causes (e.g., flags) information to be fact checked. In the step 1402, the user fact check or flag is analyzed/verified. In the step 1404, the user is rewarded for a valid fact check. In some embodiments, fewer or additional steps are implemented.

In some embodiments, as a user acquires tokens, his label/title changes. For example, the user begins as a level 1 fact checker and is able to increase to reach a level 10 fact checker if he acquires all of the possible tokens. In some embodiments, users are able to specify the type of label/title they receive. For example, users are able to specify "middle ages" which begins the user as a "peon" and goes up to "king." Other examples include, but are not limited to: Star Wars (ewok to jedi knight or storm trooper to sith lord (good/evil)), police (recruit to chief), military (cadet to captain), political (mayor to president). By enabling the user to specify the set of labels or titles, additional enjoyment occurs for the user. In some embodiments, a set of labels or titles is generated for a group (e.g., social network group). For example, user X generates a football-labeled fact checking group which starts users as "punters" with the goal of becoming a "quarterback."

In some embodiments, the label/title is based on the tokens, validity rating and/or other fact checking. A user's label/title is able to move up or down based on the acquired tokens, validity rating and/or other fact checking. For example, if a user acquires several tokens, but then provides misinformation several times, a token is able to be taken away. In some embodiments, users are provided additional features or benefits for a higher label/title. For example, a user with a level 8 fact checker label is provided contact information of several members of the news media, whereas a level 1 fact checker is not provided this information. Other benefits, awards and/or rewards are able to be provided, such as monetary or item prizes. In some embodiments, the label/title is able to be used as a filtering tool for searches (e.g., employee searches by employers). For example, an employer is able to search for candidates with "computer engineering skills" and "at least level 5 fact checker."

In some embodiments, users are rewarded for providing factually accurate information. For example, if a user tweets 100 times (and each of the tweets if fact checked by a fact checking system), the user receives a reward such as a token or any other reward. In some embodiments, the information fact checked has to meet a specified criteria to qualify for counting toward the reward. For example, the user is not able to tweet a well known fact 100 times and receive a reward. In some embodiments, steps to prevent cheating are implemented (e.g., monitoring for redundancy). In some embodiments, the information provided by the user has to be directed to a specific topic (e.g., politics). In some embodiments, the information provided by the user needs to include a keyword to be fact checked to receive a reward. In some embodiments, only information with a specific label (e.g., hashtag) is fact checked and count towards a reward.

In some embodiments, fact check swarms are able to be implemented. Using social media (e.g., Twitter®), one or more users are able to encourage and/or trigger a fact check swarm such that many users attempt to fact check information (e.g., a speech). Those that participate in the fact check swarm are able to be recognized, awarded a prize, or provided another benefit. For example, a user sends a tweet with a specific hashtag and/or other information regarding information to fact check swarm. The users who receive the tweet are then able to participate in the fact check swarm by researching elements of the information and providing fact check results related to the information (e.g., by tweeting a snippet, a fact check result, and a cite to source(s) for the result). The users in the swarm are then able to agree or disagree with the result. If enough (e.g., above a threshold) users agree with the result, the result is accepted and presented (e.g., tweeted or displayed on a television) to users outside of the social network.

Figure 15:
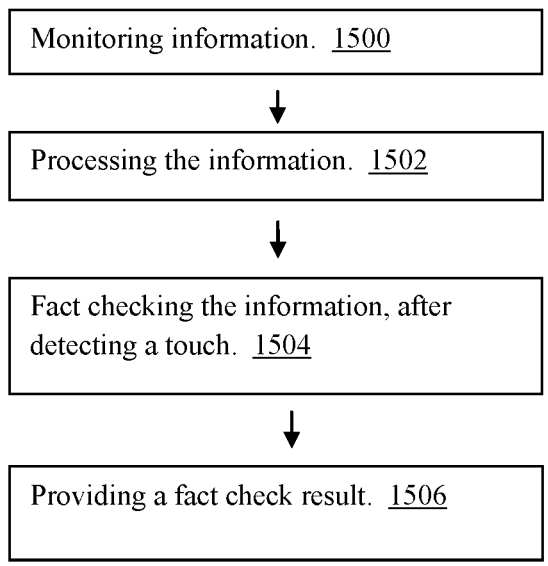
FIG. 15 illustrates a flowchart of a method of touchscreen fact checking according to some embodiments.

FIG. 15 illustrates a flowchart of a method of touchscreen fact checking according to some embodiments. In the step 1500, information is monitored. In the step 1502, the information is processed. In the step 1504, the information is fact checked, after detecting a touch of the touchscreen (or a button or other implementation). In the step 1506, a fact check result is provided. In some embodiments, additional or fewer steps are implemented.

In some embodiments, a touchscreen input is utilized for fact checking. When a user wants to flag content (e.g., a commentator talking) to indicate the information is questionable and/or to receive a fact check result, the user taps the touchscreen, and the last n seconds of content are used for fact checking. For example, the content is continuously monitored and processed, and the fact checking system is able to retrieve previously processed information to perform the fact check. Furthering the example, a commentator is talking in a video, a user taps the screen, and the previous 10 seconds of content are fact checked. In some embodiments, an additional time (e.g., 5 seconds) is fact checked. In some embodiments, the fact checking system determines the current segment. For example, the commentator says, "this project is a mess, it is $5B over budget." The user taps the screen at "$5B" in the video. The fact checking system had determined or determines that the current segment is "it is $5B over budget," so that segment is fact checked. In some embodiments, the current segment or a previous segment (e.g., to allow a delay of the user thinking) is fact checked. In some embodiments, the user is able to highlight closed caption content for fact checking. In some embodiments, when a user taps the touchscreen, a list of recent/current segments is displayed (e.g., pops up), and the user is able to select one or more of the segments by tapping again. In some embodiments, the list is displayed on a second or third screen. In some embodiments, the list is based on time (e.g., most recent) and/or priority (e.g., most relevant). In some embodiments, content is monitored and processed, but the content is only fact checked when a user touches the touchscreen (or utilizes any other input mechanism). In some embodiments, the user is able to use the touchscreen to select or highlight text, information or a communication to have that text/information/communication fact checked. For example, a user taps a tweet on a screen to have the tweet fact checked. In another example, a user highlights text on a social networking page to have the text fact checked.

In some embodiments, content feeds are modified based on fact checking. Content feeds are fact checked, and a content feed with the highest factual accuracy rating is presented on top/first. Factual accuracy and time/date information are able to be combined for ranking/ordering content feeds.

In some embodiments, fact checking results are presented one after the other or in chronological order as a news/activity feed (and presented via social media/networking).

In some embodiments, fact checking information is displayed on a page mostly (e.g., 95% or more) hidden behind the main content. The user can then click on the page to view the fact check information.

In some embodiments, what time the misinformation was said is included in timeline format or another format.

In some embodiments, misinformation is turned into jokes automatically to send to friends. In some embodiments, misinformation is turned into a postcard or greeting card. The misinformation is turned into a joke and/or card by including the misinformation with a matching image and/or template. The match is able to be made using a keyword or any other manner. For example, if the misinformation is from Politician Z, a caricature of Politician Z is included as well as the misinformation and the fact check result or a correction of the misinformation. In some embodiments, additional text, audio, images and/or video is provided such as an "oops!" sound or text, or silly music or any other effect to add humor.

In some embodiments, the sources are rated using a rating system so that sources that provide false or inaccurate information are rated as poor or unreliable and/or are not used, and sources that rarely provide misinformation are rated as reliable and are used and/or given more weight than others. For example, if a source's rating falls or is below a threshold, that source is not used in fact checking. In some embodiments, users are able to designate the threshold.

In some embodiments, comments are classified (e.g., high/false, mid/misleading, low/unsupported), and users are able to select which classification of information to exclude or receive. In some embodiments, "high" excludes only false information, "mid" excludes false and misleading information, and "low" excludes false, misleading and unsupported information. In an example, user A accepts all information, but user B excludes only false information. When information is excluded, it is muted, crossed out, blacked out, not provided, deleted, not transmitted and/or any other exclusion.

In some embodiments, fact check results are displayed when a user visits a page (or views other content such as a video or a television show) based on previous fact checks done by/for other users. For example, User A visits Webpage X, and a selectable/clickable link appears for the user to see the fact check result that was done by the fact check system for Contact B of that page. In some embodiments, only fact checks performed by/for contacts of the user are displayed. In some embodiments, fact checks performed by/for anyone are displayed. In some embodiments, only manual fact checks are displayed, only automatic fact checks are displayed (e.g., automatically performed by the fact checking system) or only automatic fact checks that have been manually reviewed are displayed. In some embodiments, the user is able to select to have a fact check performed by the fact checking system using the user's sources and compare the results with the previously performed fact check(s). In some embodiments, only differences between the fact check results are displayed. In some embodiments, sources/criteria for the user's fact check implementation is automatically compared with a previous fact check's sources/criteria, and the user's fact check is only performed if the user's fact check sources/criteria is different (e.g., substantially different) from the previous fact check's sources/criteria. Substantially different is able to be determined based on the number of different sources (e.g., number of different sources below a threshold), the quality of the differing sources (e.g., all sources have a 10 reliability rating), and/or any other analysis. For example, if the user's sources are the same except for one additional approved website, then the user's fact check and the previous fact check are considered not to be substantially different.

In some embodiments, users receive benefits by fact checking content. In some embodiments, users register to fact check and/or use their social networking identification for fact checking and receiving benefits. For example, a user agrees to fact check a television program for free access to the television program. In another example, a user fact checks a television program and is able to watch the next television program commercial-free. In another example, a user agrees to fact check a program, and is provided the program is streamed to the user for free. Any benefit is able to be provided, including, but not limited to, commercial-free, shortened/fewer commercials, extended content, a period (e.g., month) of free cable/Internet access, program-specific access for free (e.g., access to News Show X), discounted access (e.g., 50% off), free access to related or unrelated content and/or any other benefit. For example, if the user fact checks News Show X, then they are given free access to News Show Y. In another example, if the user fact checks News Show X, they are given commercial free viewing of the next football game of their favorite team. In some embodiments, users are presented selectable benefits from which to choose. For example, a user is offered a free movie, free sporting event programming or a 50% off download of a new release game, if they fact check News Show X. In some embodiments, the user is required to fact check a certain amount of content and/or receive an accuracy rating above a threshold to receive the benefits. For example, a user agrees to fact check News Network X's content for free access to the content. If the user abuses the agreement, and does not fact check the content or provides inaccurate fact check results, then the user's access is terminated. If the user provides accurate fact check results, then the user is able to continue to receive free access. The user is able to fact check the content in any manner. For example, the user is able to manually fact check the content and provide the results to a central or distributed fact checking system. In another example, the user is able to utilize an automatic fact checking implementation that the user has modified (e.g., by selecting sources, monitoring rules, processing rules). In another example, users are grouped or form groups to fact check content (e.g., crowd-sourcing), so that the groups work together to generate fact check results. The benefits are able to be applied to any type of content/services. For example, users of a social networking service are able to receive expanded access for fact checking, or no advertisement browsing as a benefit for fact checking, and/or any other benefits. In additional examples, users who agree to fact check YouTube content or provide a specified number (e.g., 10) accurate fact check results, are allowed to watch YouTube videos without commercials for a day, or users who fact check other users' Facebook® pages do not have any advertisements displayed when they browse Facebook® or listen to a music playing service such as Pandora.

Figure 16:
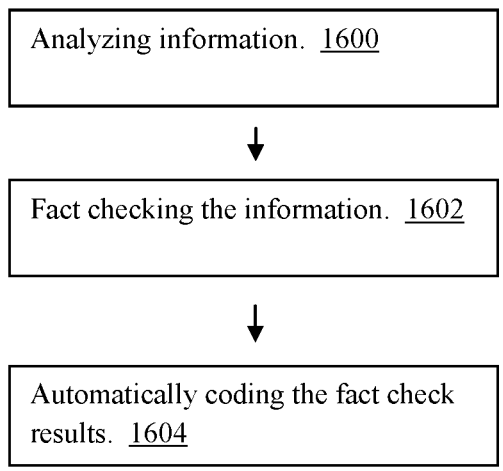
FIG. 16 illustrates a flowchart of a method of automatically coding a web page with fact check results according to some embodiments.

FIG. 16 illustrates a flowchart of a method of automatically coding a web page with fact check results according to some embodiments. In the step 1600, information is analyzed. For example, a web page or a social networking page is analyzed. Analyzing is able to include any analysis as described herein such as processing and/or parsing. In the step 1602, the information or the processed information (e.g., sentence segments) is fact checked as described herein (e.g., by comparing the information with source information). In the step 1604, the fact check results are automatically coded within the information (e.g., web page).

Automatically coding the fact check results into the web page is able to be performed in any manner. For example, an application on a server device or other device is programmed to generate a file such as a Web-loadable file, including, but not limited to: xhtml, mhtml, maf, asp, aspx, adp, bml, cfm, cgi, ihtml, jsp, lasso, pl, php, ma, r, rnx, ssi, xml, atom, eml, rss, metalink, markdown, shuttle, and/or json-ld. Furthering the example, the server device generates and names the file with any naming convention (e.g., webpagenamefcl) and applies the appropriate extension (e.g., .asp), and then automatically writes/includes programming language in the file. For example, an application automatically writing an html file would begin with the <html> tag. The application also includes/writes the web page content (e.g., text, web page tags for images, videos, and/or audio, other web page tags, and/or any other formatting or substantive information) in the file being automatically generated.

In some embodiments, a new web page file is generated by extracting content (including code/tags) from the original web page and adding fact check results in the appropriate locations, and saving the web page with the fact check results as a new file or replacing the original file with the fact checked version. In some embodiments, after the new/modified page is generated, a user is prompted to select between the two when accessing the web page. In some embodiments, the original web page is modified to include redirect code or a link to the new page with the fact check results. In some embodiments, the original web page is moved/replaced by a web page which presents the user with the option to select either page. In some embodiments, a web page is fact checked and a new web page is coded with the results when a user attempts to access the web page (e.g., clicks on a link to visit a web page or types in the address in a browser), such that before the web page loads, the web page is fact checked and coded. In some embodiments, the web page is fact checked after the page loads as it typically would load. In some embodiments, after the web page loads, it is refreshed automatically to show the newly coded page with fact check results. In some embodiments, the web page is fact checked preemptively as described herein.

In an example of generating a new web page by extracting content, the code of an original web page is:

```
<html>
<body>
<h1>Vaccines Proven to Cause Autism</h1>
<p>Based on a study in Britain, vaccines have
been proven to cause autism. More...</p>
<a href="http://www.fakevaccinestudy.com">
This is a link to the study.</a>
<img src="vax.jpg" alt="fkvaxstdy.com"
```

```
        width="100" height="150">
    </body>
</html>
```

The code above is copied, stored and fact checked, and a new web page is generated, including the fact check results:

```
<html>
    <body>
        <h1>Vaccines Proven to Cause Autism</h1>
        <h1 style="color:red">FALSE</h1>
        <p>Based on a study in Britain, vaccines have
        been proven to cause autism. More...</p>
        <p style="color:red">This study was discredited
        and retracted. For more information,
        ...</p>
        <a href="http://www.fakevaccinestudy.com">
        This is a link to the study.</a>
        <img src="vax.jpg" alt="fkvaxstdy.com"
        width="100" height="150">
    </body>
</html>
```

As shown in the example, the html code is modified to include the fact check results which are coded in the appropriate locations, so that when the modified web page is displayed, the user will see that the heading is false and that the study was discredited and retracted. Any other modifications to the web page are able to be implemented.

In some embodiments, dynamic code is coded into a web page which retrieves the fact check results from another source (e.g., a database). In some embodiments, the fact check results are stored in a database (or other storage location) which is accessible using programming code (e.g., Cold Fusion or ASP). For example, a Cold Fusion call retrieves data stored in a database. Similar to the code above, exemplary dynamic code is:

```
<html>
    <body>
        <h1>Vaccines Proven to Cause Autism</h1>
        <h1 style="color:red">FALSE</h1>
        <p>Based on a study in Britain, vaccines have
        been proven to cause autism. More...</p>
        <cfquery name="fcQuery" datasource="factcheckresults">
            SELECT cur_status
            FROM fcresults
            WHERE location = 1
        </cfquery>
        <cfoutput query="fcQuery">
            #cur_status#<br />
        </cfoutput>
        <a href="http://www.fakevaccinestudy.com">
        This is a link to the study.</a>
        <img src="vax.jpg" alt="fkvaxstdy.com"
        width="100" height="150">
    </body>
</html>
```

Stored in the database in the cur_status cell, is, "This study was discredited and retracted. For more information, . . . ." The cfoutput command displays the fact check status in the web page after retrieving the status from the database. As described herein, any data is able to be stored in a database and retrieved to be displayed. For example, all of the text of an original web page is stored in a database in reading order as well as fact check results, and by using more complex coding, the information stored in the database is able to be retrieved and displayed in the appropriate order/formatting, so that the coded web page appears to the user similar to the original web page with the inclusion of the fact check results.

In some embodiments, only certain content of a web page is fact checked. For example, a specific tag is searched for (e.g., body and /body or h1 and /h1), and the content found within the tags is fact checked. In another example, a specific tag is searched for (e.g., img), and the content associated with the tag is fact checked. In some embodiments, certain content is excluded from being fact checked (e.g., by detecting a tag and not fact checking the content associated with or between tags). In some embodiments, web pages that are linked (directly linked) to the current web page are also fact checked (e.g., by being automatically accessed and retrieved by the system) when the current web page is fact checked (or queued to be fact checked at a later time), and a status, score, rating and/or other information is coded in the current web page (e.g., next to the link or in a bubble that appears during a mouse over). For example, using the code from above:

```
    ...
    <a href="http://www.fakevaccinestudy.com">
    This is a link to the study.</a> <p
    style="color:red">Fact check rating F </p>
    ...
```

The code above shows a rating of an "F" after fact checking the study web page and determining the factual accuracy of the study web page is below the lowest threshold or any other manner of determining the rating. In some embodiments, the color of the link is modified or re-coded based on the factual accuracy of the linked web page. For example, the color attribute of the link is modified to green when the factual accuracy of the linked web page is equal to or above a first threshold, yellow when the factual accuracy is below the first threshold but equal to or above a second threshold, and red when the factual accuracy is below the second threshold. In some embodiments, confidence scores are utilized in conjunction with factual accuracy. For example, a link attribute is changed to red only if the factual accuracy is below a second threshold and the confidence score is above a confidence threshold. Furthering the example, if a factual accuracy is equal to or above a first threshold, and the confidence score is equal to or above a first and/or second confidence threshold, then the link color attribute is modified to green, but if the confidence score is below the second confidence threshold, then the link color attribute is not modified. If the factual accuracy is below the first threshold but equal to or above the second threshold, and the confidence score is equal to or above a first and/or second confidence threshold, then the color attribute is modified to yellow, but if the confidence score is below the second confidence threshold, then the color attribute is not modified. If the factual accuracy is below the second threshold, and the confidence score is equal to or above a first and/or second confidence threshold, then the color attribute is modified to red, but if the confidence score is below the second confidence threshold, then the color attribute is not modified. Any number of thresholds can be used, and any styles/formatting/effects (e.g., color, highlighting, font, strikethrough, italics, underling, font size, blinking, shadows, 3D effects) are able to be used based on any of the thresholds. In some embodiments, the link color is only changed if the factual accuracy is below a threshold or if the factual accuracy is below a threshold and a confidence score is above a threshold. In some embodiments, a color attribute is modified depending on the factual accuracy, and an additional modification of the link is implemented depending on the confidence score. For example, if a linked content has a factual accuracy of 90% (e.g., equal to or above a first threshold) and a confidence score of 90% (e.g., equal to or above a confidence threshold), then the link color attribute is modified to green, but if the linked content has a factual accuracy of 90% (e.g., equal to or above the first threshold) and a confidence score of 40% (e.g., less than the confidence threshold), then the link color attribute is modified to green and the link font style attribute is modified to italics or an asterisk is added near the link to indicate that although the factual accuracy is above a threshold, the confidence in the fact check is below the confidence threshold.

In some embodiments, a frame is generated to be placed on the current web page. The frame is able to be generated by modifying the web page to include a frame (e.g., add a <frame> tag). In some embodiments, coded in the frame are the fact check results.

In some embodiments, the fact check results are coded in the web page in another location instead of or in addition to near the fact checked information. For example, the fact check results are coded at the top of the web page, at the bottom of the web page, as a link anywhere on the page which when clicked takes the user to another web page containing the fact check results, and/or any other location.

In some embodiments, the generated web page with fact check results is only temporarily saved. For example, once a user closes the web page, the generated web page is deleted. In another example, the generated web page is saved in a temporary folder, and as long as a cookie or other record is on the user's computer, the generated web page will remain saved but is deleted when the cookie or other record is deleted or expires. In some embodiments, when the generated web page is deleted, the original web page is restored (e.g., by replacing the file or changing a link to point to the restored file).

In some embodiments, the generated web page with fact check results is utilized for other users. For example, a first user visits a web page, and the web page is fact checked and coded/re-coded with the fact check results, and then a second user visits the web page, and in some embodiments, the re-coded web page is displayed for the second user. In some embodiments, the current user is determined by being logged in (e.g., logged in to a social networking system which the fact checking system has access to). In an example, only users connected to the user via a social networking site are presented with the re-coded web page. For example, the social networking system or another system determines if the current user accessing a web page is connected to the user for which the page was previously fact checked (e.g., by storing and/or searching for user/connection information). If the users are connected, then the current user is presented with the re-coded web page. In some embodiments, the current user is presented an option of receiving the re-coded web page, the original web page, and/or if the current user would like the web page to be fact checked using his sources if his sources are different than the user for which the page was previously fact checked. In some embodiments, the previously determined fact check results (e.g., for a connected user) and the fact check results based on the current user's sources are compared, and the differences are automatically coded in a new web page including distinguishing features (e.g., different color or font size/style).

In an exemplary implementation, a web page (e.g., social networking page) is scanned by the application. Content, including web page tags and other content, is captured by the application. The content is parsed (e.g., into phrases). The phrases are identified (e.g., each phrase is stored in a database in order based on location on the page and/or an identifier such as a number for each phrase). The parsed content is fact checked, and the fact check results are associated with the identifier (e.g., given a matching identifier) or placed in the database in the appropriate location (e.g., associated with the corresponding fact checked phrase). Then, the web-page is re-written/coded including the web page tags and other content as well as the fact check results using the identifiers or by writing the content in order using the database.

In another example, as the web page is analyzed and parsed, a modified web page is generated (e.g., by copying the information from the original web page to the modified web page each parsed phrase at a time, and the parsed information is also fact checked, and a fact check result is input to the modified web page after each parsed phrase where there is a fact check result). For example, an original web page is scanned (e.g., top to bottom/left to right), and any code or tags (starting at the top-left and working down-right) are copied to a new web page including the first phrase of text, then the first phrase is fact checked or it is determined if it is to be fact checked (e.g., based on formatting or any other determination), and if fact checked, then the fact check result (if one is obtained) is coded in the new web page immediately after the first phrase, then the second phrase is copied to the new web page and is either fact checked or determined to be fact checked, and the result, if any, is coded in the new web page immediately after the second phrase, and so on (including copying text, tags, and/or other content and generating and coding fact check results) until the end of the original web page is reached. In some embodiments, the web page is analyzed/modified character by character, word by word, phrase by phrase, sentence by sentence, line by line, section by section or any other manner. In some embodiments, the step of copying content from the original web page to the modified or new web page and the step of fact checking information occur in parallel. In some embodiments, the fact check result is input into the modified web page before, after, above, below, over, and/or anywhere else in relation to the associated fact checked content on the web page.

In another example, a source list or source criteria used for the previous fact check is stored or identifying information of the source is stored (e.g., as metadata within the web page) and compared with the current user's source list/criteria, and if they are the same, then the previously coded/generated web page is displayed. If they are not the same, then a new fact check is performed, and a new web page is generated including only the new fact check results or the old and new fact check results. If the fact check results are different, then the new web page (and/or source list/criteria in metadata) is also stored for comparison with other future users. If the fact check results are the same, a record of that is stored (e.g., in metadata) to specify that a different source list/criteria resulted in the same fact check results, and the new web page is deleted or is not saved/generated.

In some embodiments, fact check results are stored in metadata (e.g., fact check results using a base set of sources for fact checking). Then, when a user visits the web page, a second fact check is performed using the sources specific to the user or other sources, and the results of the second fact check are compared with the results stored in the metadata.

If the result of the second fact check is different, then that result is added to the metadata, and if the result is not different, the result is not added. In some embodiments, additional information is included in the metadata such as a source description, time/date information of when the fact check took place, user information corresponding to the fact check, and/or any other relevant information.

In some embodiments, a generic fact check result is coded in a web page or metadata, but a tailored fact check result is generated for a specific user, and the tailored fact check result is coded in a web page stored locally on the user's device. In some embodiments, the tailored fact check result web page is only stored locally on the user's device.

In some embodiments, the generated web page with fact check results is saved for all other users. For example, on the host site's server, the original web page is deleted and replaced with the generated web page, so that anyone who visits the web page sees the fact check results with or without an updated fact check.

In some embodiments, the web page is re-coded when a user visits the web page. In some embodiments, the user views the un-fact checked web page, and then a pop up is displayed to enable the user to view a modified fact checked web page (e.g., the pop up has a link which causes the page to be refreshed to show the modified fact checked web page). In some embodiments, future users either see the original web page, the coded, fact checked web page, and/or are able to select between the two.

In some embodiments, the fact check results are automatically coded in content such as microblogs (e.g., Tweets) and/or other communications.

In some embodiments, the method of coding the fact check results in a web page utilizes other aspects described herein. For example, after the modified web page with the fact check results is displayed for the user, the user's reaction is acquired (e.g., by a web cam or camera phone camera), and if the reaction is determined to be negative, the web page is fact checked again, and a new modified web page is generated. In some embodiments, when the new modified web page is generated, the previous modified web page is deleted. In some embodiments, when the new modified web page is generated, the previous modified web page is stored to be used for another user (e.g., a user with the same sources). In some embodiments, when the new modified web page is generated, it also includes the previous fact check results, so that the user is able to compare the results.

In some embodiments, each time a user visits a web page (e.g., the same web page), the web page is fact checked again. In some embodiments, information is stored (e.g., in a cookie, log, cache, or other storage), so that the same web page is not fact checked again for the same user or for other users with the same fact check criteria. In some embodiments, a determination is made to determine if the web page contains the same content as the previously fact checked web page. For example, although Web Page X was previously fact checked for User A, Web Page X has been updated with new information, so Web Page X is fact checked again (or only the updated information is fact checked), and a new web page is coded. In some embodiments, previous versions of web pages are stored, which are used to compare with the current web page to determine any differences. In some embodiments, each time a different user visits a web page, the web page is fact checked using that user's sources.

In some embodiments, prediction is utilized to fact check web pages ahead of time to expedite the processes of fact checking and the web pages loading. For example, pages linked to the current page and pages linked to those linked pages are fact checked using generic sources, a user's sources, a user's contacts' sources and/or other sources. In some embodiments, the levels of linked pages to be fact checked is any number (e.g., user or system configured). For example, 4 levels of linked pages are fact checked such that a web page four links away from the current page is fact checked when the user visits the current web page. In some embodiments, prediction of what pages to fact check is based on user or community analysis. For example, based on the user's browser history, it is known the user typically visits Web Site X (which has several web pages of articles) at least once a day, so all or some of the articles on Web Site X are fact checked periodically (e.g., at 9 am each day or every hour). In some embodiments, further analysis is performed, for example, it is known that the user accesses Web Site X at 9 am every morning on the weekday, so the fact check of the web pages on Web Site X occurs at least 1 second before 9 am (assuming fact checking the web pages of the site takes 1 second or less). In another example, the user's preferences are taken into consideration for prediction. For example, the user is a big sports fan, so all articles (of Web Site X) classified as sports are fact checked ahead of time (e.g., system monitors for new sports articles and fact checks them immediately). In another example, when a user moves his mouse on or toward a link, the linked page is fact checked before detecting a click/selection of the link. Furthering the example, the system determines the locations of the links on the current page (e.g., by locating link tags and their respective pixel positions on the screen) and tracks the user's mouse or other input movements (e.g., by detecting previous and current pixels the cursor was/is on and connecting them to generate a path), including determining if the cursor is over a link or if the cursor is moving toward a link (e.g., by projecting a line along the current path of the cursor), and if a link is over or going towards a link, the link is predicted to be clicked, so it is fact checked preemptively by the system. In some embodiments, when the user attempts to visit the web page, the user is redirected to the modified web page with the fact check results. In some embodiments, a user's eyes are tracked, and it is determined where the user's eyes are pointing, and any links near where the eyes are pointing are fact checked preemptively. For example, a user's eyes are detected to be pointing at position (x,y), so a box, circle or other shape is drawn/determined with (x,y) as the center point (e.g., (x−5,y), (x+5, y), (x, y−5, (x, y+5)), and any links with a position within the shape are preemptively fact checked and coded.

In some embodiments, the fact checking system predicts which web pages to fact check preemptively based on web page statistics (e.g., most visited web sites/pages based on hits/clicks, trending information, most liked/disliked web sites/pages, most shared content such as video, images, social networking content, web pages. For example, most visited web sites are predicted to be visited in the future by the most users, so those pages are preemptively fact checked before less visited web sites. In some embodiments, the prediction is based on web site/page type (e.g., news web pages which provide news are fact checked before company web sites which merely provide company information.) For example, web sites or pages are classified manually or automatically based on the type of content or goal of the site. Exemplary classifications include: media site, news site, company site, social networking site, personal blog, and/or any other classification. In some embodiments, further levels of classification are implemented, such as news→sports-→golf; news→finance; entertainment→movies→comedy.

In some embodiments, users are able to specify which sites/pages to predict to fact check. In some embodiments, one or more queues are implemented, and web pages are given a priority depending on their type/classification/popularity and/or other characteristic/quality/attribute.

In some embodiments, users are able to tag web sites/pages (or provide other input) for predictive fact checking/coding, and the web pages with the most tags/selections (or above a threshold) are fact checked, and the results are coded preemptively or in order of the most tags/selections to the least. For example, a web browser includes a fact check tag button which copies the web page address or other identifying information and sends the information to a fact checking system for tabulation.

In some embodiments, web pages are fact checked and/or predictively fact checked using multiple different implementations (e.g., different sources), and the different fact check results are coded in web pages. For example, a web page is fact checked using only conservative sources as a first implementation, only liberal sources as a second implementation, a mix of conservative and liberal sources as a third implementation, and only sources with a validity rating above a threshold as a fourth implementation. Furthering the example, four different web pages (based on the same original page being fact checked) are coded with the different fact check results. In some embodiments, the results are compared before coding the pages with the fact check results, and if the results are the same among any of the implementations, then that is stored (e.g., in metadata), so that fewer pages are generated and stored. For example, if the third and fourth implementations generate the same fact check results, then only one web page is coded with the fact check results, and metadata is stored indicating that those fact check results were generated using the third and fourth implementations. In some embodiments, when a user visits the web page, he is able to select which fact check results are shown. In some embodiments, which web page with fact check results (e.g., which coded web page) is shown is automatically determined based on user characteristics (e.g., based on social networking information, the user is a Conservative, so the first implementation fact check results are shown). In some embodiments, all of the different results are coded in the same web page but with distinguishing characteristics (e.g., color).

In some embodiments, predictive fact checking/coding is based on an entity's (e.g., user, company, web site, media company, author) validity rating. For example, entities with low validity ratings (e.g., below a threshold) are fact checked first so that any further misinformation is indicated. In another example, entities with high validity ratings (e.g., above a threshold) are fact checked first since they have earned earlier fact checking by providing factually accurate information. In some embodiments, the validity rating is used in conjunction with other information such as popularity or traffic to determine which sites to predict to fact check and code and/or in which order. For example, although Blogger X may have a very low validity rating, his visitor traffic is also very low, so not many people read his misinformation. A very basic exemplary calculation of predicting which site to fact check is (10–validity rating)+traffic score, where the validity rating is 1 to 10 with 10 being the most factually accurate and the traffic score is 1 to 100 with 100 being site with the most traffic, so that a heavy traffic site with factually inaccurate information is predicted to be fact checked and coded with the results first. For example, Bob's Blog has a 1 validity rating but a traffic score of 1, so it receives a total score of (10−1)+1=10. However, News Site X has a 5 validity rating but a traffic score of 99, so it receives a total score of (10−5)+99=104. Thus, in this example, the News Site X web page would be fact checked and coded before Bob's Blog. In some embodiments, the validity rating and other quantity (e.g., traffic score) are weighted equally or differently (either having a higher weight depending on the implementation). In other examples validity rating, traffic, keyword information, time/date information, sharing information, classification, other information and/or any combination thereof are utilized to determine which web pages to preemptively fact check and code. For example, the validity rating and a sharing score are utilized to generate a total score, and the higher a web page's score, the more likely or higher priority the page will be fact checked and coded preemptively. In another example, the traffic score and classification are utilized together to predict which pages should be fact checked and coded first. In a more specific example, a web site has a low validity rating, a high traffic score, web pages with a recent creation time/date and a high sharing score, so the web pages are a high priority for fact checking and coding compared to higher validity rating, lower traffic, older created, and/or lower sharing scored pages. In another example, a prediction score calculation includes: (50−validity rating)+traffic score+time/date score+sharing score+classification score, where the validity rating is 1-50, the traffic score is 1-100, the time/date score is 1-50, the sharing score is 1-50 and the classification score is 0, 10, 20, or 30, depending on the classification. Furthering the example, if a web page's author's previous content is very accurate, then the validity rating is 50, if a web page has heavy traffic, then the traffic score is 100, if a web page has been recently created, then the time/date score is 50, if a web page has been shared significantly via social networking, then the sharing score is 50, and exemplary classifications are: personal blog (0 points), company web page (10 points), commentary blog/web page (20 points), and news web page (30 points). The scores decrease if a web page's information falls below specified thresholds or using any other calculations to determine a web page's scores. After web pages are given scores, the page with the highest score is fact checked and coded first, then the next highest, and so on. In some embodiments, pages' scores are not compared against each other; rather, the scores are compared with other benchmarks (e.g., if a web page's score is above a top threshold, it is classified to be fact checked and coded with the highest priority). In some embodiments, the priority classifications based on total scores cause the web pages to be placed in different queues for fact checking (e.g., highest priority classifications are fact checked and coded by the fastest machine, and lower priority classifications are fact checked and coded by slower machines, or highest priority classifications are fact checked and coded before any lower priority classified web pages). In some embodiments, web pages classified in the top priority classification are fact checked using multiple implementations (e.g., first set of sources, second set of sources, third set of sources for fact checking to possibly generate varying results), and the lower priority classification web pages are only fact checked using one fact check implementation.

In some embodiments, predictive or preemptive fact checking and coding web pages utilizes age or time/date of web pages. For example, newest web pages are fact checked and coded first. In another example, oldest web pages are fact checked and coded first. In another example, news article web pages are analyzed based on a creation date/time (e.g., stored in file metadata), and the web page with the newest creation date/time is fact checked first, and the fact checking system continues to older web pages. In some embodiments, separate fact checking systems are implemented (e.g., one fact checks and codes newest web pages and another fact checks and codes oldest web pages, and the implementations attempt to meet in the middle).

In some embodiments, current events or other timing information is utilized to determine which content to fact check and code preemptively. For example, if it is determined that a Presidential election is upcoming (e.g., by comparing the current date with a database of events), then news articles with keywords (e.g., election, candidates' names) are fact checked and coded.

In some embodiments, the prediction is based on sharing information (e.g., after an article/web page/content is shared by a number of users above a threshold, then that content is fact checked and coded.

In some embodiments, the prediction is based on a topic. For example, all web pages related to the topic of politics are fact checked and coded preemptively. In some embodiments, keywords are searched for, and if a web page contains the keyword or a sufficient number of keywords above a threshold, then the web page is fact checked and the results are coded.

In some embodiments, the prediction is based on search information (e.g., the most searched for information). In some embodiments, search results of a search engine are fact checked and preemptively coded. For example, a user types in a search string. In some embodiments, before or after the user submits the search, the web pages that would appear for the search are preemptively fact checked and coded, so that when the web page search results are presented, and the user selects a web page, the web page has already been fact checked and the results are coded. In some embodiments, the search results are displayed in a format that enables the user to select from fact checked pages, non-fact checked pages and/or fact checked pages with varying implementations (e.g., fact checked using Conservative sources, fact checked using Liberal sources).

In some embodiments, the user selects which web sites/pages to predict to fact check. For example, the user uses a GUI to select which web sites/pages should be predictively fact checked. In some embodiments, the approval/disapproval schemes described herein for approving/disapproving sources are able to apply to selecting web pages to predictively fact check and code. For example, web pages visited by a user and web pages visited by contacts of the user are predictively fact checked and the fact check results are coded. Furthering the example, a contact visits a web page which is fact checked for the contact using his sources and is also fact checked and coded preemptively using the user's sources.

In some embodiments, information that a web page has been fact checked is coded in the web page. For example, if a web page is fact checked and there are no factual inaccuracies, there may be no fact check results (although in some embodiments, factual accurate information is coded as factually accurate), so a heading or other text/icon/image/content is able to be coded to indicate the web page has been fact checked. Furthering the example, in the upper right corner, a green check mark is able to indicate the page has been fact checked. In some embodiments, fact check statistics are coded in the web page. For example, an indication of the number of factually inaccurate phrases, factually accurate phrases and questionable/unknown phases are coded in the web page.

In some embodiments, a payment scheme is utilized to enable web sites/users to pay for their web pages to be higher on a list to be fact checked (e.g., fact checked before other sites). For example, if a web site wants their content fact checked so that when anyone visits their web site, the visitors will see fact checked content, the web site is able to pay a fee. In some embodiments, web sites/pages are classified in different priority classifications, including paid and unpaid classifications, where the web pages in the paid classifications are fact checked and coded before the pages in the unpaid classifications. In some embodiments, the fee amount is tiered, and the highest tier is fact checked first. In some embodiments, a web site is able to purchase dedicated fact checking such that a fact check implementation only fact checks content on that web site.

In some embodiments, the different predictive fact checking implementations are utilized together (e.g., using user preferences/web history, general web site popularity and cursor analysis).

Figure 17:
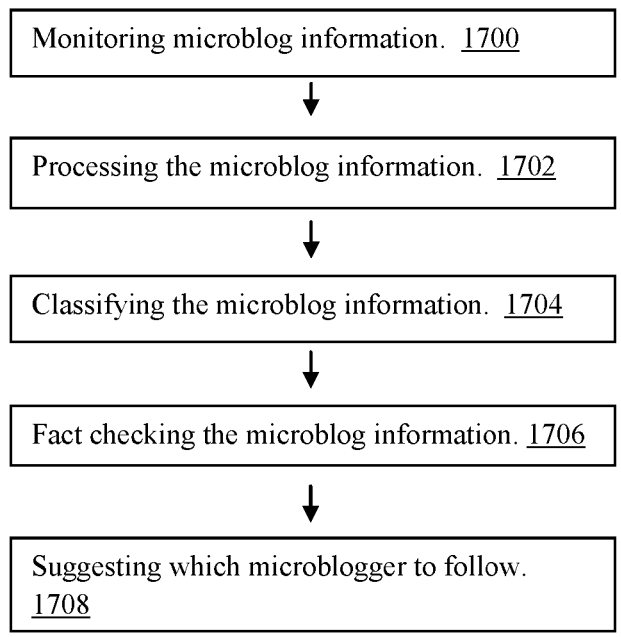
FIG. 17 illustrates a flowchart of microblogging with fact checking according to some embodiments.

FIG. 17 illustrates a flowchart of microblogging with fact checking according to some embodiments. In the step 1700, a server or other device monitors users' microblogs (e.g., Tweets). In the step 1702, each microblog is processed (e.g., converted, parsed, or other processing). In the step 1704, each microblog or portion of a microblog is classified (e.g., as fact or opinion). The classification of the microblog is able to be performed in any manner such as grammar analysis (e.g., detecting words or phrases indicating whether the content is fact or opinion such as "in my opinion"). In the step 1706, fact checking as described herein is performed (e.g., monitoring/analyzing, processing and/or fact checking). In some embodiments, only fact-based microblog content is fact checked, and in some embodiments, all microblog content is fact checked. In the step 1708, the fact check results are utilized to suggest which microbloggers users should follow. For example, the fact check results are utilized to perform calculations to generate a factual accuracy score for users, and then the factual accuracy score is able to be used independently or in conjunction with other factors of whom to suggest to be followed. In an exemplary calculation, if a microblog is determined to be factually inaccurate, a point is subtracted from the microblogger's factual accuracy score, and if a microblog is determined to be factually accurate, a point is added to the microblogger's factual accuracy score. In some embodiments, only subtractions are performed to prevent manipulated inflation of a user's score. In some embodiments, only certain factually accurate microblogs receive a point (e.g., the first time a phrase or other content is fact checked). For example, a phrase is compared with a data structure which stores each phrase (or identification information) as it is analyzed, and if a phrase (or identification information) is already in the data structure, then the phrase has already been fact checked, so the phrase is not used to award any more points. In some embodiments, each factually inaccurate item (e.g., phrase) in a microblog counts as a negative point for the user. Similarly, each factually accurate item counts as a positive point for the user. For example, in some embodiments, a single microblog can only result in −1 point even if it has multiple inaccurate comments, but in some embodiments, if a single microblog has 3 inaccurate comments, then the result is −3 points. In another example, the confidence score of the accuracy or inaccuracy is factored in. For example, if a comment is considered to be factually inaccurate, but the confidence score is only 50%, then (−1*0.50=−0.5 points), whereas a comment that is factually inaccurate with a confidence score of 97% is −1*0.97=−0.97 points. Similarly, the confidence score can be used for a factually accurate comment (1*0.80=0.8 points). In some embodiments, a total score is determined for each microblog. For example, if a Tweet has one sentence/phrase that is factually accurate with a confidence score of 70% and a second sentence/phrase that is factually inaccurate with a confidence score of 90%, then the total score for that Tweet is (1*0.70)+(−1*0.90)=−0.2. In some embodiments, the microblog scores are totaled for each user. For example, using a basic approach, if a user sends 100 Tweets, and 70 of them are factually inaccurate, then the user has a score of −70. In some embodiments, users are ranked and/or are sortable. In some embodiments, the scores reset after a period of time (e.g., once a week, month, year). In some embodiments, the microblog scores are used in conjunction with other user characteristics/qualities such as preferences, connections, and/or other personal information to suggest whom to follow. For example, if a user is interested in sports, and there are two microbloggers who microblog on sports, but the first microblogger has a factual accuracy score of negative two (−2) while the second microblogger has a factual accuracy score of negative seventy-nine (−79), the user would be suggested to follow the first microblogger before the second microblogger. In another example, a message is sent to a user from a social networking site asking the user if he wants to follow/connect with another user, where the other user has a factual accuracy score above a threshold and/or other matching characteristics (e.g., same political affiliation). In some embodiments, users' icons, backgrounds, and/or post features/characteristics are modified based on their factual accuracy score (e.g., red if factual accuracy score is below a first threshold, yellow if the factual accuracy score is equal to or above the first threshold but below a second threshold, and green if the factual accuracy score is equal to or above the second threshold. In some embodiments, the scores of the microbloggers are displayed. Furthering the example, a list of users (including their factual accuracy score) to follow is provided to the user with the most accurate on top and the least accurate on bottom. In some embodiments, fewer or additional steps are implemented. In some embodiments, the order of the steps is modified.

In some embodiments, trending information (e.g., information such as articles, web pages, blogs that have been searched for, clicked on and/or shared recently by a large/increasing number of users) is analyzed, and only certain information (e.g., top 10 trending articles, as determined by analyzing web search information, social networking information, and/or any other manner) is fact checked. After fact checking, the trending information is reorganized based on the fact check results. For example, in some embodiments, the top 10 (based on trending statistics) news articles are collected, analyzed and/or fact checked. In some embodiments, if an article is determined to be inaccurate (e.g., number of factually inaccurate segments/phrases above a threshold or percentage of factually inaccurate segments/phrases above a threshold), then its position in the list is modified (e.g., dropped one spot, removed from the list). In some embodiments, the modified position depends on the factual accuracy result/score. For example, if a factual accuracy of an article is equal to or below a first threshold and above a second threshold, then the article drops one spot in the list, and if the factual accuracy is below or equal to the second threshold and below a third threshold, the article drops multiple spots in the list, and if the factual accuracy is below or equal to the third threshold, then the article is removed from the list. When an article is removed from a list, another article is added to the list (e.g., article in the 11$^{th}$ trending spot), and the added article is fact checked, and the list may be modified again. In some embodiments, the items in the list are analyzed concurrently. In some embodiments, the items in the list are analyzed sequentially starting from the top of the list or the bottom of the list. In some embodiments, all or portions of the list are analyzed before the list is modified. In some embodiments, confidence scores are taken into account as well. For example, if an article is determined to be factually inaccurate, but the confidence score is low, instead of removing the article completely, the article is dropped one or more spots. Furthering the example, if a factual accuracy of an article is below or equal to a first threshold and above a second threshold and the confidence score is below a confidence threshold, then the article is not moved, but if the factual accuracy of an article is below or equal to the first threshold and above the second threshold and the confidence score is greater than or equal to the confidence threshold, the article drops one spot in the list, and if the factual accuracy is below or equal to the second threshold and above a third threshold and the confidence score is below a confidence threshold, the article drops a first multiple spots (e.g., 2) in the list, but if the factual accuracy is below or equal to the second threshold and above the third threshold and the confidence score is greater than or equal to the confidence threshold, the article drops a second multiple spots (e.g., 5) in the list, and if the factual accuracy is below or equal to the third threshold and the confidence score is below a confidence threshold, then the article drops multiple spots in the list, but if the factual accuracy is below or equal to the third threshold and the confidence score is greater than or equal to a confidence threshold, then the article is removed from the list. In some embodiments, if the confidence score is not above a threshold, no effect (e.g., drop) is taken. In some embodiments, there are multiple confidence thresholds (e.g., a first, a second and a third confidence threshold), and depending on what the confidence of a fact check result is compared to the thresholds affects the outcome of the article (e.g., above first confidence threshold has a greater effect than below the third confidence threshold).

Figure 18:
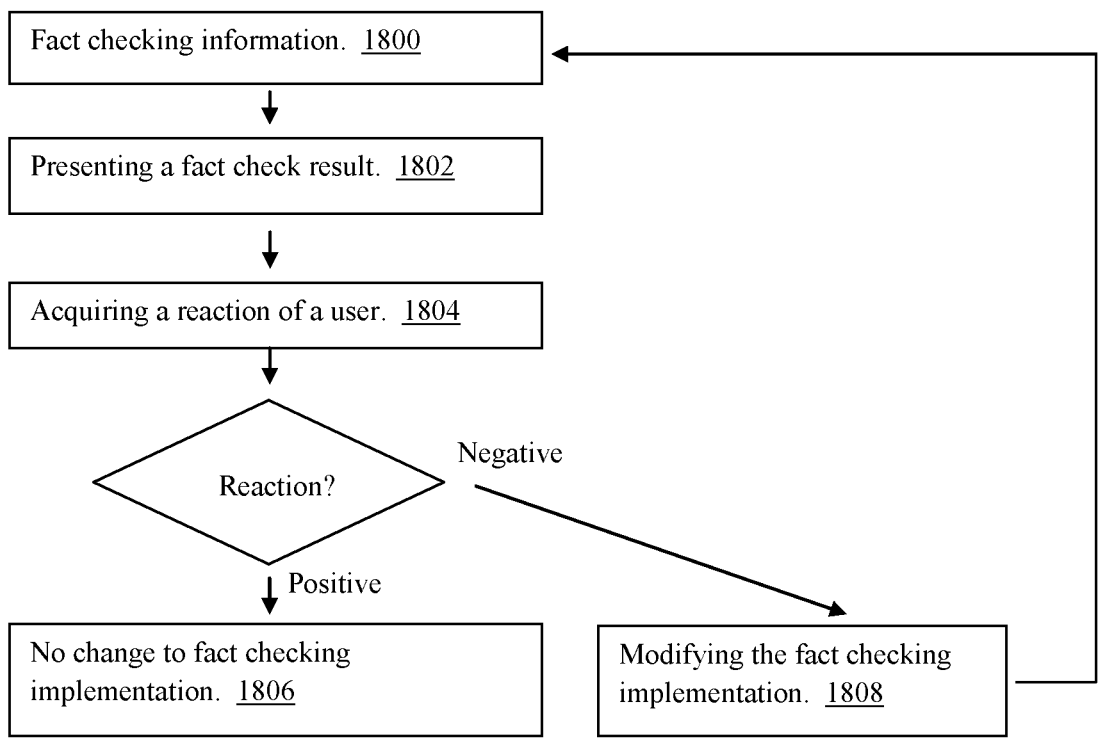
FIG. 18 illustrates a flowchart of a method of fact checking utilizing fact checking analytics according to some embodiments.

FIG. 18 illustrates a flowchart of a method of fact checking utilizing fact checking analytics according to some embodiments. In the step 1800, fact checking as described herein is performed (e.g., monitoring/analyzing, processing and fact checking). In the step 1802, a fact check result is presented. For example, an initial fact check result is a generic, non-user-specific result, but subsequent fact check results may be tailored or modified otherwise. Furthering the example, a generic result of true, false, or any other characterization is initially presented.

In the step 1804, a reaction of a user to the first fact check result is acquired. The reaction of the user is able to be acquired in any manner such as by asking the user if they agree with the result, and the user inputting (e.g., clicking, saying, touching) "yes" or "no." In another example of acquiring the user's reaction, a camera/microphone device (e.g., camera/microphone in a smart phone/tablet/tv or webcam) monitors the user reaction and utilizes software capable of recognizing expressions on a user's face/body (e.g., smiling, frowning, nodding, head shake, shrug, laughing, crying) or a user's sounds, tones, words (e.g., words of agreement/approval or disagreement/disapproval). In another example, users are able to like/dislike, give thumbs up/down, or provide other reactions to fact check results. In another example, a user's blood pressure, heart rate, perspiration, oxygen levels, and/or other bodily information is measured (e.g., using a heart rate monitor contained within a smart watch or other device). Based on studies, an elevated heart rate may indicate the person strongly disagrees with the result from being frustrated. Furthering the example, the smart watch worn by the user and the device (e.g., smart phone, television) presenting the information (e.g., news report) communicate (e.g., are synchronized) with each other, so that if the user's heart rate goes up significantly, the device presenting the information receives this information and recognizes that it is in reaction to the current fact check results. The synchronization is able to be based on the timing of items such as keeping track of when fact check results are displayed and the user's heart rate, and if the heart rate rises within 10 seconds of the fact check result, then it is determined the heart rate change is based on the fact check result. In some embodiments, analysis is performed to determine how long a specific user's heart rate takes to rise and how much (e.g., by providing training results and monitoring the user's heart rate). In some embodiments, the heart rate analysis is a preliminary determination of the reaction, and a follow-up is used to make a full determination. For example, if the user's heart rate rises after a fact check result is displayed, the user is then prompted to answer if they agree or disagree with the fact check result. In some embodiments, the prompt to the user is not displayed unless the heart rate alert (or other preliminary item) is triggered. In some embodiments, training/learning of the body analysis (e.g., heart rate) is performed. For example, the system monitors a user's heart rate for a week along with the information (news stories) and fact check results being presented to the user to determine if there are patterns before taking steps based on the reactions.

In the step 1806, if the reaction is positive (e.g., smile, agree, thumbs up, no heart rate change), then no change to the fact checking process occurs. In the step 1808, if the reaction is negative (e.g., frown, disagree, thumbs down, heart rate rises), the fact checking implementation is modified.

In some embodiments, modifying the fact checking implementation includes modifying the sources used for fact checking. For example, a first set of sources are used for fact checking initially, and if the reaction is negative, a second set of sources are used for fact checking. In some embodiments, the second set of sources are narrower (e.g., fewer), and in some embodiments, the second set of sources are broader (e.g., more) than the first set of sources. In some embodiments, the second set of sources are limited to sources with a factual accuracy/reliability rating above a threshold. In some embodiments, the second set of sources are selected by the user and/or another entity (e.g., web site owner, social networking system). In some embodiments, the user is able to select sources to use in addition to the first set of sources for fact checking. In some embodiments, the fact check is repeated using the modified set of sources, and a result is displayed such as "confirmed" or the new result is presented. In some embodiments, if the result is confirmed, nothing new is displayed.

In some embodiments, modifying the fact checking implementation includes utilizing sources based on social networking. For example, the first set of sources used for fact checking are sources approved by the user, and the second set of sources used for fact checking are sources approved by the user and sources approved by the user's contacts. In another example, the approval/disapproval implementations described herein are utilized to determine different sources to utilize for fact checking, and the different approval/disapproval implementations are able to be utilized sequentially as negative reactions are detected (e.g., after a first negative reaction is detected, approved sources approved while logged in are used, and after a second negative reaction is detected, approved sources specifically selected as approved are used, and after a third negative reaction is detected, approved sources of the user and contacts of the user including resolving any conflicts between approvals/disapprovals are used). In some embodiments, each different set of sources is limited to the specified type of sources (e.g., only sources approved while the user was logged into the social networking site). In another example, a database links sources of social networking contacts to be used for fact checking.

In some embodiments, modifying the fact checking implementation includes presenting a tailored fact check result based on user information (e.g., job, income, political affiliation, activities, preferences accessible in a data structure or analysis of online data). For example, instead of merely presenting "true" when fact checking "the ocean's temperature is rising," since one of the user's activities is scuba diving as determined by analyzing the user's social networking information, the result is tailored to say, "true, and this is having a significant impact on coral reefs around the world."

In some embodiments, the process of modifying the fact checking implementation based on the user's reactions repeats. For example, if the user reacts negatively when the next fact check results are presented, then another set of sources are used for fact checking, and/or a tailored or modified-tailored fact check result is presented. In some embodiments, the process of modifying the fact checking implementation stops after a threshold is reached. For example, after three modifications of the fact checking implementation, no further modifications are made.

In some embodiments, if a user continues to react negatively to the fact check results (e.g., detect a number of reactions above a threshold), then steps are able to be taken such as asking additional questions, providing statistics, enabling the user to provide a response and automatically providing a rebuttal of the user's response by fact checking the user's response and providing sources supporting the rebuttal, stopping fact checking, and/or providing silly comments such as instead of presenting "false" as the fact check result, presenting "this is completely wrong, but you always reactive negatively, so nevermind."

In some embodiments, modifying the fact checking implementation includes utilizing a reverse psychology implementation, and the reaction is monitored and analyzed. For example, a database stores fact check results and corresponding reverse psychology results, and if the conditions are appropriate (e.g., detecting number of negative responses above a threshold), then the reverse psychology results are presented. Furthering the example, the reverse psychology results are able to be generated automatically or manually (e.g., a user reviews a fact check result and inputs a corresponding reverse psychology result).

In some embodiments, modifying the fact checking implementation includes challenging a user when his reaction is negative. For example, the user is requested to provide evidence (e.g., voice input, text) for the user's position. In some embodiments, the fact checking system is configured to receive images, links, text, audio, and/or other information for analysis (e.g., a user is able to drag and drop content into a window, upload a file or input the information in another way). The fact checking system then analyzes the user's evidence and provides results. For example, a user submits a link which disagrees with the fact check result, and the fact checking system fact checks the content in the link and provides the fact check results to the user (e.g., this study has been refuted by 97% of the scientists in the world) including citations which disagree with the content of the link (e.g., please review these links which rebut your link). The citations are able to be found by maintaining a database including the links (or other content) and opposing links (or other content), and retrieving information from the database. For example, a website address with opinion X is stored in a database, and a website address with opinion Y (opposing opinion X) is stored in the database with a relationship with the opinion X website address (e.g., the two cells are linked or otherwise related). In some embodiments, challenging the user includes offering the user a prize if the user is able to provide valid support for his position.

In some embodiments, modifying the fact checking implementation includes providing fact check results determined based on analyzing user information (e.g., personality, occupation, political affiliation, psychological analysis). For example, the first fact check result is presented as usual, and then the user's reaction is analyzed, and if the reaction is negative, the second fact check result is in a different manner dependent upon the user information. Furthering the example, the user's occupation is determined to be Occupation X (e.g., by analyzing social networking information or by retrieving it from a database), so the second fact check result is displayed with specifics of how it affects the user including citations providing support; however, for a second user with an occupation of Occupation Z, the second fact check result is displayed using reverse psychology. In another example, the sequence of how fact check results are presented is: generic, tailored, tailored with example, tailored with citations and sarcasm for Personality-type X, and the sequence of how fact check results are presented is: generic, tailored with example and citations, and no more fact check results for Personality-type Z. In some embodiments, the sequence of providing fact check results in different styles/formats is learned based on the analysis of users' reactions or the user's reaction. In some embodiments, user information is analyzed and determined (e.g., retrieve user occupation from social networking site or ask user to select their personality type), and the determination is stored (e.g., in cache, metadata, a cookie, a data structure), and each time a fact check result is to be presented, the stored information is checked to determine how to present the fact check result. In some embodiments, a counter is used with the different ways of presenting fact check results to determine which type of result to present (e.g., present generic result when counter is 0; after detecting negative reaction, increment counter; present tailored result when counter is 1; after detecting negative reaction, increment counter; present tailored result using modified sources when counter is 2, and so on).

In some embodiments, users are classified based on open/closed-mindedness (e.g., a user is queried and/or selects how open-minded he is, and/or his contacts of a social networking site are queried). For example, a user with a very open mind is given a score of 10, and a very closed mind is given a score of 1. In another example, a user's social networking contacts are queried about how open-minded the user is, and the social networking contacts each select a value between 1 and 10, and then the social networking contacts' selections are averaged to generate the user's open-mindedness score. And based on the user's score or classification, different fact check results or fact check implementations are utilized and/or different fact check sequences are utilized. For example, a very open-minded user is provided generic fact check results using all sources for fact checking, and a very closed-minded user is provided tailored fact check results using only sources classified as having the same political affiliation as the user.

In some embodiments, modifying the fact checking implementation includes providing a similar but modified fact check result. For example, a fact checking implementation fact checks a sentence, "President Z is the worst president ever because of A, B, C." However, A, B and C are false, so the fact check result is "false" or "A, B and C are false." When the user's negative response is detected, the fact check result is modified to, for example, "President Z is the worst president ever because of J, K and L (which are true); however, A, B and C are false." Providing a similar but modified fact check result is able to be performed in any manner such as by finding a part of a sentence that is factually accurate, opinion, questionable or not factually inaccurate, and adding content which corresponds to that part of the sentence instead of or in addition to the fact check results of the whole sentence or other parts of the sentence. Furthering the example, a relational database is able to store information such as President Z, and then in related cells, row or columns, there is information such as items why President Z is great or the greatest, why President Z is terrible or the worst, controversies of President Z, accolades/ accomplishments of President Z, and/or any other information that is searchable and retrievable. In some embodiments, the relational database is separated into positives and negatives for each entity, and when content is fact checked, it is determined if the content is negative or positive, and information is retrieved from the corresponding positive/ negative aspect of the relational database.

In some embodiments, modifying the fact checking implementation includes: when providing results, only providing the results if a source with the same affiliation as the political affiliation of the user (or other commonality) is utilized to generate (and agrees with) the fact check result. For example, if a user is a Conservative, fact checking utilizes only Conservative sources (e.g., sources are able to be classified manually or automatically based on political affiliation). In some embodiments, the fact checking is not limited to only sources of the same affiliation (e.g., Conservative sources), for example all sources are still used, but the result is only presented if at least one of the Conservative sources agrees with the result. For example, if only 10 Conservative sources are used to fact check an item of content, the result may be 90% True (e.g., 9 out of 10 find the item to be true). However, if 30 sources are utilized (10 Conservative, 10 Liberal and 10 neutral), the result may be 70% False (e.g., 21 out of 30 find the item to be false). And if at least 1 of the 10 Conservative sources indicates false, then the status of false is presented, and in some embodiments, a cite or other indication of the Conservative source with that same result is also presented. In another example, 30 sources are used, and all 10 Conservative sources disagree with the result, so a status of questionable, unknown, disputed, or other status is presented, or both statuses are presented with an indication of which sources were used to determine which status.

In some embodiments, modifying the fact checking implementation includes providing fact check results and reactions of other users (e.g., social networking contacts of the user). For example, if a user and 5 contacts read an article, all of their reactions are recorded and provided to each other. Furthering the example, the user reads the article and reacts negatively as detected by his phone's camera, and after the negative reaction is detected, information (e.g., a graphic) is displayed on the user's phone indicating that 4 contacts reacted the same way and 1 contact reacted differently. In some embodiments, statistics are provided based on user reactions. For example, 90% of users who read this reacted positively and 10% of users reacted negatively. In some embodiments, the other users' reactions are provided to the user, when the user accesses the same web site, article, video, and/or other content. In some embodiments, content that is viewed by one or more contacts is shared among contacts. In some embodiments, thresholds are used to determine when content is shared. For example, if a webstory is read by 3 contacts, the story is automatically shared with any other contacts of the user.

In some embodiments, modifying the fact checking implementation includes providing simple information and gradually providing more complex information. For example, a database stores fact check results corresponding to information, and the fact check results are separated or ordered based on simple fact check results going to complex fact check results. In some embodiments, the database is indexed (e.g., simple fact check result is indexed to 0 or 1, . . . , most complex fact check result is indexed to 10 or N). Furthering the example, a counter is used, and the counter is increased each time a negative reaction of a user is detected. The counter is used to retrieve the correspondingly indexed fact check result. In another example, information is fact checked, and the result is false, which is presented as "False." The user reacts negatively, and the counter is increased from 1 to 2 (or 0 to 1), and the fact check result is still false (in some embodiments, analysis is not re-done for the same information), but instead of simply stating "false," a specific segment is indicated as being false, and then the next time, the specific segment is indicated as being false because of X, and so on, with more and more detail.

In some embodiments, modifying the fact checking implementation includes gradually leading a user toward a desired outcome step by step using leading information stored in a database (e.g., a database stores all of the steps in a process, and each one is provided to a user step by step leading to a conclusion).

In some embodiments, modifying the fact checking implementation includes offering perks for receiving fact checking results. In some embodiments, an eye tracking implementation is utilized to track a user's eyes to ensure the user reads the fact checking result. If the user does not read the fact check result, a reminder is provided to the user (e.g., pop up window), or the fact check result is moved to where the user's eyes are determined to be looking.

Modifying the fact checking implementation is able to be implemented on the same information (e.g., same information is re-fact checked and/or results are presented in a different manner) and/or different information (e.g., user disagreed with fact check of a first set of information based on fact checking implementation 1, and a second set of information is fact checked using fact checking implementation 2).

As described herein, advertising on a web page is able to be blocked based on fact checking and/or other events (e.g., user actions). In some embodiments, modifying a web page based on fact check results is able to include preventing, blocking or otherwise not displaying an advertisement. For example, if a web page or web site is determined to have false or misleading information, the advertisement that would typically be displayed on the web page is not. Preventing the advertisement from being displayed is able to be implemented either on a user-side or a server-side implementation. For example, an advertising company (or intermediary) does not provide the advertisement to the web page/site/host. In another example, a user device is given a signal to not display an advertisement when the user views a specified web page/site. In some embodiments, the advertisement is displayed, but the web page or web site (e.g., the owner of the web site) does not receive advertisement revenue if the web page/site is determined to have false information. Determining if a web page has false information is able to be implemented in any manner such as characterizing each phrase, sentence, paragraph or other unit as factually accurate, inaccurate, misleading or another label, and if a quantity and/or percentage of the units (e.g., sentences) of the web page determined to be factually inaccurate (or other specified label) exceeds a threshold, then the web page is determined to be factually inaccurate, and the advertising/advertising revenue blockage is implemented. For example, if a web page is determined to include over 20% (or more than 5 units) of factually inaccurate information, then advertising is blocked for the web page. In some embodiments, web pages/sites are manually and/or automatically determined to be factually accurate or inaccurate. The factual accuracy label of a web page is able to be embedded in the web page, in a cookie for the web site, or another location. In some embodiments, web pages/sites that are determined to be factually inaccurate are stored in a data structure (e.g., database) which is then cross-checked before displaying an advertisement and/or paying the web site. For example, if xyz.com/123.html is determined to be factually inaccurate, that link is stored in a database, and when the advertisement company or intermediary is accessed to display an advertisement for that page, the advertisement company/intermediary denies the request, does not count up/count a click, and/or otherwise prevents any benefit of advertising for the web page with the factually inaccurate information. In some embodiments, a mechanism is provided for the web page/site is able to refute the factually inaccurate claim. In some embodiments, validity ratings of entities are able to be factored in when determining whether to display an advertisement/pay a hosting/displaying site. For example, if an author of an article has a validity rating below a threshold, an advertisement is not displayed with his article, or payment is delayed until the article/page is fact checked (e.g., manually or automatically) to ensure factual accuracy.

As described herein, a drone device is able to be used to gather information, transmit the gathered information, process the information, fact check information, generate information and/or other tasks. The drone device is able to be any device capable of acquiring information. Specifically, the drone device may be a unmanned aerial vehicle or unmanned aircraft system capable of operating without a person in the aircraft such as under remote control which is operated by a human or fully or intermittently autonomously by an external or onboard computer. In some embodiments, the drone device is not a flying device, but rather a water-use device such as a boat or a device capable of moving on land, but again operable either by remote control or autonomously. As described herein throughout, in some embodiments, the drone device operates under manual control (e.g., by a remote control) or autonomously (e.g., fully or intermittently without manual user input). For example, in some embodiments, a drone device is controlled using a remote control, and in some embodiments, the drone device is able to operate without any input from the person. The drone device is able to be employed for journalistic purposes.

In some embodiments, drones are positioned in strategic locations to be able to "arrive at the scene" in an efficient manner. For example, instead of storing a drone at a news network station, multiple drones are positioned in different locations around a city to provide faster access to newsworthy material. The positioning of the drones is able to be based on distance from each other, distance to typical hotspots of activity (e.g., closer to higher crime locations or closer to higher profile buildings/landmarks), or any other determination. The drones are able to be stored on rooftops, standalone locations, trees, bridges, and/or any other location. The drones are able to position themselves based on analyzed information.

In some embodiments, a drone is configured to monitor police information (e.g., scanners, radios, 911 calls), media information, social network information (e.g., Twitter, Facebook), and/or any other information to determine a location to acquire information and/or what information to acquire. Monitoring the information is able to include capturing the information, processing the information, parsing the information, and/or any other steps to analyze the information to take action. For example, the information is able to be compared with a database of keywords such as: shooting, terrorist, fire, police, address information, and so on, and when a keyword or a number of keywords above a threshold is determined, then the drone moves to the appropriate location. Furthering the example, by monitoring 911 calls, the drone detects the word "fire" and a location of "123 Main Street," so the drone automatically determines a fastest route to the location and moves to a location near 123 Main Street. In some embodiments, the drone monitors multiple sources (e.g., police, media, social media), and when a number of sources above a threshold provide the same or similar information, the drone moves to the location. In some embodiments, the sources are classified (e.g., emergency, media, social media), and if a number of sources in a class above a threshold provide the same or similar information, the drone moves to the location. In some embodiments, a drone is able to confirm its position based on comparing rooftop images with stored rooftop images. In another example, the drone monitors social networks for trending information and/or hashtags, and if the trending information or hashtag is relevant to news (e.g., # shooting), the drone also determines if an address or other location information is available (e.g., in the tweet it says Shots Fired at 123 Main St. # shooting), the drone is able to parse the address information and move to that location. In some embodiments, information (e.g., social networking information) is cross-checked before moving. For example, the drone waits until the number of tweets regarding a fire is above a threshold (e.g., 100) before moving, or in some embodiments, the drone starts moving towards a location after a first threshold (e.g., 50 tweets) has been reached, but stops half way (or some other distance) or goes at a slower speed until a second threshold (e.g., 100 tweets) has been reached. In some embodiments, other devices monitor/listen and then provide instructions to the drone. For example, a server device monitors social network information, and when an alert is triggered, the server device sends instructions to the drone for the drone to move into position.

In some embodiments, monitoring includes searching for visual/audio clues (e.g., detecting with an onboard camera: police lights/car/sirens, fire truck, fire, smoke, weapons, car accident, traffic, explosion, an earthquake, weather events such as lightning or a tornado, sounds such as gun shots, and/or other triggers). For example, the drone device includes a camera which is able to acquire images/video, and the images/video are able to be compared with templates (stored in onboard memory, in the "cloud" or another device). In another example, using a sound listening/recording device (e.g., microphone or multiple microphones), specific audio (e.g., gun shot, explosion, scream of "help," car accident, Robocopp alarm, alarm system siren) is able to detected and matched with template audio. Furthering the example, a gun shot sound is able to be acquired and compared with template audio which stores different gun shot sounds. In some embodiments, visual confirmation of where the gun shot occurred is determined. In some embodiments, location implementations (e.g., triangulation implementations) are utilized to determine where the audio is coming from. In some embodiments, multiple drones are utilized to determine the location of the source the audio, for example, differences in how long it takes the sound to reach each drone are used to determine the location of the source of the audio. For example, the sound is received at the North microphone slightly before the West, East and South microphones, so the drone knows the sound came from the North. In some embodiments, by having multiple sound recording devices on the drone (e.g., on opposite ends of the drone device), a single drone is able to determine a direction or location of the source of the audio. In some embodiments, the audio information is analyzed (onboard or by another device) to determine additional information (e.g, type of gun shot, type of explosion, gender of voice, words spoken). When a visual/audio clue is determined/detected, the drone is able to send location information (e.g., GPS coordinates, address information) to a remote location (e.g., news station). Additional information acquired by the drone (e.g., using additional onboard devices such as a thermometer, barometer, clock, calendar, altimeter, GPS device, accelerometer, gyroscope) is able to be acquired and sent as well such as time, date, traffic conditions, weather conditions, and more.

In some embodiments, the drone is triggered by an alarm system signal (e.g., Building X sends a signal to a drone or drones because of potential criminal activity). The alarm system is able to broadcast, send a direct signal and/or communicate in any other way to one or more drones. For example, a neighborhood is able to utilize a single drone or multiple drones which serve any house with a corresponding security system. Furthering the example, a drone is centrally positioned within a neighborhood of 100 houses which each have a security system. The 100 security systems are able to communicate with the drone such that each house does not need its own drone.

In some embodiments, the information captured by the drone is automatically deleted within a designated amount of time and/or is never stored, unless triggered to store the information. For example, for privacy purposes, although the drone may roam to monitor one or more properties, the drone only stores data that is captured when a trigger is detected (e.g., a security system detects a breach or the drone detects suspicious activity as determined by template comparisons). By not storing the non-triggered data, people's privacy is better maintained as there is no/less stored data to hack and steal.

The information monitored/acquired is processed onboard or by another device (e.g., the Cloud). Processing as described herein is able to be include parsing, converting (e.g., from sound, video, image to text), storing, modifying, merging, and/or any other processing.

In some embodiments, the information (e.g., the processed acquired information) is used for fact checking as described herein. In some embodiments, information is fact checked using drone-acquired information in combination with the social networking implementations as described, or any form of fact checking. For example, if breaking news is reported (e.g., via social networking or another news source), the information acquired by the drone(s) is used to fact check the breaking news and indicate any misinformation. In some embodiments, the information is used to fact check other drone information. For example, if drone 1 acquires a picture of a car accident, and indicates that car 1 hit car 2, but drone 2 acquires other pictures of the car accident which clarifies that car 2 hit car 1. In some embodiments, the drone-acquired information is fact checked using other source information.

In some embodiments, additional actions are taken using the acquired information such as automatically generating a story (e.g., video clip, images, article), automatically summarizing the story, broadcasting video live, transmitting content (e.g., video, audio, image) to a news organization, and/or other actions.

Automatically generating a story is able to be performed in any manner. For example, a video clip or image acquired by the drone is able to be posted to social media such as Facebook® or Twitter®, and the appropriate hashtags are automatically assigned based on comparing the acquired content with templates. In some embodiments, a user (e.g., host) is able to add audio or visual commentary to the drone video remotely (e.g., the audio while talking in the news room is added to the drone's video). In another example, after detecting an incident (e.g., car accident), the drone device takes one or more pictures, and posts the pictures via a social network with a short description automatically generated based on analyzing the pictures. Furthering the example, a car accident is detected on I-5 at 8:30 a. The drone takes a zoomed in picture to show the damage of the cars with the text "accident between two vehicles at 8:30 a on I-5." Based on comparisons with car accident templates involving two vehicles, the text "accident between two vehicles at" is generated, "8:30 a" is filled in based on the clock device on the drone, and I-5 is filled in based on GPS coordinates and/or image comparison of the Interstate. The drone takes a second picture which is zoomed out to show traffic. The text "traffic building up on I-5" which is based on a comparison of the second picture with a template of traffic and the GPS/mapping information determined by the drone device, is able to be provided with the second picture on the social network. Thus, an up-to-date story of the traffic accident is able to be provided via social networking or any other news outlet using the drone with or without any user involvement. The story is able to be updated automatically based on time (e.g., updated every 5 minutes) or based on significant events (e.g., detecting changes in the scene such as detecting a police car or tow truck arriving or traffic lessening). The automatic content generation is able to be implemented without user intervention.

In some embodiments, the drone automatically generates content in response to breaking news. For example, the drone detects and analyzes a tweet or other breaking news information, and responds by acquiring information related to the breaking news. For example, if a tweet includes the text, "explosion in downtown City X, 5 buildings burning," a nearest drone to downtown City X navigates to the target area and acquires content (e.g., video, images, audio). The drone is able to transmit (e.g., tweet) the content, segments of the content, and/or generated content. Furthering the example, the drone takes a picture of the buildings on fire and tweets the picture with text "4 buildings burning" by analyzing the image and locating 4 separate fires or 4 separate buildings with fire.

In an example of generating a story, the drone takes a picture of the sky or horizon, takes a temperature and humidity reading using sensors, and sends the information to be dispersed (e.g., sends a tweet with the picture, temperature and humidity information or updates a Facebook® page with the same information).

In some embodiments, the drone sends images/videos/audio and/or additional information (e.g., a generated story or generated information) to a person to generate a story or supplement the story.

In some embodiments, the drone utilizes object recognition, action recognition, facial recognition, heat (e.g., body heat) recognition, and/or any other recognition. As described herein, object recognition includes recognizing police vehicles, fire vehicles, fires, and/or any other object. In an example of action recognition, the drone is able to match/detect specific actions such as shooting, running, throwing, polluting, illegal dumping, littering, any criminal activities, beneficial activities, and/or any other actions. In an example of facial recognition or person recognition, the drone locates and matches a suspected criminal (e.g., with a database), and sends a tweet, "suspect spotted at First St. and Main St." In some embodiments, the information is sent to the appropriate authorities (e.g., the police). In some embodiments, an action is taken by the drone based on the recognition (e.g., starting to record video, following the object such as following a police car with its lights on). The recognition is able to be performed in any manner such as acquiring an image/video, comparing the image/video with a database of templates and determining if any matches are detected. In some embodiments, the image or video comparison involves point-by-point matching, block matching, estimated matching, and/or any other matching implementations.

In some embodiments, the drone implements object tracking. For example, after an object is recognized/located, the drone continues to track the object until the drone is triggered to stop tracking the object. The trigger is able to be any trigger such as a timeout (e.g., track for 5 minutes then stop), a signal from another device (e.g., studio sends a signal to stop tracking), moving out of range, or detecting a change (e.g., suspect apprehended) or lack of change (e.g., suspect not moving). In some embodiments, multiple drones are used to cover certain ranges or zones, and each drone stays within its zone. The drones are able to coordinate with each other to ensure a target is not lost. For example, if a suspect moves from zone 1 to zone 2, then a second drone is waiting in zone 2 (at the border of zone 2 and zone 1) where the suspect is headed (e.g., based on the first drone's location/trajectory) to continue tracking the target.

In an example of a tracking implementation, a drone receives details regarding a location of a suspect, so the drone goes to the location, and using recognition technologies detects the suspect. Once the suspect is acquired, the drone continues to track the suspect by using the recognition technologies to continue to track the correct suspect. In some embodiments, the drone is able to digitally tag the suspect to track the suspect in addition to or instead of using recognition. In some embodiments, the drone captures and parses specific details of the suspect (e.g., shirt color, hat color, height) and continues to track based on the acquired details. In some embodiments, the drone is able to anticipate actions of the suspect by analyzing the surroundings. For example, if the suspect is approaching a high wall, the drone is able to anticipate the suspect will be turning right or left, or if the drone detects or knows the police are approaching from the left, the suspect will likely go to the right. The drone is then able to take actions in advance such as flying to the right before the suspect moves to the right to ensure being able to continue to track the suspect. Similarly, if the suspect goes in a tunnel or under coverage, the drone has or is able to access data of what is not visible such as a map including the exit of the tunnel or all exits of a building. In some embodiments, the drone is able to be used to guide the police toward the suspect or force/coax the suspect to the police. In some embodiments, the drone is able to toggle between different detection devices such as a regular camera when the suspect is visible and an infra-red camera when the suspect is obscured. In some embodiments, when a drone detects a suspect, the drone is able to communicate with other drones to assist. In some embodiments, requesting assistance depends on the details of the suspect, for example, if the suspect has a criminality rating above a threshold such as an armed murder suspect (e.g., based on information received from the police), then multiple drones are used to track the suspect from different angles. In some embodiments, the drone is a nested drone implementation as described herein which is capable of separating when desired to be able to be in multiple places at once.

Automatically summarizing a story is able to be implemented in any manner. For example, after the drone captures content, the drone or another device, summarizes the content by selecting parts of the content and discarding parts of the content. Summarization is able to include extraction, abstraction or any other form of summarization.

In some embodiments, image summarization includes capturing a set of images from a video to represent the video. For example, a picture from every 10 seconds of a video is shown.

In some embodiments, summarization includes video summarization such as generating vines or other short video clips (e.g., a trailer). The generated video summaries are able to be stored and/or transmitted in chronological order, relevance, importance, excitement, rating, and/or another order. Relevance is able to be determined in any manner such as based on a keyword comparison of the summarized video and other content (e.g., text of the summarized video and text of the other content are compared, and the higher number of matching keywords, the more relevant the summarized video is). Importance is able to be determined in any manner such as a keyword comparison of a database containing important topics (e.g., as determined by users, the media). Excitement is able to be determined in any manner such as based on trending information (e.g., comparing keywords of the summarized video with currently trending topics). Rating is able to be determined in any manner such as based on thumbs up/down. In some embodiments, the summaries are generated using relevance to order aspects of the video. For example, a drone captures 10 minutes of footage, and then the drone or another device (e.g., server) summarizes the video in 30 seconds of footage with the most relevant 5 second clip first, followed by the second most relevant clip and so on, or the most exciting clip first and so on.

In some embodiments, "dead" or boring time is deleted or separated from a video to shorten or summarize the video. For example, a drone captures video of the scene of an accident. At time 00:00-03:00, the video shows the cars in a stationary crashed position. At time 03:01-05:00, the video shows the cars in the crashed position, and a police officer has arrived. At 05:01-15:00, an ambulance has arrived as well. At time 15:01, the police and ambulance leave the scene. Instead of showing a full 15+ minutes of video, the video is able to be summarized by including 10 seconds starting at 00:00, then 10 seconds starting at 03:01, then 10 seconds starting at 05:01, and 10 seconds starting at 15:01, which shows the car crash, the police arriving, the ambulance arriving, and the ambulance leaving. Any scene changes are able to be detected and captured to generate the summary. For example, every tenth frame of a video is able to be compared with the previous frame, and if there is a change in the current frame above a threshold, then that image/video (e.g., a few seconds before and/or after) is included in the summary. In another example, if the change in the current frame is not above a threshold, then the video is skipped or deleted. The frame is able to be compared using any image/video comparison algorithm (e.g., by pixel-by-pixel comparison or group of blocks comparison or super-pixel comparison). In some embodiments, the focus of the frame is able to be narrowed to a portion of the scene. For example, if a traffic accident occurs on a busy road, the outer edges of a frame may be changing often based on moving traffic, but that may not be relevant to the accident, so the traffic is ignored (e.g., by having a focus box on the car accident vehicles). The focus is able to be determined by pattern matching or template matching as described herein and generating a border around the matched scene. In some embodiments, a video summary shows fast forwarding through boring or repetitive moments, so the user is able to briefly see what is going on while skipping to the more interesting moments.

In some embodiments, suspicious, exciting or important activity is extracted from a video to generate a summarized video. For example, using template matching (e.g., comparing an image/frame with a database of templates which represent suspicious, exciting or important information), an important moment is detected in a video, and 10 seconds before and 10 seconds after the important moment are captured and used as a summary or part of a summary.

In some embodiments, image/video analysis is utilized to classify different aspects of the video for labeling and summarizing the video. For example, using template matching: cars, people, streets, police vehicles, ambulances and other items are labeled in a video, and the labels are utilized to summarize the video. For example, a data structure stores the labels and the time in the video when they appear or disappear from the video, and based on the data in the data structure, a summary is generated. For example, a text summary is able to indicate: two vehicles involved in accident from 00:00-30:00, police on scene 02:30-11:46, and ambulance on scene 5:34-11:46. The template matching or any other image/video analysis is also able to be used to detect and label items/actions such as blood, fighting, shooting, a gun, a knife, and/or a fire. In some embodiments, detection is optimized by narrowing down options based on a first category detection and then using sub-category items/actions within the first category. For example, if a car accident scene is detected, sub-category items/actions to detect include cars, blood, police, ambulances, street signs, but do not include airplanes or knives. This optimizes the search and detection of items since these items/actions are more likely to be found at the scene of an accident. In some embodiments, if an item is not detected in the sub-category, then categories outside of the sub-category are used. For example, if one of the people pulls out a gun in road rage, the gun or action may not be detected using the sub-category items/actions, but by going to outside categories after checking the appropriate sub-category, the item/action is detected (e.g., the gun). In some embodiments, going to extra categories involves going to related categories first before going to unrelated categories (e.g., police is related to fire) to again optimize the search and detection process.

In some embodiments, the summary only includes still images with or without an accompanying text description.

In some embodiments, a summary is generated by detecting keywords in the video and clipping a video starting with a predetermined time before and ending at a predetermined time after the keyword. For example, a video is acquired of a crime scene, and the audio is analyzed to determine when the keyword "shooting" is detected, and a summary which starts 10 seconds before the word "shooting" and 10 seconds after is captured/generated.

In some embodiments, generating a summary involves converting video and/or audio (or a portion of the video/audio) to text (e.g., a tweet). In some embodiments, the tweet includes a link to the video/audio.

In some embodiments, generating a summary includes focusing on sending the summary through social networking. For example, a drone captures content, and then the captured content is sent to user devices through Twitter®, Facebook®, YouTube® or any other social networking system or web page. In some embodiments, the drone-captured content is sent to a server or other device, and then the server or other device sends the drone-captured social networking content. In some embodiments, as described herein only portions or summaries of the content are sent via social media, for example, a captured image from the drone video (or the drone takes pictures) is sent every minute via Twitter® with the same hashtag for each one. In another example, when a highlight is determined/detected, an image or short video clip is sent via social networking. A highlight is able to be determined or detected using keyword comparison, image comparison or any other manner. For example, if a drone video captures audio, and the audio is converted into text, the text is searched, and when a keyword is detected, a video clip and/or an image is captured/extracted and provided on social media. In some embodiments, video before and/or after the keyword is detected is also captured and distributed. In some embodiments, multiple images before and after the keyword is detected are captured and distributed (e.g., 3 images spaced 5 seconds apart, before and/or after the keyword, are distributed). Similarly, using image comparisons, when a desired image match is detected (e.g., match of traffic increasing), then an image is captured and sent via social media. In some embodiments, keywords and/or images are arranged in a hierarchy such that there are groups and sub-groups to optimize searching/comparison. For example, using image comparison, an accident is detected, then under accident items such as police, ambulance, people are searched for and detected, and items that would not likely be found at an accident such as flood water will not be searched for.

In some embodiments, the drone or another device is able to provide supplemental information to generate a narrative or summary. For example, in addition to providing video clips, images, audio, and/or a text summary, the drone or other device acquires information from another source (e.g., the Cloud) to add information. For example, the drone analyzes a license plate of a vehicle that is in a car chase avoiding the police, and using the Cloud, the drone indicates that the car is registered to Jane Doe. In another example, when a shooting is detected, the drone and/or other device analyzes police records and provides the supplemental information that this was the fifth shooting of the year in this city.

The information acquired by the drone is able to be broadcast as live video. For example, a drone acquires video and transmits it to a news broadcasting company which then transmits it for display on television. In some embodiments, the drone broadcasts the video directly to users. Similarly, the drone is able to transmit content for streaming video (e.g., on YouTube®).

In some embodiments, a drone (or another device such as a server) is utilized for providing and/or blocking advertising. For example, the drone determines a location based on GPS information, and provides an advertisement or additional information for the location. Furthering the example, the drone is hovering near a hotel, and based on GPS information, street information, image recognition or another analysis, the hotel is identified as XYZ Hotel, so an advertisement for XYZ Hotel is displayed along with the drone-acquired information (e.g., in a picture-in-picture or split screen view). In some embodiments, the context of what the drone is capturing is taken into account when determining the advertisement. For example, if the drone is recording news of a murder in front of XYZ Hotel, it would be in bad taste to show the advertisement of the hotel, and the hotel would not want to be advertising a nearby murder, so either the XYZ Hotel advertisement would not be shown and/or a different advertisement would be shown (e.g., an advertisement for an upcoming gun show). The context is able to be determined in any manner, automatically and/or manually, for example, by image/video template matching and/or any other image/video analysis, converting police information from audio to text, or by receiving text information from another source describing the situation (e.g., police report).

Figure 19:
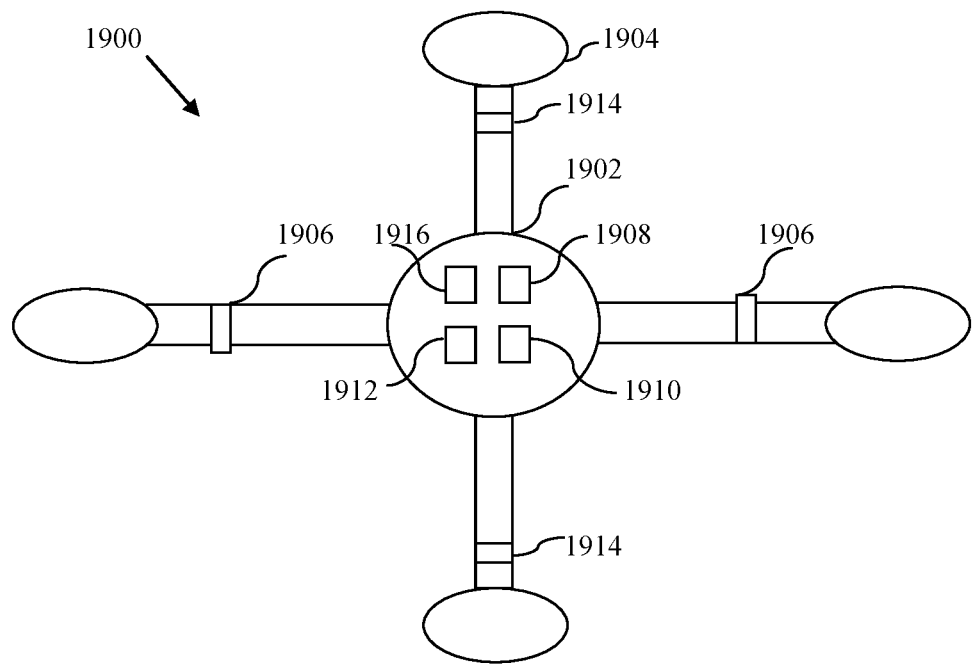
FIG. 19 illustrates a diagram of an exemplary drone for fact checking and content generation according to some embodiments.

FIG. 19 illustrates a diagram of an exemplary drone for fact checking and content generation according to some embodiments. The drone 1900 includes a body 1902 and one or more propellers 1904. In some embodiments, another lift mechanism is used such as forced air below the body. Coupled to the body 1902 are additional components such as a one or more video cameras 1906 and one or more microphones 1914. The one or more video cameras 1906 are able to be any type of video camera such as a regular video camera, a wide lens video camera, an infrared/thermal video camera, a night vision camera, a 360 degree video camera, a panoramic camera, a digital camera and/or any other type of camera/video camera. In some embodiments, two way cameras (e.g., a camera with lenses pointing in multiple and/or opposite directions) or multiple cameras pointing in opposite directions are utilized, so the drone does not have to turn around. In some embodiments, when multiple cameras are utilized, the cameras operate independently including zooming at different amount (e.g., zoom in with one camera and zoom out with another camera to provide varying views of a scene). The one or more video cameras 1906 are able to be positioned anywhere on the drone 1900 such as an arm, the central component, or elsewhere. In some embodiments, in addition to or instead of a video camera, one or more photo cameras are included and/or the video cameras have photo capture capabilities. The drone 1900 includes one or more sensors/components 1908 such as a temperature sensor, barometer, altimeter, wind speed detector/sensor, light sensor, moisture sensor, magnet, magnetic sensor, location mechanism (e.g., GPS device) and/or any other devices for measuring, sensing and/or detecting information. In some embodiments, the sensors are able to be used for navigation. For example, using the temperature sensor, the drone is able to detect that the air is warmer in a specific direction, and continues in that direction to track a fire. Similarly, a light sensor (e.g., capable of detecting different wavelengths of color) is able to be used to track an object emitting light (e.g., using a light sensor that detects specific light colors such as blue for police) to detect and/or track a police vehicle. In some embodiments, the drone 1900 includes computing components 1910 such as a memory/storage for storing fact checking summarization and content generation applications, a processor for processing commands/data, a networking/transmitting component for sending data to other devices, and/or any other computing components. The drone 1900 includes other standard drone components such as gyroscopes, accelerometers, a power supply, and/or any other components. In some embodiments, the drone 1900 includes solar panels/cells/devices 1912 or other alternative energy power sources such as a gyroscope or wind turbine to acquire/provide power. The solar panels 1912 are able to be positioned anywhere such as on the arms of the drone 1900, the central component, and/or elsewhere. The drone 1900 is able to include one or more microphones 1914. In some embodiments, the microphones 1914 are part of the video cameras 1906, and in some embodiments, the microphones 1914 are a separate and/or additional component. The microphones 1914 are able to be positioned anywhere on the drone 1900. In some embodiments, the drone 1900 includes a spot light or another lighting system. In some embodiments, the drone 1900 includes protective gear such as armor or shielding. In some embodiments, the drone 1900 includes camouflaging and/or a cloaking mechanism. The cloaking mechanism is able to be implemented in any manner such as a video screen on the bottom of the drone 1900 and a video camera pointed above the drone 1900, so the video screen is able to display the sky above the drone 1900 such that the drone does not appear to be in the sky. Although one configuration of a drone is shown in FIG. 19, any configuration of the drone is able to be implemented (e.g., with more or fewer propellers, a different body shape/configuration).

In some embodiments, the drone 1900 includes components 1916 such as a light, a laser, a tracking mechanism (e.g., to track another object, or for another object to track the drone such as a control room to be able to visualize where the drone is on a computer-generated map), a gimbal, gyroscope and/or accelerometer for stabilization, and/or an obstacle avoidance mechanism (e.g., using camera and depth map, or laser, or sound to determine if objects are near and how close they are). For example, the drone 1900 uses laser tracking (e.g., is capable of detecting a laser light and following it) and/or includes a laser for pointing at objects. In some embodiments, the drone 1900 includes interchangeable parts such as lenses which are able to be replaced while the drone 1900 is in operation or not. For example, an extra lens is stored within the body of the drone, and if the first lens is damaged or covered (e.g., by water), then the drone drops or removes the first lens and replaces it with the extra lens. The lens is able to be attached via a clipping mechanism and easily removed via the clipping mechanism, so the change occurs while in use.

In another example, the drone 1900 includes one or more lights which change color and/or flash based on what is detected (e.g., by the camera, microphone, light sensor and/or other component) and/or based on any other condition/information. For example, if the video camera detects police lights and/or the microphone detects a police siren, then the one or more lights illuminate blue; if a fire is detected or fire truck lights are detected, then the one or more lights illuminate red; if ambulance lights are detected, then the one or more lights illuminate white; and if a dangerous situation is detected such as detecting a gun, then the one or more lights flash yellow.

In some embodiments, the drone 1900 utilizes remote wireless charging. For example, the drone is able to charge its power supply by flying to a charging station which is able to be on a roof, tower, pole, and/or any other location. The drone 1900 is able to determine the nearest available charging station. For example, each charging station has detection implementation (e.g., a weight sensor or electrically determining a connection) which is connected to a database and/or system which tracks the charging stations and is able to relay the information to the drone 1900. Furthering the example, a drone is looking to charge, and it accesses the charging station information to determine that the nearest charging station is occupied, so the drone goes to the second nearest charging station. In some embodiments, the amount a drone is charged is also stored and accessible by other drones (e.g., if drone 2 is 99% charged, it may be preferable for drone 1 to go to that charging station instead of a further one since drone 2 will be charged soon). The amount of charge, time remaining to charge and/or other information is able to be determined and calculated in any manner. For example, if a battery is 50% charged and each 1% of charge takes 1 minute, then the battery will take another 50 minutes to charge. In some embodiments, a charging station has a standby location to wait to charge or to wait after charging has been completed, so that two drones are able to be at the charging station. In some embodiments, the drones are able to know the location of other drones to determine if another drone is en route to a charging location to avoid traveling to a location only to find it occupied. As described herein, the drones are able to be tracked, and the tracking information is stored and accessible by other drones and devices. The drones are able to calculate estimated times of arrivals, current battery levels, estimated time to charge, and/or any other information to charge efficiently. In some embodiments, a drone has a dedicated charging station. In some embodiments, a charging station is able to charge multiple drones at the same time.

In some embodiments, traffic, crime and/or other factors are analyzed to determine where the drones are positioned. For example, if a news station has 5 drones, the drones are positioned closer to where more traffic issues, crime and/or other events occur as determined by analyzing traffic patterns and/or crime statistics. The analysis is able to include adjusting based on time of day and/or time of year. For example, at rush hour, two drones are positioned near an interstate which typically has traffic issues during rush hour, but then at night, the two drones are positioned closer to a high crime area of the city.

In some embodiments, the drone 1900 includes foldable/collapsible propellers capable of folding when the drone 1900 is not in use. The drone body is also capable of folding/collapsing in some embodiments for a smaller storage footprint. In some embodiments, the drone 1900 folds into an aesthetically pleasing form for storage. For example, the drone 1900 is colored with green leaves on the bottom such that when it folds up, the green leaves are visible, and the drone appears to be a tree or bush. The drone 1900 is able to fold up to appear to be any object such as a fruit, a plant, an animal, a building material (e.g., gargoyle, chimney), sports item, and/or anything else. In some embodiments, instead of folding up to look like another object, the drone 1900 is merely shaped and colored to look like another object.

In some embodiments, the drone includes a protective device to protect the drone from the weather. For example, the drone includes an umbrella which is retractable and is able to be stored when not in use. Furthering the example, in the middle of the drone is an open space for storing the umbrella, and when activated, the umbrella opens like a standard umbrella providing coverage for the drone. Components are able to include protective heaters/coolers such as a defroster for a camera lens. In some embodiments, the drone includes waterproofing including ensuring tight seams and using wax or other items to keep water away from electrical components. The blades/propellers are able to be designed/configured to create an air flow to protect from rain/snow. For example, an additional set of propellers are configured to cause a mild upward airflow which would push the rain/snow around the drone. To keep the drone at a stable position, the upward airflow is met with a compensating downward airflow.

Figure 20:
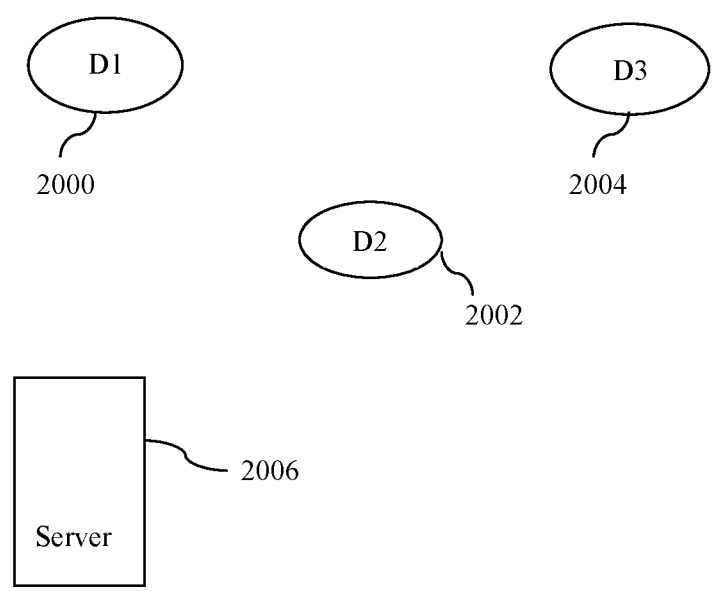
FIG. 20 illustrates a diagram of multiple drones according to some embodiments.

FIG. 20 illustrates a diagram of multiple drones according to some embodiments. As described herein, the multiple drones 2000, 2002, 2004 are able to communicate with each other and/or with a server 2006. The drones 2000, 2002, 2004 are able to receive and/or send information from/to the server 2006 and each other. The drones 2000, 2002, 2004 are able to be positioned and/or configured to capture multiple angles of information (e.g., from a first side, from a second side opposite the first side). The drones 2000, 2002, 2004 are able to be used to perform analysis such as detecting where a sound came from (e.g., by determining which drone receives the sound first to triangulate the location of the source). Any number of drones is able to be used (1 to any number), and the drones are able to be any type of drone (e.g., the drones do not all have to be the same brand/style/configuration although they could be). The drones are able to communicate with any other device (e.g., a server, an end user device, the Cloud, a Facebook® server, a Twitter® server) and are able to communicate through any device (e.g., cellular phone tower or satellite). The drones are able to communicate directly or indirectly to devices. The drones are able to use any form of communication or combination of communications (e.g., WiFi, cellular).

In some embodiments, multiple drones are used to perform the functions described herein (e.g., monitor, acquire, fact check, transmit, generate). In some embodiments, the multiple drones fact check each other's information, or the information acquired from the drones is combined and compared to do a composite fact check. For example, two drones acquire information, and that information is combined to be source information to fact check a breaking news report. The time/date information of each of the streams of information from the drones is compared/utilized to properly compare the information. For example, information from Drone 1 with a timestamp of 10 p is compared with information from Drone 2 with a timestamp of 10 p or a timestamp within a certain range.

In some embodiments, one or more drones are utilized to acquire information about a target from multiple angles. For example, a drone video records a target from a first angle, and then the drone video records the target from a second angle, and so on. In some embodiments, the drone records for a period of time (e.g., 2 minutes) at each angle. In some embodiments, the drone records, and then based on an external input (e.g., command from a control room), the drone moves to a different position to record from a different angle. In some embodiments, the drone records and determines that it is recording a first side, then after a period of time, the drone records a second side, and so on, to capture all four sides of the target. In some embodiments, the drone factors in the position of the sun, shadows, and other visual effects/artifacts to determine the appropriate angle. For example, if the sun is causing bright flashes such that it is difficult to view the target, the drone adjusts the angle such that the sun effects are minimized. Minimizing the sun effects can be implemented in any manner such as moving until a camera is able to visually detect a minimized amount, or based on knowing the current position of the sun based on the time of day and a proper location for minimizing the sun effects. In some embodiments, the drone determines if there is any obstruction as described herein and repositions itself or another drone to reduce/minimize the amount of obstruction. In some embodiments, one or more drones move closer to a target to better acquire audio and/or video. For example, a first drone acquires video from farther away, and a second drone acquires video from a closer position to acquire better audio.

In some embodiments, using a geolocation or other position determining implementation, the multiple drones are able to determine which drone is nearest to a desired/target location. For example, if Drone 1 is 1 mile away from a scene of an accident, but Drone 2 is 100 feet away from the scene of the accident, Drone 2 is activated and goes to the scene. The location of the target/scene is able to be determined in any manner such as the drone being sent information from a server or the drone acquiring the information while monitoring information. For example, the drones are monitoring police radio information, and they all detect that an accident occurred at 1st Street and Main Street, and based on mapping information stored in or accessible by the drones, the drones are able to determine which is closest to the accident. In some embodiments, the drones know the location of each other, and in some embodiments, each drone sends information to the other drones after determining the location of the accident. For example, each drone sends its respective distance to the others, and only the drone with the shortest distance goes to the accident. In some embodiments, additional factors are considered such as remaining battery life, speeds of the drones (e.g., if one drone is able to fly faster than another, then distance is not the only factor), camera/feature capabilities (e.g., if one drone has a better camera, it may go instead of or in addition to another closer drone, for example, if the distance difference is below a threshold, then the drone with the better camera goes) and/or any other factors.

In some embodiments, a drone or other device determines if an incident/scene should have more drones to capture different views (e.g., huge multi-building fire—yes, but small fire—no), where the nearest drones are, and/or if they will likely make it to the scene in time. For example, if a second drone is 1 mile away and travels at 10 mph, the fire just started and is estimated to last 2 hours, so yes, the second drone is sent, but a third drone that is 30 miles away is not sent. Determining if another drone will make it in time is able to be implemented in any manner such as by classifying an event and determining at what point it is in the event. For example, a first drone detects a fire, and then also detects the size of the fire, and based on the size of the fire, an estimated duration of the fire is determined (e.g., 1 building=1 hr, 2 buildings=3 hrs). No fire trucks detected yet could also add another hour. The estimated time until the end of the event can change as well (e.g., upon the arrival of 5 fire trucks, the estimated end goes down by an amount).

In some embodiments, based on one or more of the components (e.g., video camera, microphone, sensor) the drone automatically adjusts its location/position. For example, if the drone detects that the current temperature has exceeded a threshold temperature due to an approaching forest fire, the drone increases its altitude or moves further away from the fire. In another example, by tracking the forest fire with the video, the drone is able to calculate how quickly the forest fire is moving toward the drone, and the drone is able to take action preemptively. Furthering the example, if the forest fire is moving at a pace of 1 mile per hour, and the drone is one quarter mile away from the edge of the fire, the drone automatically moves away from the fire at the same pace as the fire (e.g., 1 mile per hour) or the drone automatically moves in less than 15 minutes.

When the drone detects an obstructed view, the drone is able to automatically reposition itself to avoid the obstruction. Detecting an obstructed view is able to be implemented in any manner such as determining a target (e.g., person of interest, cars of an accident, building on fire), and if another object comes in front of that object, then the view is considered obstructed. The target is able to be determined automatically (based on the monitored and parsed information, it is determined that the house at 123 Main St. is the target or based on image/video analysis—the house on fire is the target based on template matching) and/or manually (e.g., user in control room selects house to be the target). The depths of each object are able to be determined (e.g., using a depth map), and if the depth of an obstruction is closer/less than the desired target, then the view is obstructed. In some embodiments, a full shape of an object is determined, and if less than the full shape is detected, then the object is obstructed. In some embodiments, some obstruction is able to be tolerated (e.g., telephone wires in front of a house on fire or one small tree in front of a forest fire). An obstruction threshold is able to be set/used to determine if an obstruction is detected. For example, an obstruction percent is calculated (e.g., how much is the house obstructed by the telephone wires). The obstruction percent is able to be calculated by determining how much of a total object (e.g., person, house) is able to be viewed and how much is obstructed by another object (e.g., obs %=obs amt/total amt, 1%=1/100). The amounts are able to be calculated based on pixels, groups of pixels, or any other unit. A total object is able to be determined using templates, previous unobstructed views (e.g., a database of images of houses), extrapolation or any other implementation. If the obstruction percent is greater than the obstruction threshold (e.g., obstruction threshold is 25%, and the calculated obstruction percent is 30%), then the drone automatically repositions itself to minimize the obstruction percent (e.g., at least get the obstruction percent below the obstruction threshold or to find a lowest obstruction percent). In some embodiments, the drone retains the obstruction values from previous locations, so as to not revisit a location (unless it has been determined that the obstruction is a movable object (e.g., car). The drone compares the obstruction percentages and searches for an obstruction percentage below the threshold or for the lowest obstruction percentage. If the drone cannot find a position with an obstruction percentage below the obstruction threshold, the position with the lowest obstruction percentage is used. In some embodiments, projected obstruction percentages are calculated to determine where to move to (e.g., based on a captured scene, it is determined there are no telephone wires on the East side of the house, and there are wires on the West side, so instead of trying the West side of the house, the drone moves to the East side to calculate the obstruction percentage).

In some embodiments, the drone is able to automatically determine when to acquire video. In some embodiments, the drone continuously acquires video. In some embodiments, the drone acquires video only after it determines a target has been detected. For example, if a burglary suspect is being tracked, the drone does not record video until a suspect is detected (e.g., a person matching a reported description). Similarly, if a fire has been reported, the drone does not record until a fire is detected by the drone (e.g., based on temperature readings and/or by detecting fire in the using the video camera). A remote user is able to trigger the drone to start recording.

In some embodiments, the drone links with one or more other video systems. For example, the drone receives one or more videos, and fact checks the one or more videos using the drone-acquired content (video/images/audio). In some embodiments, the video from one video source is spliced/merged/incorporated with the content captured by the drone. In some embodiments, video content and drone content are displayed in a split-screen format.

Figure 21:
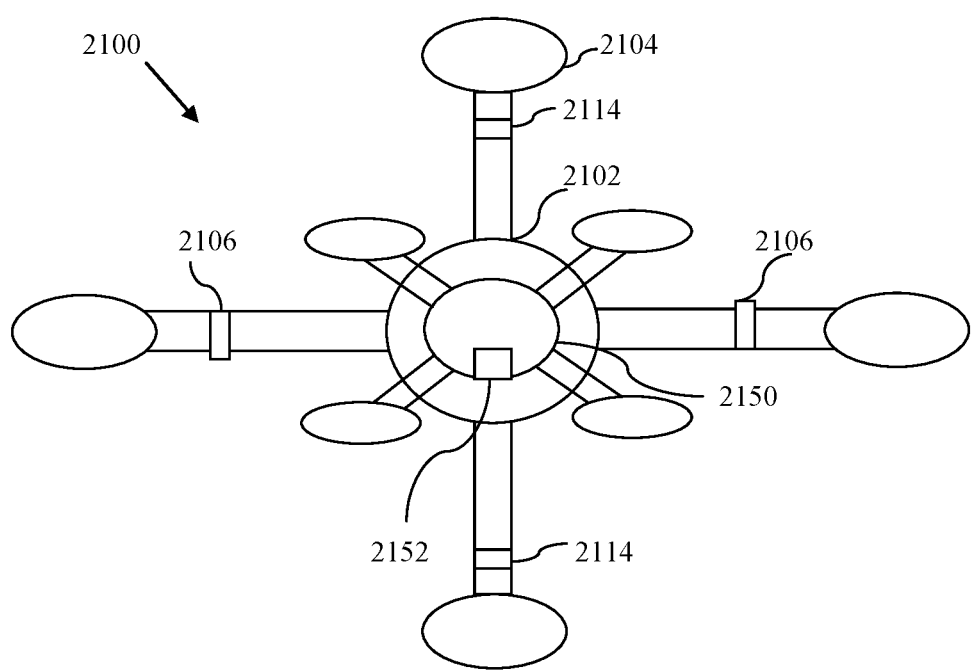
FIG. 21 illustrates a diagram of a nested drone implementation according to some embodiments.

FIG. 21 illustrates a diagram of a nested drone implementation according to some embodiments. The nested drone 2100 includes a primary drone 2102 and one or more propellers 2104 or other flying mechanism on the primary drone 2102. Coupled to the primary drone 2102 are additional components such as a one or more video cameras 2106 and one or more microphones 2114. The one or more video cameras 2106 are able to be any type of video camera such as a regular video camera, a wide lens video camera, an infrared/thermal video camera, a night vision camera, a 360 degree video camera, a panoramic camera, a digital camera or any other type of camera/video camera. In some embodiments, two way cameras (e.g., a camera with lenses pointing in multiple and/or opposite directions) or cameras pointing in opposite directions are utilized, so the drone does not have to turn around. The one or more video cameras 2106 are able to be positioned anywhere on the primary drone 2102 such as an arm, the central component, or elsewhere. In some embodiments, in addition to or instead of a video camera, one or more photo cameras are included and/or the video cameras have photo capture capabilities. The primary drone 2102 includes one or more sensors/components as described in FIG. 19 such as a temperature sensor, barometer, light sensor, altimeter, wind speed detector/sensor, moisture sensor, magnet, magnetic sensor, location mechanism (e.g., GPS device) and/or any other devices for measuring, sensing and/or detecting information. In some embodiments, the primary drone 2102 includes computing components as described in FIG. 19 such as a memory/storage for storing fact checking and content generation applications, a processor for processing commands/data, a networking/transmitting component for sending data to other devices, and/or any other computing components. The primary drone 2102 includes other standard drone components such as gyroscopes, accelerometers, a power supply, and/or any other components. In some embodiments, the primary drone 2102 includes solar panels/cells/devices as described in FIG. 19 or other alternative energy power sources such as a gyroscope or wind turbine to acquire/provide power. The solar panels are able to be positioned anywhere such as on the arms of the primary drone 2102, the central component, and/or elsewhere. The primary drone 2102 is able to include separate one or more microphones 2114. In some embodiments, the microphones 2114 are part of the video cameras 2106, and in some embodiments, the microphones 2114 are a separate and/or additional component. The microphones 2114 are able to be positioned anywhere on the primary drone 2102. In some embodiments, the nested drone 2100 includes a spot light or another lighting system. In some embodiments, the nested drone 2100 includes protective gear such as armor or shielding. In some embodiments, the nested drone 2100 includes camouflaging and/or a cloaking mechanism. The cloaking mechanism is able to be implemented in any manner such as a video screen on the bottom of the nested drone 2100 and a video camera pointed above the nested drone 2100, so the video screen is able to display the sky above the nested drone 2100 such that the drone does not appear to be in the sky. The nested drone 2100 includes a secondary drone 2150. The secondary drone 2150 includes a body and one or more propellers or other flying mechanism. In some embodiments, the secondary drone 2150 includes any of the components described for the primary drone 2102 such as one or more video cameras, microphones, power supplies, computing components, sensors, and/or any other components. The secondary drone 2150 is able to couple to the primary drone 2102 of the nested drone 2100 in any manner. For example, in some embodiments, the secondary drone 2150 sits atop the central component of the primary drone 2102. In some embodiments, the primary drone 2102 includes a receiving aperture for receiving the body of the secondary drone 2150. In some embodiments, a locking mechanism is utilized to secure the secondary drone 2150 with the primary drone 2102. The secondary drone 2150 is capable of separating from the primary drone 2102 such that two separate drones are capable of flying and acquiring information. In some embodiments, the drones communicate with each other and/or communicate with other devices (e.g., a server or remote control). For example, when multiple suspects are spotted and they separate, the secondary drone 2150 is able to disengage from the primary drone 2102 and track one suspect, while the primary drone 2102 tracks the other suspect. Tracking is able to be implemented in any manner as described herein, such as by acquiring an image, shape, color, grouping of pixels or any other tracking implementation which the drone determines to be worth following, and then maintaining that tracking implementation within the view (e.g., where the video camera is still capturing video of the person/object) of video camera of the drone, including searching for the tracking implementation if the tracking implementation is not within the video camera. For example, if a drone detects a person with a red shirt, the drone follows the red shirt. Any image processing technique is able to be used to distinguish the person or object being tracked. In some embodiments, the primary drone 2102 and the secondary drone 2150 are configured to share power when together so that when they separate, they have equal power (e.g., the primary drone 2102 uses power from its power supply for a period of time and then the primary drone 2102 uses power from the secondary drone's power supply for a period of time). In some embodiments, the secondary drone 2150 is inactive when coupled to the primary drone 2102, and in some embodiments, the secondary drone 2150 is active when coupled to the primary drone 2102. In some embodiments, the secondary drone 2150 only activates when desired or needed (e.g., the primary drone 2102 is having issues with its propellers or power or there is a desire/need for extra lift). The secondary drone 2150 is able to be activated manually or automatically (e.g., based on sensors detecting the nested drone 2100 losing altitude, the secondary drone 2150 activates its propellers). Although one configuration of a drone is shown in FIG. 21, any configuration of the drone is able to be implemented (e.g., with more or fewer propellers, a different body shape/configuration, a different nesting configuration such as nesting from the bottom instead of the top). In some embodiments, the separate drones are able to be manually controlled separately, automatically controlled separately or a combination thereof.

Figure 22:
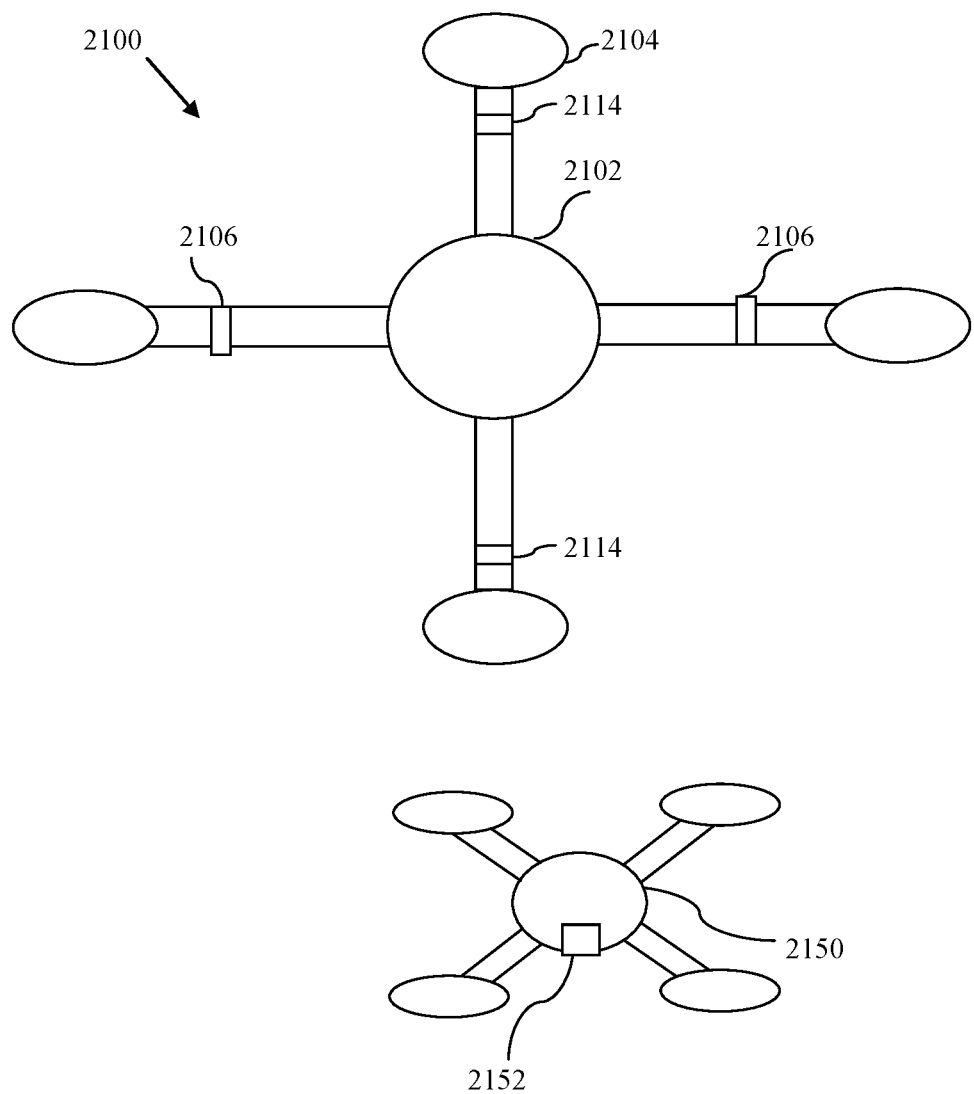
FIG. 22 illustrates a diagram of the primary drone and the secondary drone of the nested drone separated.

FIG. 22 illustrates a diagram of the primary drone and the secondary drone of the nested drone separated. As described herein, the primary drone 2012 and the secondary drone 2150 are able to separate and be used separately to perform actions such as acquire information.

Figure 23:
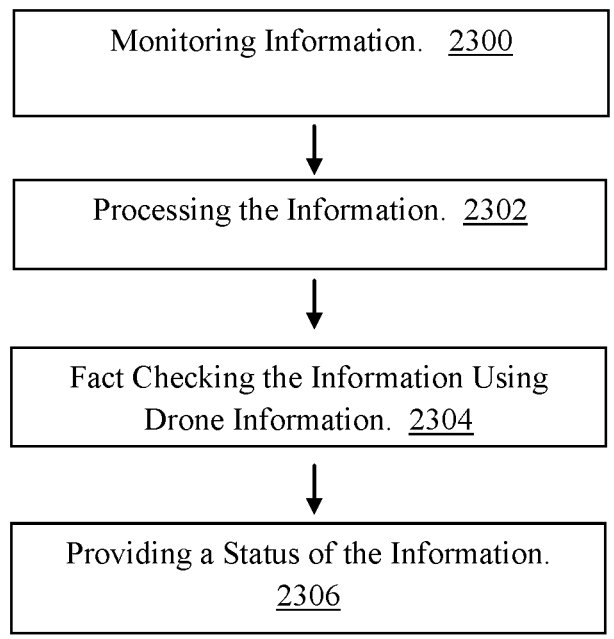
FIG. 23 illustrates a flowchart of a method of fact checking information using drone information according to some embodiments.

FIG. 23 illustrates a flowchart of a method of fact checking information using drone information according to some embodiments. In the step 2300, information is monitored. As described herein, the drone or another device is able to monitor police information by receiving a police radio signal, social networking information, news information, media information and/or any other information. The monitoring is able to be performed in any manner as described herein. In the step 2302, the information is processed. For example, the information is converted, formatted, parsed and/or any other processing occurs. In the step 2304, the information is fact checked using information captured by the drone. For example, the drone captures information which is used as source information to compare with the monitored/processed information. In some embodiments, the drone determines what information to capture based on the monitored information. For example, if the drone monitors a police radio, and processes the statement "shooting at 105 $5^{th}$ street," then the drone navigates to that location and acquires information to compare with any details reported regarding the shooting at that location. Furthering the example, a news report says 10 people have died, but based on a picture and/or video, the number of bodies not moving is able to be counted automatically using the drone and/or another device to verify or disprove the report. In some embodiments, the drone-acquired data is combined with other data (e.g., a report that three people have died at the hospital. In some embodiments, fact checking includes providing real-time data in response to a story/report. In the step 2306, a status of the information is provided. Providing the status is able to be performed in any manner as described herein such as by sending fact checking results, summary information, live information, and/or any other information acquired by the drone to users via social media, a direct transmission, a broadcast, and/or any other implementation. In some embodiments, fewer or additional steps are implemented. In some embodiments, the order of the steps is modified.

Figure 24:
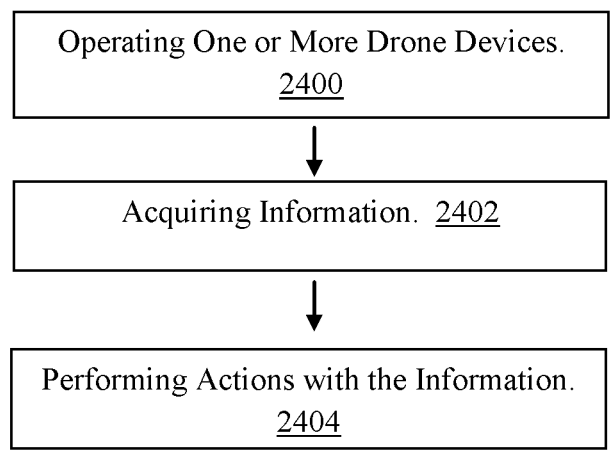
FIG. 24 illustrates a flowchart of a method of utilizing a drone to capture and provide information according to some embodiments.

FIG. 24 illustrates a flowchart of a method of utilizing a drone to capture and provide information according to some embodiments. In the step 2400, one or more drones are operated. The drones are able to be operated manually, automatically (e.g., without user involvement) or a combination thereof. Operating the drones is able to include any of the operations described herein such as navigating the drones to an appropriate location, separating a nested drone, and/or communicating with another drone to come to the location or go to a different location. In the step 2402, the one or more drones acquire information. Acquiring the information is able to be performed in any manner and is able to include any information acquisition such as using cameras, sensors or other devices to acquire information. Acquiring information is also able to include receiving information from a server or other device (e.g., monitoring tweets). In the step 2404, one or more actions are taken with the information. For example, the information acquired by the one or more drones is: live streamed to viewers, summarized, processed, used to generate additional content, used to take a secondary action such as requesting another drone, used to take pictures, transmitted (or parts of the information are transmitted) to other devices, used to fact check other information, and/or any other actions. In some embodiments, fewer or additional steps are implemented. In some embodiments, the order of the steps is modified.

In some embodiments, the drone flies in any manner and in any direction. For example, for the drone to get from Point A to Point B, the drone flies up to a specified height and then flies directly from Point A to Point B. In some embodiments, designated flight paths are generated and utilized by the drone. For example, an invisible road system is generated and utilized by the drone to navigate. Furthering the example, a map that parallels the streets on land (or similar or a modified version optimized for the sky) is stored in the drone or in a server, and the drone uses that map to navigate. In some embodiments, additional electronic devices are positioned to help the drone navigate. For example, cellular phone towers are used to help establish pathways. Furthering the example, a drone follows a direct line parallel to a direct line between cellular phone towers. In some embodiments, the drone accesses information of do not fly zones (e.g., airports, government buildings) to avoid flying where it is not supposed to go. The do not fly zones are also able to be factored in when calculating travel time for the drone to a location.

In some embodiments, the drone implements privacy protections. For example, the drone stores or accesses a database of user locations that do not allow pictures or videos to be taken. In another example, the drone automatically blurs/blocks any faces or other objects when sending a picture or video to be displayed publicly. Furthering the example, the drone recognizes a user's face and then blurs the located face area. A person's voice is also able to be distorted using a voice distortion implementation to maintain their vocal privacy. Entire people are able to be blurred out or blocked out. In some embodiments, people or faces are replaced by markers (e.g., icons). In some embodiments, a display displays markers for all living items. For example, if the view is a distant view, to assist viewers in recognizing what they are viewing, icons are displayed to represent people, animals and/or any other object. The icons are able to be representative (e.g., police badge for police officers, plus sign for medical workers and fireman helmet for firemen, fire symbol for fire, gun for shooting).

In some embodiments, the drone is able to provide multiple feeds of content. For example, as described herein, the drone is able to acquire content using a plurality of cameras. The content is able to be displayed to users in a split-screen format, picture-in-picture format or any other format. If one camera includes zoomed out information, the icons are able to help users visualize what is being shown.

In some embodiments, the drone-acquired content utilizes/incorporates virtual reality technology. For example, the drone acquires content using a camera capable of producing virtual reality content, or the camera acquires content, and then the content is converted to be virtual reality content. By providing virtual reality content, viewers are able to be immersed in the news. In some embodiments, fact checking results are displayed in the virtual reality content. For example, if breaking news is fact checked using drone-acquired content, the drone-acquired content is displayed side-by-side with the breaking news.

In some embodiments, the drone utilizes augmented reality. For example, additional content is displayed to appear relative to what is seen by the drone. For example, if the drone captures video of a forest fire, the augmented reality is able to add names of relevant landmarks. Furthering the example, a forest fire in Yosemite is recorded using a drone, and text labels are assigned to indicate Half Dome and other landmarks/features, to give viewers a better understanding of where exactly the forest fire is. In some embodiments, measurements and/or other information is displayed on the augmented reality to provide even more information. The measurement information is able to be determined using mapping information and/or any other analysis. For example, mapping information includes distance information from point A to point B, so that information is able to be displayed in an augmented reality display.

In some embodiments, the drone includes additional features such as a container for storing and dispensing water or compressed $CO_2$ or other chemicals (e.g., to extinguish a fire).

In some embodiments, the drone synchronizes with one or more additional devices. For example, the drone synchronizes with equipment on the ground such as a microphone or video camera. Furthering the example, the drone detects that a television station is interviewing witnesses of a crime, and the drone synchronizes the video and/or audio captured from the drone with the video and/or audio of the person being interviewed (e.g., both are transmitted/displayed at the same time). The synchronization is able to be based on time, sound detection and/or any other implementation.

In some embodiments, the drone or a device communicating with the drone determines which information to provide to the public and which information to keep secret or hold for review (e.g., classifying information). Classifying information is able to be implemented in any manner such as comparing images with templates of content, and if an image matches a template of secret content, then the information is considered secret content. For example, dead bodies or excessive blood are considered information that is generally not acceptable for public display on a news broadcast, so if such information is detected, then the content is kept secret. In some embodiments, a user (e.g., network employee) is able to override the secretive aspect to enable the content to be displayed.

Drones and social networks are able to work together to enhance news coverage. In addition to using social networks to select source information, social networks are also able to be used to determine which drone to use, where the drone information is sent to and/or other aspects. For example, the location of mobile devices (e.g., phones/tablets) is able to be known (e.g., many mobile devices allow other devices to know their location), and the location of the mobile devices is able to be used to determine which drone is utilized to acquire information. Furthering the example, if several users send out a tweet that has the hashtag, # GoldenGatePark-Shooting, then the drone assigned to Golden Gate Park is utilized to go to the scene and acquire real-time information. In addition to or instead of the hashtag, actual user device location information is able to be acquired and analyzed to determine which drone to utilize and/or where the drone should go. In another example, a user has an accident and sends a message either to the police or to someone else. Embedded in that message or accessible based on that message is the location information (e.g., GPS information) of the user's device, and a drone (possibly the nearest drone) goes to that location to acquire additional information.

In some embodiments, since some news is local, the drone sends content to a limited set of users (e.g., based on location, based on another quality/feature/characteristic). For example, if a Chicago-specific event occurs, then the drone-acquired content is only sent to mobile devices in Chicago. Determining which devices the content is sent to is able to be implemented by the drone or another device (e.g., server). How the content is sent to the limited set of users is able to be implemented in any manner. For example, the drone may tag location-specific content, the content may be sent to a specific social networking group, the drone may use NFC, GPS or other location implementations to send the content to devices within a specified range, or the content may only go to mobile devices with a designated area code (e.g., only 415 and 650 numbers). In some embodiments, a drone is matched with users based on location (e.g., users in a specified location may be prompted to join Drone X's newsfeed or social network). In some embodiments, keywords in drone content and/or user content are used to match the drone with users. For example, a message is sent to all users who have used hashtag # xyz to join Drone X's newsfeed or social network.

In some embodiments, one or more drones are preemptively positioned. For example, a drone goes to where traffic typically builds up based on historical data. Furthering the example, if traffic typically builds up around 5 p, the drone leaves so that it arrives to acquire video of the traffic at 5 p (or slightly before 5 p).

FIG. 25 illustrates a diagram of a drone security system according to some embodiments. The drone security system 2500 includes a security system 2502 and a drone 2504. The security system 2502 is able to include any security system component such as one or more video cameras 2506, a control unit, an alarm, one or more sensors (e.g., magnetic strips which detect when a window or door is opened), one or more motion sensors, one or more audio detectors (e.g., glass break detector) and/or any other security system components. Any drone is able to be used as described herein. In some embodiments, the drone 2504 includes a storage compartment/shooting mechanism 2508 for storing an object/substance 2510 (e.g., a net, paint, pepper spray, a tracking device, water). For example, the storage compartment 2508 includes one or more doors which open to drop the object 2510, or the storage compartment 2508 is able to shoot out the object 2510. The tracking device is able to be any device which emits a signal or is otherwise trackable. The tracking device is able to include an adhesive mechanism (e.g., tape, magnet) to adhere to a person or the person's vehicle. For example, the drone 2504 drops the object 2510 which is a tracking device on the hood or top of a vehicle, and the object 2510 adheres to the vehicle using a magnet.

The drone 2504 and/or the security system 2502 detect a person, a breach, and/or any other trigger. In some embodiments, the drone 2504 and/or the security system 2502 communicate the detection, breach and/or other trigger to each other and/or other devices. For example, the security system 2502 detects a breach at a window and sends a signal/information to the drone 2504 that the window has been breached. In some embodiments, the trigger is a doorbell being pushed, a thermostat/fire alarm/CO2 alarm trigger, an internet of things device communicating a trigger, motion sensor trigger, a video detection trigger, and/or any other trigger (where the trigger is able be any trigger such as a audible or silent signal sent to the drone 2504 and/or security system 2502). In some embodiments, the drone 2504 and/or the security system 2502 take an action after detecting a trigger. For example, after the security system 2502 detects a door has been opened, the security system 2502 sends a signal and/or data (e.g., identifying which door has been opened), the drone 2504 is activated and flies to video record and/or take pictures of the incident. In some embodiments, the drone waits a period of time (e.g., 10 seconds) to see if the user disarms the security system. In some embodiments, the drone 2504 locates a suspect using object recognition and/or based on where the trigger occurred. For example, the drone 2504 goes to the front door where a breach was detected. The drone 2504 video records and analyzes the video in real-time to detect a person and determines a burglar is leaving through the front door. Unlike fixed video cameras, the drone 2504 is able to fly around to multiple locations to locate the burglar and also is able to track and follow the burglar. The drone 2504 is able to record and transmit location information to the appropriate people/entities. The drone 2504 is able to continuously video record and take pictures of the suspect as well. The drone 2504 is able to shine a spot light on the suspect, tag the suspect (e.g., with paint that the drone stores in a storage container, such as a small compartment on the bottom of the drone which opens to drop paint or a paint ball, or with a tracking device which sticks to the suspect and/or the suspect's vehicle), and/or take any other action. The storage compartment is able to include one or more doors/panels which open to release/shoot an object/substance. In some embodiments, the drone 2504 takes pictures of specific targets such as the suspect, the suspect's car, accomplices and/or any other targets. For example, the drone stores or accesses a database of template targets, and then searches for items that match the template targets, and if there is a match, then a picture and/or video is acquired of the target. The drone 2504 is able to focus the pictures on specific aspects of the target, such as a suspect's face or the make/model of a vehicle and the license plate. In some embodiments, the drone 2504 takes multiple pictures from multiple angles. In some embodiments, the drone 2504 (or another device using content acquired by the drone) is able to access police records and/or other information to compare the content acquired to determine further information. For example, using facial recognition and a police database, the drone 2504 is able to identify a known felon which increases the alert status (e.g., send more police officers). In another example, the drone 2504 captures a license plate number and by comparing that number with a stolen vehicle database, the drone 2504 is able to report the vehicle as a known stolen vehicle. The drone 2504 is also able to use image processing techniques (e.g., a depth map and object size calculation analysis) and objects nearby to generate helpful information such as a suspect's height and/or weight. For example, the drone measures various objects of a property (or receives the measurement information) such as trees, bushes, statues, doors, roof height, garage door height, vehicle height, deck height, fence height, and/or any other information, and then uses that information to compare with a suspect acquired in a picture to determine the suspect's height.

In some embodiments, the drone 2504 and/or other cameras (e.g., one or more security cameras stationed on the property) acquire pictures/videos of the property which are considered base/control pictures/videos (e.g., they are taken at a time when it is known that nothing harmful is happening). In some embodiments, it is ensured that the doors and windows are closed before taking the base/control pictures/videos. Then, the drone 2504 and/or other cameras acquire pictures/videos of the property later on (e.g., while the security system is armed or when a trigger is detected) to compare with the base/control pictures, and if there is a change, the drone 2504 and/or security system 2502 take an action (e.g., sound an alarm, contact a user such as send the new picture/video or the differences between the pictures/videos to the user). For example, the similarities of the images are grayed/blacked out and the differences are highlighted or colored. In some embodiments, several base/control pictures/videos are acquired of each location (e.g., from different angles, at different times of the day (e.g., house looks very different in day light versus nighttime), at different times of the year (e.g., a yard in the summer may look very different than in the winter), under different weather conditions (e.g., sunny, raining, cloudy, snowing). Then, when comparing a current picture/video with the base/control pictures/videos, the current picture/video is compared with the base/control pictures/videos at the appropriate angle, weather condition and so on. In some embodiments, the current picture/video is compared with all base/control pictures/videos, and in some embodiments, the process is optimized by utilizing known or determined information (e.g., based on the current date, the weather report/onboard sensors, the clock, position information). For example, the drone clock indicates that it is 11:00 am; thus, there is no reason to compare the current picture with a nighttime picture. Similarly, if a temperature sensor on the drone reads that it is 100 degrees outside, a base picture in winter is not used for comparison. In some embodiments, the analysis determines if any base/control pictures/videos are a match with the current picture/video, and so as long as one is a match, there is no action triggered. In some embodiments, the most appropriate base/control picture/video is selected (e.g., by finding the base/control picture/video that matches the most criteria (time/date, weather, angle/location)) and compared with the current picture/video, and if there is a match using any image processing comparison implementation, then no action is taken; otherwise an action is taken. Based on time of day and/or any other criteria, pictures/videos are able to account for other base/control changes such as an owner's vehicle is in the driveway from 6 p to 6 a, on M-F, but is not there from 6 a-6 p, thus there is no reason to trigger an alert that the car is missing when the car is simply at the user's work. Additional information/factors are able to be accounted for such as vacations, holidays, a vehicle not returning home at exactly at 6 p because of traffic and/or staying late at work, and/or any other information/factors. The additional factors are able to be determined in any manner such as cross-checking with a user's calendar, traffic information, work schedule, and/or any other accessible data. The base/control pictures/videos are able to be stored locally (e.g., on the drone, the security system, a local computer) and/or remotely (e.g., in the cloud). The base/control pictures/videos are able to be updated automatically and/or manually to ensure any changes to the property are accounted for (e.g., when a user adds a new decoration near the front door, this should not trigger a police call). In some embodiments, when the system detects a new feature (e.g., decoration near front door), the image is sent to the user, and the user is able to confirm or deny that the new feature is acceptable and should be included in base/control pictures/videos.

In another example, the security system 2502 and/or the drone 2504 contact the police, the owner of the house, the security company and/or another person/entity. In some embodiments, the drone 2504 is synchronized with the one or more video cameras 2506 (e.g., the drone or another device is able to access and/or analyze the information in the one or more video cameras 2506; for example, the drone determines that a suspect is visible in video camera 1, so the drone navigates to that location). In some embodiments, the drone 2504 and/or security system 2502 send a video, images, a text summary of what is being recorded, an image/video summary as described herein, location information and/or any other data to the police and/or another user/entity (e.g., an incident report is sent as a tweet or to a group email). The drone 2504 is able to generate a description (e.g., police report) of an incident. For example, by detecting a breach of a house and an alarm going off, the report indicates a burglary, and a description of a blue shirt, black hat, 6 foot, male, running West is indicated. The color detection and/or object detection are able to be performed using any image processing techniques. In some embodiments, the data acquired and transmitted by the drone 2504 is encrypted. For example, the data stored on the drone 2504 is encrypted and/or the data that is sent from the drone 2504 to another device (e.g., a user's smart phone) is encrypted before it is sent and then decrypted by the receiving device to protect against someone hacking the system/communication.

In some embodiments, incident pictures/videos are captured and stored for insurance purposes (e.g., sent to homeowner's insurance company for them to assess damages). In some embodiments, live video from the drone is streamed to the user and/or other users (e.g., police, media).

In some embodiments, the drone 2504 receives information from one or more other drones/security systems (e.g., a neighbor's security system detected a breach, or a neighbor's drone detected suspicious activity and notifies the drone 2504 and/or drones in a network, and based on the received information, the drone 2504 (and/or other drones) take action (e.g., begin to patrol the area/property). Specific details from the other drone are able to be communicated, so the drone 2504 is able to monitor for a specific event (e.g., look for a tall man with a gray jacket).

In some embodiments, the drone 2504 waits on the roof, in a tree, on a platform, or another on-site location (inside or outside; hidden or visible). In some embodiments, the drone 2504 roams (e.g., flies around and/or hovers). In some embodiments, the drone 2504 determines when to roam based on analyzing social networking information (e.g., members on a neighborhood social networking group have reported burglaries in the neighborhood of the drone/security system including where and when the burglaries occur, and the drone detects keywords/other information in the social networking information), police information, historical data, a user-specified time, and/or any other data. For example, if most burglaries occur between 10 a and 11 a and 9 p and 11 p, then the drone 2504 roams the property during those times. In some embodiments, the drone roams when the security system 2502 is armed or when a drone roaming period is set. In some embodiments, the drone 2504 roams based on real-time information (e.g., someone on social media reports a burglary in the neighborhood, so the drone 2504 begins to roam).

The flight path of the drone 2504 is able to be executed in a variety of ways. The flight path is able to be a direct flight path (e.g., the drone 2504 goes directly from point A to point B). For roaming, the flight of the drone 2504 is able to a set pattern (e.g., go around the house in the same direction) or a variable pattern (e.g., clockwise then counterclockwise, and then randomly going one or the other). In some embodiments, the drone 2504 roams by going to certain points around the house (e.g., garage, then front door, then roof for a 360 degree view, and so on). In some embodiments, a user is able to program the route of the drone 2504 for roaming. In some embodiments, a random seed generator is used to determine the random roaming path of the drone 2504.

In some embodiments, the drone 2504 enters the house (or other structure/building) or waits outside the house. For example, the drone 2504 waits near the entry point or trigger point of the house/alarm. In some embodiments, the drone 2504 is a nested drone as described herein. By using a nested drone, the drone is able to acquire two sets of information (e.g., one drone goes inside and the other waits outside; one drone goes to the front of the house, the other goes to the back; one drone tracks a first suspect, the other drone tracks a second suspect; one drone tracks a suspect and the other drone looks for vehicles and/or other evidence by comparing scanned information with templates of bullets, weapons, tools, vehicles or other items). In some embodiments, the drone 2504 is configured to stop the suspect (e.g., by dropping a net stored in a compartment in the body of the drone 2504) or blind the suspect by shining a bright light in the suspect's eyes or spraying pepper spray at the suspect. As described herein, the drone 2504 is able to utilize lights on the drone 2504 to indicate different emergencies (e.g., flashing blue for a burglary, flashing red and blue when a gun is detected). The drone 2504 is also able to include audible alerts (e.g., using onboard speakers) such as a siren, a recorded message, and/or any other audio. Using the speakers and/or other alerts, the drone 2504 is able to announce the details of an incident/crime (e.g., burglary at Location X, two burglars, clothing information, body information). For example, the drone 2504 determines the type of crime based on detail matching (e.g., breach of security system equals burglary, or video/image matching showing broken/open door or window equals burglary, and the drone is able to acquire images/videos of the suspects and using image/video analysis is able to determine items such as hair color, height, skin color, vehicle/license plate information, and direction traveling, and other tools are able to acquire additional information such as GPS coordinates), and the acquired/determined information is able to be announced through the speakers as the drone follows a suspect or moves around (e.g., around a neighborhood) to announce the incident/crime. In some embodiments, the drone 2504 and/or security system communicates to nearby devices (e.g., using NFC, WiFi, or any other communication) to provide an alert. For example, the drone 2504 communicates via WiFi to neighbors' mobile phones (e.g., text message or social networking) that a burglary just occurred at House X, and details are provided (e.g., address, suspect details, direction of the suspect traveling, vehicle information, items stolen). In some embodiments, multiple drones and/or nested drones are able to be used with the security system 2502.

In some embodiments, the drone 2504 and/or security system 2502 are used for fact checking purposes as described herein.

FIG. 26 illustrates a diagram of a drone with shielding according to some embodiments. The drone 2600 is able to be any of the drones described herein including any of the components described herein such as propellers, video cameras, microphones, circuitry, to name a few. The drone 2600 includes shielding 2602 such as a kevlar plate (or another protective material). In some embodiments, the shielding 2602 is bulletproof, and in some embodiments the shielding 2602 is not. The shielding 2602 is able to be any size. For example, the shielding 2602 is able to be sized to protect the entire drone from an attack from below or to protect the battery/motor. Multiple shields are able to be used to protect specific components such as the cameras and/or the microphones. In some embodiments, the shield 2602 is a lighter material to merely hide components. For example, the shield 2602 is a thin sheet of material (e.g., cloth, plastic, metal such as aluminum foil) which prevents someone on the ground from seeing the varying components of the drone. In some embodiments, the shield 2602 is see-through such as bullet proof glass/plastic. In some embodiments, the shield 2602 has holes and/or is positioned so that the camera devices and/or other devices are able to perform without interference from the shield 2602. For example, the cameras are able to be positioned around the shield (or to acquire content around the shield) or such that if the drone 2600 tilts slightly, the drone 2600 is able to acquire video without the shield in the way. In some embodiments, the shield 2602 is retractable. For example, the shield 2602 is positioned on the side of the drone 2600 or closer to the belly/body of the drone 2600 when not in use, and then when placed in secure mode (e.g., triggered automatically by detecting water, gun fire or another trigger or by a manual trigger by a user using a remote device), the shield 2602 extends into position. Furthering the example, the shield 2602 is directly underneath the body of the drone 2600 (e.g., with a minimal gap between the body and the shield such as 1 cm), and then when triggered, the shield 2602 extends down a few inches (e.g., 2 or more inches) which protects the drone 2600 and may block the view of the cameras. In some embodiments, the shield 2602 includes one or more extendible wings 2604 which spread horizontally to further protect the drone 2600. For example, the wings 2604 are within the shield 2602 and extend out from within or the wings 2604 fold out from the bottom of the shield. Any other implementations to ensure the shield 2602 does not interfere with other functions of the drone 2600 are able to be utilized. In some embodiments, the drone components (e.g., body, propellers, camera covers) are made of shielding material (e.g., bullet proof material). In some embodiments, the shield 2602 and/or drone 2600 is painted to blend in with surroundings such as the sky. In some embodiments, the shield 2602 and/or drone 2600 are painted in different colors such as the shield 2602 to resemble the sky when looked at from below and the drone body painted the same color as the roof so people may not notice the drone while stationary. The top and bottom of the drone 2600 are able to be painted different colors.

Any of the aspects of the drone are able to be implemented manually, semi-automatically, or automatically, and any combination of these are able to be implemented. For example, control of the drone is manual, but acquisition of content is automatic or vice versa, or both are automatic.

In some embodiments, the drone device and/or security system are utilized to ensure a package, vehicle, furniture (e.g., television), jewelry and/or any other object are not removed from a property (e.g., the home and/or surrounding yard).

FIG. 27 illustrates a flowchart of a method of utilizing the drone and/or security system to prevent an object from being removed from a location according to some embodiments. In the step 2700, an object is recognized/detected by the security system and/or a drone device (e.g., a single or a nested drone). For example, a package is placed on the doorstep of a house, and the security system (e.g., security camera) and/or the drone device detects the object. Detecting the object is able to be implemented in any manner such as detecting an RFID chip (or other similar technology such as Near Field Communication, Bluetooth®) in/on a delivery box (e.g., the security system, drone and/or other device has an RFID reader for detecting the RFID chip); object recognition via a camera of the security system and/or drone (e.g., the camera detects box-shaped, brown objects or any other shaped or colored object using any content recognition implementation); receiving a delivery notification from the delivery/shipping company (e.g., UPS®/USPS/FedEx®) or the merchant (e.g., Amazon.com®)—for example, when a delivery man for UPS® drops off a package, he scans the package and indicates that the package has been delivered, that notification goes to a UPS® server which is then able to relay that information to any other Internet-connected device such as the security system or the drone device, and therefore, the security system and/or the drone device are aware that a package has been delivered on the property; receiving a direct delivery notification from the delivery company device to the security system/drone device (e.g., package scanner sends a signal to the security system), and/or any other detection technique. In some embodiments, the security system and/or drone communicate with one or more devices/servers (e.g., user, delivery company, merchant server) to let them know that the package is protected by a security system. In some embodiments, messages (e.g., text, email, social networking information) are monitored for indications of packages being delivered or will be delivered at a certain time (e.g., friend sends text message "I just dropped off your package" or "I'm dropping off a package at 5 p"), which trigger the security system and/or drone to monitor the package (or to monitor the package at the specified time), property and/or search for the package if not detected (e.g., package is out of view of security camera, but the drone moves/hovers to another location and locates the package). Detecting/recognizing specific people such as mailmen or delivery men (e.g., recognize UPS® logo) triggers the monitoring and/or searching for the object. In some embodiments, the doorbell is coupled to the security system, and when the doorbell is rung, the security system/drone locates the package to begin monitoring the package and/or surroundings. In some embodiments, it is detected if the door is opened, which would indicate the package has been retrieved by the user. In some embodiments, the door includes a tactile sensor which is able to communicate with the security system to trigger monitoring for the package.

In some embodiments, the object detected is a vehicle in front of the house, and if the vehicle is not recognized as a user vehicle (e.g., by content recognition), then the time the vehicle leaves and other information (e.g., duration, images of the vehicle) are acquired and/or transmitted to the user's device (e.g., smart phone). The vehicle detected could be a delivery vehicle which is also able to be used to trigger monitoring the delivered package.

In the step 2702, the object is monitored. Monitoring the object is able to be implemented in any manner such as tracking any movement of or changes to the object with the security system and/or the drone device. In some embodiments, the drone device moves to monitor the object and/or hovers above the property. For example, after a package is delivered, the drone device re-positions itself so that the package is within the view of the camera of the drone device and/or the drone is able to detect a person entering the property to give an advanced warning (e.g., based on facial recognition, "you are not recognized, please leave the premises"). In another example, the drone device re-positions itself on the package or hovers over or near the package, so that any would-be thief would avoid attempting to steal the package. Monitoring is also able to include using the drone in an aerial position to detect changes based on snapshots or videos of the property at different times. Monitoring is able to include image/video processing techniques such as generating a depth map of the object and scene after the object is positioned (e.g., delivered), and periodically measuring the depth to ensure the depth of the object does not change, and if the depth map changes, then a signal is sent. For example, cameras from the security system and/or drone continuously acquire video/images, and a depth map is generated for each image/frame (or specified frames such as a frame per 10 seconds) which includes the depth of the package (or the depth of the package is able to be determined from the depth map), and each depth/depth map is compared to determine the distance of the package (or change of distance), and the distance of the package (or change of distance) is able to be compared with a threshold. Using the depth map and/or other image processing techniques, it is able to be determined if the package is moving or moves off the property or into the house. For example, the depth map includes the distance to the property line and is able to determine that the package has crossed the property threshold. In another example, image processing recognizes the package going through an open door and/or the depth map confirms the distance of the open door. In some embodiments, a scanner device (e.g., RFID, NFC) is able to detect if the package (tag/chip) has moved (e.g., out of range). Image processing/content recognition techniques are able to be used to detect a person/object (e.g., robot, external drone) near the package, and if the person/object is not recognized or if the security system has not been disabled, then an action is taken. Image processing/content recognition techniques are able to be used to detect actions of people/object such as damaging the package by recognizing actions and/or audio recognition.

In the step 2704, an action is taken based on the object (e.g., moving, being damaged, view of the object is blocked). For example, if the alarm system has not been disarmed (or when disarmed), and the package is affected (e.g., moves more than a specified distance such as 1 foot), then an action/notification (e.g., message is sent to user's smart phone that package is moving) and/or alarm is triggered. The user is then able to disarm the "package moving" alarm. Disarming the alarm system indicates that the package is able to be moved. In some embodiments, there are separate disarm features (e.g., disarm package does not disarm the rest of the security system). In some embodiments, the action taken is the drone device moving the package to a secure location such as on the roof or to the back yard. In some embodiments, a warning is given before the alarm is triggered (e.g., a few beeps or a voice message alerting that an alarm will sound if the person does not leave). In some embodiments, the drone follows the package. In some embodiments, fewer or additional steps are implemented. In some embodiments, the order of the steps is modified. The method is able to be utilized with existing objects (e.g., to prevent an existing statue or lawn ornament from being removed or interior items such as a television). The existing objects are able to be recognized automatically (e.g., by video camera content acquisition) or input manually into a database (e.g., input serial number or description). In some embodiments, to prevent a drone from being used to steal a package, anti-drone measures are able to be implemented such as a device to grab/catch a drone (e.g., paint, net), an EMP to send a small, electric pulse to disable the drone, a device to disrupt air to crash the drone, or the user's drone to attack/follow the invading drone.

FIG. 28 illustrates a diagram of devices for securing an object at a location according to some embodiments. One or more trigger devices 2800 communicate with one or more servers 2802 which communicate with the one or more security devices 2804. In some embodiments, the trigger device 2800 is able to communicate directly with the security devices 2804. The trigger device 2800 is able to be the delivery scanner (e.g., bar code reader) or any other device configured for triggering an indication that a package has been delivered. The security system or drone could be the trigger device 2800 and/or the security device 2804. The servers 2802 are able to be user servers, delivery company servers, merchant servers, security company servers and/or any other servers/devices or a combination thereof. The security devices 2804 include the security system, the drone and/or any other security devices. The trigger devices 2800, the servers 2802 and the security devices 2804 communicate to detect an object, monitor the object and take an action based on the object (e.g., movement of the object).

In some embodiments, the social networking fact checking system is a smartphone application including, but not limited to, an iPhone®, Droid® or Blackberry® application. In some embodiments, a broadcaster performs the fact checking. In some embodiments, a user's television performs the fact checking. In some embodiments, a user's mobile device performs the fact checking and causes (e.g., sends) the results to be displayed on the user's television and/or another device. In some embodiments, the television sends the fact checking result to a smart phone.

Utilizing the social networking fact checking system, method and device depends on the implementation to some extent. In some implementations, a television broadcast uses fact checking to fact check what is said or shown to the viewers, and a mobile application, in some embodiments, uses fact checking to ensure a user provides factually correct information. Other examples include where web pages or social networking content (e.g., tweet or Facebook® page) are processed, fact checked, and a result is provided. The fact checking is able to be implemented without user intervention. For example, if a user is watching a news program, the fact checking is able to automatically occur and present the appropriate information. In some embodiments, users are able to disable the fact checking if desired. Similarly, if a user implements fact checking on his mobile application, the fact checking occurs automatically. For a news company, the fact checking is also able to be implemented automatically, so that once installed and/or configured, the news company does not need take any additional steps to utilize the fact checking. In some embodiments, the news company is able to take additional steps such as adding sources. In some embodiments, news companies are able to disable the fact checking, and in some embodiments, news companies are not able to disable the fact checking to avoid tampering and manipulation of data. In some embodiments, one or more aspects of the fact checking are performed manually.

In operation, the social networking fact checking system, method and device enable information to be fact checked in real-time and automatically (e.g., without user intervention). The monitoring, processing, fact checking and providing of status are each able to occur automatically, without user intervention. Results of the fact checking are able to be presented nearly instantaneously, so that viewers of the information are able to be sure they are receiving accurate and truthful information. Additionally, the fact checking is able to clarify meaning, tone, context and/or other elements of a comment to assist a user or viewer. By utilizing the speed and breadth of knowledge that comes with automatic, computational fact checking, the shortcomings of human fact checking are greatly overcome. With instantaneous or nearly instantaneous fact checking, viewers will not be confused as to what information is being fact checked since the results are posted instantaneously or nearly instantaneously versus when a fact check is performed by humans and the results are posted minutes later. The rapid fact checking provides a significant advantage over past data analysis implementations. Any of the steps described herein are able to be implemented automatically. Any of the steps described herein are able to be implemented in real-time or non-real-time.

Examples of Implementation Configurations:

Although the monitoring, processing, fact checking and indicating are able to occur on any device and in any configuration, these are some specific examples of implementation configurations. Monitoring, processing, fact checking and providing all occur on a broadcaster's devices (or other emitters of information including, but not limited to, news stations, radio stations and newspapers). Monitoring, processing and fact checking occur on a broadcaster's devices, and providing occurs on an end-user's device. Monitoring and processing occur on a broadcaster's devices, fact checking occurs on a broadcaster's devices in conjunction with third-party devices, and providing occurs on an end-user's device. Monitoring occurs on a broadcaster's devices, processing and providing occur on an end-user's device, and fact checking occurs on third-party devices. Monitoring, processing, fact checking, and providing all occur on third-party devices. Monitoring, processing, fact checking, and providing all occur on an end-user's device. Monitoring, processing and fact checking occur on a social networking site's device, and providing occurs on an end-user's device. These are only some examples; other implementations are possible. Additionally, supplemental information is able to be monitored for, searched for, processed and/or provided using any of the implementations described herein.

Fact checking includes checking the factual accuracy and/or correctness of information. The type of fact checking is able to be any form of fact checking such as checking historical correctness/accuracy, geographical correctness/accuracy, mathematical correctness/accuracy, scientific correctness/accuracy, literary correctness/accuracy, objective correctness/accuracy, subjective correctness/accuracy, and/or any other correctness/accuracy. Another way of viewing fact checking includes determining the correctness of a statement of objective reality or an assertion of objective reality. Yet another way of viewing fact checking includes determining whether a statement, segment or phrase is true or false.

Although some implementations and/or embodiments have been described related to specific implementations and/or embodiments, and some aspects/elements/steps of some implementations and/or embodiments have been described related to specific implementations and/or embodiments, any of the aspects/elements/steps, implementations and/or embodiments are applicable to other aspects/elements/steps, implementations and/or embodiments described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
   a. detecting delivery of a package;
   b. monitoring the package using a security system, wherein the security system includes a drone device, wherein the drone device includes a first separable drone device physically nested within a second separable drone device, wherein each separable drone device is configured to acquire separate information by traveling in different directions, wherein the first separable drone device enters a structure, and the second separable drone device remains on the outside the structure; and
   c. taking an action based on the package, including triggering a notification to a mobile device when the package moves more than a threshold amount, wherein determining if the package moves more than the threshold amount is based on a depth map and comparing a depth of the package in successive images.

2. The method of claim 1 wherein detecting delivery of the package includes detecting a wireless tag in or on the package.

3. The method of claim 1 wherein detecting delivery of the package includes utilizing object recognition with a camera of the security system or the drone device.

4. The method of claim 1 wherein detecting delivery of the package includes receiving a direct delivery notification at the security system from a delivery device.

5. The method of claim 1 wherein detecting delivery of the package includes receiving a delivery notification at the security system from a merchant device.

6. The method of claim 1 further comprising providing an indication to one or more devices that the package is protected by the security system.

7. The method of claim 1 wherein detecting delivery of the package includes monitoring and analyzing an Internet-based communication to determine the delivery of the package.

8. The method of claim 1 wherein monitoring the package includes automatically moving the drone device so that the package is within the view of a camera of the drone device.

9. The method of claim 1 wherein monitoring the package includes automatically moving the drone device onto or above the package.

10. The method of claim 1 wherein monitoring the package includes tracking movement of the package with the security system.

11. The method of claim 1 wherein taking the action includes triggering an alarm of the security system when the package moves more than the threshold amount.

12. The method of claim 1 wherein detecting delivery of the package includes monitoring mobile device messages which trigger the security system and/or the drone device to monitor the package or search for the package.

13. The method of claim 1 wherein detecting delivery of the package includes detecting triggering of a doorbell coupled to the security system.

14. The method of claim 1 wherein monitoring the package using the security system includes detecting one or more objects within a specified range, and if the one or more objects are recognized as unfamiliar, the notification is triggered.

15. The method of claim 1 further comprising implementing a privacy policy including blurring out a portion of information acquired by the drone device.

16. The method of claim 1 further comprising avoiding flying the drone device in one or more specified locations.

17. A system comprising:
a. a server; and
b. a security system with a drone device, wherein the security system is configured for receiving a notification of a delivery of a package from the server and alerting a user when the package is moved more than a threshold distance, wherein the drone device includes a first separable drone device physically nested within a second separable drone device, wherein each separable drone device is configured to acquire separate information by traveling in different directions, wherein the first separable drone device enters a structure, and the second separable drone device remains on the outside the structure, wherein determining if the package is moved more than the threshold distance is based on a depth map and comparing a depth of the package in successive images.

18. The system of claim 17 wherein the security system is further configured for informing the server that the package is being monitored.

19. The system of claim 17 wherein the server receives the notification of the delivery of the package from a delivery scanner device.

20. An aerial drone device comprising:
a. a device body;
b. at least one propeller coupled to the device body;
c. a plurality of information acquisition components coupled to the device body, wherein a first information acquisition component of the plurality of information acquisition components is positioned in an opposite direction of a second information acquisition component of the plurality of information acquisition components;
d. a memory configured for storing an application, the application for:
  i. processing external information, wherein the external information includes a notification of a delivery of a package;
  ii. directing the aerial drone device to patrol an area based on the processed external information;
  iii. acquiring content using the plurality of information acquisition components; and
  iv. alerting a user when the package is moved more than a threshold distance; and
e. a processor configured for processing the application, wherein the aerial drone device includes a separable aerial drone device physically nested within a second separable aerial drone device, wherein each separable aerial drone device is configured to acquire separate information by traveling in different directions, wherein the aerial drone device enters a structure, and the second separable aerial drone device remains on the outside the structure, wherein determining if the package is moved more than the threshold distance is based on a depth map and comparing a depth of the package in successive images.

* * * * *